(12) United States Patent
Moreton et al.

(10) Patent No.: US 8,730,252 B1
(45) Date of Patent: May 20, 2014

(54) SYSTEM, METHOD AND COMPUTER PROGRAM PRODUCT FOR BUMP MAPPING

(75) Inventors: Henry P. Moreton, Woodside, CA (US); John Erik Lindholm, Saratoga, CA (US); Matthew N. Papakipos, Palo Alto, CA (US); Harold Robert Feldman Zatz, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1547 days.

(21) Appl. No.: 10/816,091

(22) Filed: Mar. 31, 2004

Related U.S. Application Data

(60) Division of application No. 10/340,576, filed on Jan. 10, 2003, now Pat. No. 6,828,980, which is a continuation-in-part of application No. 09/678,111, filed on Oct. 2, 2000, now Pat. No. 6,731,298.

(60) Provisional application No. 60/347,938, filed on Jan. 11, 2002.

(51) Int. Cl.
  *G09G 5/00* (2006.01)
  *G09G 5/02* (2006.01)
  *G06T 15/50* (2011.01)

(52) U.S. Cl.
  USPC ............ 345/582; 345/426; 345/584; 345/589

(58) Field of Classification Search
  CPC ................................ G06T 15/04; G06T 15/50
  USPC .................................... 345/589, 584, 582, 506
  See application file for complete search history.

(56) References Cited

U.S. PATENT DOCUMENTS

| | | | | |
|---|---|---|---|---|
| 5,179,638 A | * | 1/1993 | Dawson et al. | 345/582 |
| 5,224,208 A | * | 6/1993 | Miller et al. | 345/609 |
| 5,255,360 A | * | 10/1993 | Peaslee et al. | 345/552 |
| 5,265,203 A | * | 11/1993 | Peaslee et al. | 345/502 |
| 5,276,798 A | * | 1/1994 | Peaslee et al. | 345/505 |
| 5,329,615 A | * | 7/1994 | Peaslee et al. | 345/502 |
| 5,561,746 A | * | 10/1996 | Murata et al. | 345/419 |
| 5,694,143 A | * | 12/1997 | Fielder et al. | 345/519 |
| 5,742,749 A | | 4/1998 | Foran et al. | |
| 5,745,667 A | * | 4/1998 | Kawase et al. | 345/587 |
| 5,777,623 A | | 7/1998 | Small | |
| 5,798,770 A | * | 8/1998 | Baldwin | 345/506 |
| 5,808,619 A | * | 9/1998 | Choi et al. | 345/426 |
| 5,819,017 A | | 10/1998 | Akeley et al. | |
| 5,880,736 A | * | 3/1999 | Peercy et al. | 345/426 |
| 5,900,881 A | * | 5/1999 | Ikedo | 345/426 |

(Continued)

OTHER PUBLICATIONS

Kugler, A., "IMEM: an intelligent memory for bump- and reflection-mapping", Proc. ACM SIGGRAPH/EUROGRAPHICS Workshop on Graphics Hardware (Aug. 31, 1998-Sep. 1, 1998), ACM Press, NY, NY, pp. 113-122.*

(Continued)

*Primary Examiner* — Ulka Chauhan
*Assistant Examiner* — Roberta D Prendergast
(74) *Attorney, Agent, or Firm* — Zilka-Kotab, PC

(57) ABSTRACT

A system, method and computer program product are provided for bump mapping in a hardware graphics processor. Initially, a first set of texture coordinates is received. The texture coordinates are then multiplied by a matrix to generate results. A second set of texture coordinates is then offset utilizing the results. The offset second set of texture coordinates is then mapped to color.

26 Claims, 20 Drawing Sheets

(56) References Cited

U.S. PATENT DOCUMENTS

| | | | |
|---|---|---|---|
| 5,949,424 A * | 9/1999 | Cabral et al. | 345/426 |
| 5,974,168 A | 10/1999 | Rushmeier et al. | |
| 6,028,608 A | 2/2000 | Jenkins | |
| 6,031,542 A * | 2/2000 | Wittig | 345/426 |
| 6,037,948 A * | 3/2000 | Liepa | 345/582 |
| 6,044,408 A | 3/2000 | Engstrom et al. | |
| 6,057,850 A * | 5/2000 | Kichury | 345/584 |
| 6,078,334 A | 6/2000 | Hanaoka et al. | |
| 6,124,858 A * | 9/2000 | Ge et al. | 345/619 |
| 6,163,319 A * | 12/2000 | Peercy et al. | 345/426 |
| 6,166,748 A * | 12/2000 | Van Hook et al. | 345/522 |
| 6,175,368 B1 * | 1/2001 | Aleksic et al. | 345/582 |
| 6,215,496 B1 * | 4/2001 | Szeliski et al. | 345/419 |
| 6,226,006 B1 * | 5/2001 | Collodi | 345/426 |
| 6,239,810 B1 * | 5/2001 | Van Hook et al. | 345/420 |
| 6,252,612 B1 * | 6/2001 | Jeddeloh | 345/531 |
| 6,268,875 B1 * | 7/2001 | Duluk et al. | 345/506 |
| 6,297,833 B1 * | 10/2001 | Ho et al. | 345/581 |
| 6,331,856 B1 * | 12/2001 | Van Hook et al. | 345/503 |
| 6,333,743 B1 * | 12/2001 | Gossett et al. | 345/503 |
| 6,362,822 B1 | 3/2002 | Randel | |
| 6,411,301 B1 * | 6/2002 | Parikh et al. | 345/522 |
| 6,424,351 B1 * | 7/2002 | Bishop et al. | 345/582 |
| 6,429,872 B1 * | 8/2002 | Ernst | 345/584 |
| 6,518,968 B1 * | 2/2003 | Ritter et al. | 345/426 |
| 6,525,740 B1 * | 2/2003 | Cosman | 345/584 |
| 6,532,013 B1 * | 3/2003 | Papakipos et al. | 345/426 |
| 6,552,726 B2 * | 4/2003 | Hurley et al. | 345/426 |
| 6,556,197 B1 * | 4/2003 | Van Hook et al. | 345/419 |
| 6,593,923 B1 * | 7/2003 | Donovan et al. | 345/422 |
| 6,593,929 B2 * | 7/2003 | Van Hook et al. | 345/501 |
| 6,614,431 B1 * | 9/2003 | Collodi | 345/426 |
| 6,624,812 B1 * | 9/2003 | Collodi | 345/426 |
| 6,650,327 B1 * | 11/2003 | Airey et al. | 345/422 |
| 6,664,958 B1 | 12/2003 | Leather et al. | |
| 6,664,963 B1 * | 12/2003 | Zatz | 345/426 |
| 6,700,583 B2 * | 3/2004 | Fowler et al. | 345/531 |
| 6,700,586 B1 | 3/2004 | Demers | |
| 6,717,576 B1 * | 4/2004 | Duluk et al. | 345/419 |
| 6,731,298 B1 * | 5/2004 | Moreton et al. | 345/582 |
| 6,771,264 B1 * | 8/2004 | Duluk et al. | 345/426 |
| 6,825,851 B1 * | 11/2004 | Leather | 345/584 |
| 6,828,980 B1 * | 12/2004 | Moreton et al. | 345/582 |
| 6,833,830 B2 * | 12/2004 | Collodi | 345/426 |
| 6,980,218 B1 * | 12/2005 | Demers et al. | 345/584 |
| 7,154,507 B1 | 12/2006 | Moreton et al. | |
| 7,889,208 B1 | 2/2011 | Moreton et al. | |
| 2002/0135591 A1 * | 9/2002 | Zhang | 345/582 |
| 2003/0169273 A1 * | 9/2003 | Hsu et al. | 345/584 |
| 2004/0036692 A1 * | 2/2004 | Alcorn et al. | 345/582 |
| 2004/0056860 A1 * | 3/2004 | Collodi | 345/426 |
| 2004/0113911 A1 * | 6/2004 | Collodi | 345/426 |

OTHER PUBLICATIONS

Ernst et al., "Gouraud bump mapping", Proc.s ACM SIGGRAPH/EUROGRAPHICS Workshop on Graphics Hardware (Aug. 31-Sep. 1, 1998), ACM Press, New York, NY, 47-53.*

Reynolds, "Programing with OpenGL: Advanced Techniques", 24th International Conference on Computer Graphics and Interactive Techniques, SIGGRAPH 97, pp. 71-78.*

Kilgard, M., "A Practical and Robust Bump-mapping Technique for Today's GPUs", NVIDIA Corporation, Apr. 2000. Available from http://www.nvidia.com.*

Everitt, Cass Watson, "High-quality; hardware-accelerated per-pixel illumination for consumer class OpenGL hardware", M.S., Mississippi State University, 2000, 28 pages.*

Kautz, J. et al.,"Towards interactive bump mapping with anisotropic shift-variant BRDFs" Proceedings ACM SIGGRAPH/EUROGRAPHICS Workshop on Graphics Hardware, Aug. 21-22, 2000, ACM Press, NY, NY, pp. 51-58.*

Gumhold, S. et al., "Multiresolution rendering with displacement mapping", Proceedings of the ACM SIGGRAPH/EUROGRAPHICS Workshop on Graphics Hardware, Aug. 1999, ACM Press, NY, NY, pp. 55-66.*

Max, N.L. et al., "Bump shading for volume textures", IEEE Computer Graphics and Applications, vol. 14, Issue 4, Jul. 1994, pp. 18-20.*

J. F. Blinn, "Simulation of wrinkled surfaces", In Computer Graphics (SIGGRAPH '78 Proceedings), pp. 286-292, Aug. 1978.*

Ikedo, T. et al., "Hardware implementation of shading models in an application specific integrated circuit", Proceedings 1997 International Conference on Shape Modeling and Applications, Mar. 1997, pp. 150-159.*

Ikedo, T. et al., "An advanced graphics chip with bump-mapped Phong shading", Proceedings Computer Graphics International, Jun. 1997, pp. 156-165.* nVidia Technical Brief, "Per-Pixel Lighting and Bump Mapping with the NVIDIA Shading Rasterizer", http://www.nvidia.com/attach/157, 2000, 9 pages.*

Ati, "SmartshaderTM technology white paper", Jul. 2001, http://www.ati.com/products/pdf/smartshader.pdf.*

Hanrahan, P. and Haeberli, P., 1990, "Direct WYSIWYG painting and texturing on 3D shapes", Proceedings of the 17th Annual Conference on Computer Graphics and interactive Techniques, SIGGRAPH '90, ACM, New York, NY, pp. 215-223.*

Dominé, Sébastien, and John Spitzer. "Texture shaders." developer documentation (2001), Game Developers Conference Mar. 22-24, 2001.*

McCool, Michael D., and Wolfgang Heidrich. "Texture shaders." In Proceedings of the ACM SIGGRAPH/EUROGRAPHICS workshop on Graphics hardware, pp. 117-126. ACM, 1999.*

McReynolds, Tom, David Blythe, C. Fowle, B. Grantham, S. Hui, and P. Womack. "Programming with OpenGL: advanced rendering." In SIGGRAPH, vol. 97, pp. 144-153. 1997.*

Kilgard, Mark J., "NV Register Combiners" http://www.opengl.org/registry/specs/NV/register_combiners.txt.

"NV Register Combiners2" http://oss.sgi.com/projects/ogl-sample/registry/NV/register_combiners2.txt.

Segal et al., The OpenGL Graphics System: A Specification (Version 1.2.1) Silicon Graphics, Inc. 1992-1999.

Everitt et al., "Practical and Robust Stenciled Shadow Volumes for Hardware-Accelerated Rendering" SIGGRAPH 2002, p. 1-8.

Advisory Action from U.S. Appl. No. 10/804,434, dated Jun. 27, 2008.

Final Office Action from U.S. Appl. No. 10/804,434, dated Apr. 8, 2008.

Final Office Action from U.S. Appl. No. 10/804,434, dated May 14, 2009.

Notice of Allowance from U.S. Appl. No. 10/804,434, dated Oct. 7, 2010.

Non-Final Office Action from U.S. Appl. No. 10/804,434, dated Apr. 3, 2007.

Non-Final Office Action from U.S. Appl. No. 10/804,434, dated Apr. 15, 2010.

Non-Final Office Action from U.S. Appl. No. 10/804,434, dated May 11, 2006.

Non-Final Office Action from U.S. Appl. No. 10/804,434, dated Sep. 20, 2007.

Non-Final Office Action from U.S. Appl. No. 10/804,434, dated Oct. 1, 2008.

Final Office Action from U.S. Appl. No. 10/941,198, dated Apr. 3, 2006.

Notice of Allowance from U.S. Appl. No. 10/941,198, dated Jun. 28, 2006.

Non-Final Office Action from U.S. Appl. No. 10/941,198, dated Apr. 11, 2005.

Salomon, D., "Computer Graphics and Geometric Modeling," Springer, 1999, pp. 555-556.

\* cited by examiner

| texture shader operation i | previous texture input | texture shader operation i-1 | operation i-2 | texture shader operation i+1 |
|---|---|---|---|---|
| NONE | - | - | - | - |
| TEXTURE_1D | - | - | - | - |
| TEXTURE_2D | - | - | - | - |
| TEXTURE_RECTANGLE_NV | - | - | - | - |
| TEXTURE_CUBE_MAP_ARB | - | - | - | - |
| PASS_THROUGH_NV | - | - | - | - |
| CULL_FRAGMENT_NV | - | - | - | - |
| OFFSET_TEXTURE_2D_NV | base internal texture format must be one of DSDT_NV, DSDT_MAG_NV, or DSDT_MAG_INTENSITY_NV | - | - | - |
| OFFSET_TEXTURE_2D_SCALE_NV | base internal texture format must be either DSDT_MAG_NV or DSDT_MAG_INTENSITY_NV | - | - | - |
| OFFSET_TEXTURE_RECTANGLE_NV | base internal texture format must be one of DSDT_NV, DSDT_MAG_NV, or DSDT_MAG_INTENSITY_NV | - | - | - |
| OFFSET_TEXTURE_RECTANGLE_SCALE_NV | base internal texture format must be either DSDT_MAG_NV or DSDT_MAG_INTENSITY_NV | - | - | - |
| DEPENDENT_AR_TEXTURE_2D_NV | shader result type must all be unsigned RGBA | - | - | - |
| DEPENDENT_GB_TEXTURE_2D_NV | shader result type must all be unsigned RGBA | - | - | - |

Figure 5A

| | | |
|---|---|---|
| DOT_PRODUCT_NV | shader result type must be one of signed HILO, unsigned HILO, all signed RGBA, or all unsigned RGBA | - |
| DOT_PRODUCT_TEXTURE_2D_NV | shader result type must be one of signed HILO, unsigned HILO, all signed RGBA, or all unsigned RGBA | shader operation must be DOT_PRODUCT_NV |
| DOT_PRODUCT_TEXTURE_RECTANGLE_NV | shader result type must be one of signed HILO, unsigned HILO, all signed RGBA, or all unsigned RGBA | shader operation must be DOT_PRODUCT_NV |
| DOT_PRODUCT_TEXTURE_CUBE_MAP_NV | shader result type must be one of signed HILO, unsigned HILO, all signed RGBA, or all unsigned RGBA | shader operation must be DOT_PRODUCT_NV |
| DOT_PRODUCT_REFLECT_CUBE_MAP_NV | shader result type must be one of signed HILO, unsigned HILO, all signed RGBA, or all unsigned RGBA; previous texture input must not be unit i-1 | shader operation must be DOT_PRODUCT_NV or DOT_PRODUCT_DIFFUSE_CUBE_MAP_NV | - |
| DOT_PRODUCT_CONST_EYE_REFLECT_CUBE_MAP_NV | shader result type must be one of signed HILO, unsigned HILO, all signed RGBA, or all unsigned RGBA | shader operation must be DOT_PRODUCT_NV or DOT_PRODUCT_DIFFUSE_CUBE_MAP_NV |
| DOT_PRODUCT_DIFFUSE_CUBE_MAP_NV | shader result type must be one of signed HILO, unsigned HILO, all signed RGBA, or all unsigned RGBA | shader operation must be DOT_PRODUCT_NV | shader operation must be DOT_PRODUCT_REFLECT_CUBE_MAP_NV or DOT_PRODUCT_CONST_EYE_REFLECT_CUBE_MAP_NV |
| DOT_PRODUCT_DEPTH_REPLACE_NV | shader result type must be one of signed HILO, unsigned HILO, all signed RGBA, or all unsigned RGBA | shader operation must be DOT_PRODUCT_NV | - |

Figure 5A (cont.)

| texture shader operation i | texture unit i |
|---|---|
| NONE | - |
| TEXTURE_1D | 1D target must be consistent |
| TEXTURE_2D | 2D target must be consistent |
| TEXTURE_RECTANGLE_NV | rectangle target must be consistent |
| TEXTURE_CUBE_MAP_ARB | cube map target must be consistent |
| PASS_THROUGH_NV | - |
| CULL_FRAGMENT_NV | - |
| OFFSET_TEXTURE_2D_NV | 2D target must be consistent |
| OFFSET_TEXTURE_2D_SCALE_NV | 2D target must be consistent and 2D texture target type must be unsigned RGBA |
| OFFSET_TEXTURE_RECTANGLE_NV | rectangle target must be consistent |
| OFFSET_TEXTURE_RECTANGLE_SCALE_NV | rectangle target must be consistent and rectangle texture target type must be unsigned RGBA |
| DEPENDENT_AR_TEXTURE_2D_NV | 2D target must be consistent |
| DEPENDENT_GB_TEXTURE_2D_NV | 2D target must be consistent |
| DOT_PRODUCT_NV | - |
| DOT_PRODUCT_TEXTURE_2D_NV | 2D target must be consistent |
| DOT_PRODUCT_TEXTURE_RECTANGLE_NV | rectangle target must be consistent |
| DOT_PRODUCT_TEXTURE_CUBE_MAP_NV | cube map target must be consistent |
| DOT_PRODUCT_REFLECT_CUBE_MAP_NV | cube map target must be consistent |
| DOT_PRODUCT_CONST_EYE_-REFLECT_CUBE_MAP_NV | cube map target must be consistent |
| DOT_PRODUCT_DIFFUSE_CUBE_MAP_NV | cube map target must be consistent |
| DOT_PRODUCT_DEPTH_REPLACE_NV | - |

Figure 5B

| texture shader operation i | texture coordinate set usage | texture target | uses stage result i-1 | uses stage result i-2 | uses stage result i+1 | uses previous texture input | uses cull modes | uses offset texture 2D matrix | offset texture 2D scale and bias | uses const eye vector |
|---|---|---|---|---|---|---|---|---|---|---|
| NONE | - | - | - | - | - | - | - | - | - | - |
| TEXTURE_1D | s,q | 1D | - | - | - | - | - | - | - | - |
| TEXTURE_2D | s,t,q | 2D | - | - | - | - | - | - | - | - |
| TEXTURE_RECTANGLE_NV | s,t,q | rectangle | - | - | - | - | - | - | - | - |
| TEXTURE_CUBE_MAP_ARB | s,t,r | cube map | - | - | - | - | - | - | - | - |
| PASS_THROUGH_NV | s,t,r,q | - | - | - | - | - | - | - | - | - |
| CULL_FRAGMENT_NV | s,t,r,q | - | - | - | - | - | y | - | - | - |
| OFFSET_TEXTURE_2D_NV | s,t | 2D | - | - | - | - | - | y | - | - |
| OFFSET_TEXTURE_2D_SCALE_NV | s,t | 2D | - | - | - | - | - | y | y | - |
| OFFSET_TEXTURE_RECTANGLE_NV | s,t | rectangle | - | - | - | - | - | y | - | - |
| OFFSET_TEXTURE_RECTANGLE_SCALE_NV | s,t | rectangle | - | - | - | - | - | y | y | - |
| DEPENDENT_AR_TEXTURE_2D_NV | - | 2D | - | - | - | y | - | - | - | - |
| DEPENDENT_GB_TEXTURE_2D_NV | - | 2D | - | - | - | y | - | - | - | - |
| DOT_PRODUCT_NV | s,t,r (q*) | - | y | - | - | - | - | - | - | - |
| DOT_PRODUCT_TEXTURE_2D_NV | s,t,r | 2D | y | - | - | y | - | - | - | - |
| DOT_PRODUCT_TEXTURE_RECTANGLE_NV | s,t,r | rectangle | y | - | - | y | - | - | - | - |
| DOT_PRODUCT_TEXTURE_CUBE_MAP_NV | s,t,r | cube map | y | y | - | y | - | - | - | - |
| DOT_PRODUCT_REFLECT_CUBE_MAP_NV | s,t,r,q | cube map | y | y | y | y | - | - | - | - |
| DOT_PRODUCT_CONST_EYE_REFLECT_CUBE_MAP_NV | s,t,r | cube map | y | y | - | y | - | - | - | y |
| DOT_PRODUCT_DIFFUSE_CUBE_MAP_NV | s,t,r (q*) | cube map | y | y | - | y | - | - | - | - |
| DOT_PRODUCT_DEPTH_REPLACE_NV | s,t,r | - | y | - | - | y | - | - | - | - |

Figure 5C

| texture shader operation i | shader stage result type | shader stage result | texture unit RGBA color result |
|---|---|---|---|
| NONE | RGBA | invalid | (0,0,0,0) |
| TEXTURE_1D | matches 1D target type | filtered 1D target texel | if 1D target texture type is RGBA, filtered 1D target texel, else (0,0,0,0) |
| TEXTURE_2D | matches 2D target type | filtered 2D target texel | if 2D target texture type is RGBA, filtered 2D target texel, else (0,0,0,0) |
| TEXTURE_RECTANGLE_NV | matches rectangle target type | filtered rectangle target texel | if rectangle target texture type is RGBA, filtered rectangle target texel, else (0,0,0,0) |
| TEXTURE_CUBE_MAP_ARB | matches cube map target type | filtered cube map target texel | if cube map target texture type is RGBA, filtered cube map target texel, else (0,0,0,0) |
| PASS_THROUGH_NV | RGBA | (max(0,min(1,s)), max(0,min(1,t)), max(0,min(1,r)), max(0,min(1,q))) | (max(0,min(1,s)), max(0,min(1,t)), max(0,min(1,r)), max(0,min(1,q))) |
| CULL_FRAGMENT_NV | RGBA | invalid | (0,0,0,0) |
| OFFSET_TEXTURE_2D_NV | matches 2D target type | filtered 2D target texel | if 2D target texture type is RGBA, filtered 2D target texel, else (0,0,0,0) |
| OFFSET_TEXTURE_2D_SCALE_NV | RGBA | filtered 2D target texel | scaled filtered 2D target texel |
| OFFSET_TEXTURE_RECTANGLE_NV | matches rectangle target type | filtered rectangle target texel | if rectangle target texture type is RGBA, filtered rectangle target texel, else (0,0,0,0) |
| OFFSET_TEXTURE_RECTANGLE_SCALE_NV | RGBA | filtered rectangle target texel | scaled filtered rectangle target texel |

Figure 5D

| | | | |
|---|---|---|---|
| DEPENDENT_AR_TEXTURE_2D_NV | matches 2D target type | filtered 2D target texel filtered 2D target texel, else (0,0,0,0) | if 2D target texture type is RGBA, |
| DEPENDENT_GB_TEXTURE_2D_NV | matches 2D target type | filtered 2D target texel filtered 2D target texel, else (0,0,0,0) | if 2D target texture type is RGBA, |
| DOT_PRODUCT_NV | float | dot product (0,0,0,0) | |
| DOT_PRODUCT_TEXTURE_2D_NV | matches 2D target type | filtered 2D target texel filtered 2D target texel, else (0,0,0,0) | if 2D target texture type is RGBA, |
| DOT_PRODUCT_TEXTURE_RECTANGLE_NV | matches rectangle target type | filtered rectangle target texel RGBA, filtered rectangle target texel, else (0,0,0,0) | if rectangle target texture type is |
| DOT_PRODUCT_TEXTURE_CUBE_MAP_NV | matches cube map target type | filtered cube map target texel RGBA, filtered cube map target texel, else (0,0,0,0) | if cube map target texture type is |
| DOT_PRODUCT_REFLECT_CUBE_MAP_NV | matches cube map target type | filtered cube map target texel RGBA, filtered cube map target texel, else (0,0,0,0) | if cube map target texture type is |
| DOT_PRODUCT_CONST_EYE_-REFLECT_CUBE_MAP_NV | matches cube map target type | filtered cube map target texel RGBA, filtered cube map target texel, else (0,0,0,0) | if cube map target texture type is |
| DOT_PRODUCT_DIFFUSE_CUBE_MAP_NV | matches cube map target type | filtered cube map target texel RGBA, filtered cube map target texel, else (0,0,0,0) | if cube map target texture type is |
| DOT_PRODUCT_DEPTH_REPLACE_NV | RGBA | invalid | (0,0,0,0) |

Figure 5D (cont.)

| Base internal format | Red | Green | Blue | Alpha |
|---|---|---|---|---|
| ALPHA | | | | At |
| LUMINANCE | Lt | Lt | Lt | 1 |
| INTENSITY | It | It | It | It |
| LUMINANCE_ALPHA | Lt | Lt | Lt | At |
| RGB | Rt | Gt | Bt | 1 |
| RGBA | Rt | Gt | Bt | At |

Figure 5E

| Get value | Type | Get Command | Initial value | Description | Sec | Attribute |
|---|---|---|---|---|---|---|
| HI_BIAS_NV | R | GetFloatv | 0.0 | Hi bias for HILO | 3.6.3 | pixel |
| LO_BIAS_NV | R | GetFloatv | 0.0 | Lo bias for HILO | 3.6.3 | pixel |
| DS_BIAS_NV | R | GetFloatv | 0.0 | Ds bias | 3.6.3 | pixel |
| DT_BIAS_NV | R | GetFloatv | 0.0 | Dt bias | 3.6.3 | pixel |
| MAGNITUDE_BIAS_NV | R | GetFloatv | 0.0 | Magnitude bias | 3.6.3 | pixel |
| VIBRANCE_BIAS_NV | R | GetFloatv | 0.0 | Vibrance bias | 3.6.3 | pixel |
| HI_SCALE_NV | R | GetFloatv | 1.0 | Hi scale | 3.6.3 | pixel |
| LO_SCALE_NV | R | GetFloatv | 1.0 | Lo scale | 3.6.3 | pixel |
| DS_SCALE_NV | R | GetFloatv | 1.0 | Ds scale | 3.6.3 | pixel |
| DT_SCALE_NV | R | GetFloatv | 1.0 | Dt scale | 3.6.3 | pixel |
| MAGNITUDE_SCALE_NV | R | GetFloatv | 1.0 | Magnitude scale | 3.6.3 | pixel |
| VIBRANCE_SCALE_NV | R | GetFloatv | 1.0 | Vibrance scale | 3.6.3 | pixel |
| TEXTURE_SHADER_NV | B | IsEnabled | False | Texture shaders enable | 3.8 | texture/enable |
| SHADER_OPERATION_NV | TxZ21 | GetTexEnviv | NONE | Texture shader operation | 3.8.13 | texture |
| CULL_MODES_NV | Tx4xZ2 | GetTexEnviv | GEQUAL,GEQUAL, GEQUAL,GEQUAL | Texture shader cull fragment modes | 3.8.13 | texture |
| RGBA_UNSIGNED_- DOT_PRODUCT_MAPPING_NV | TxZ2 | GetTexEnviv | UNSIGNED_IDENTITY_NV | Texture shader RGBA dot product mapping | 3.8.13 | texture |
| PREVIOUS_TEXTURE_INPUT_NV | TxZn | GetTexEnviv | TEXTURE0_ARB | Texture shader previous tex input | 3.8.13 | texture |
| CONST_EYE_NV | TxRx3 | GetTexEnvfv | (0,0,-1) | Shader constant eye vector | 3.8.13 | texture |
| OFFSET_TEXTURE_MATRIX_NV | TxM2 | GetTexEnvfv | (1,0,0,1) | 2x2 texture offset matrix | 3.8.13 | texture |
| OFFSET_TEXTURE_SCALE_NV | TxR | GetTexEnvfv | 1 | Texture offset scale | 3.8.13 | texture |
| OFFSET_TEXTURE_BIAS_NV | TxR | GetTexEnvfv | 0 | Texture offset bias | 3.8.13 | texture |
| SHADER_CONSISTENT_NV | TxB | GetTexEnviv | True | Texture shader stage consistency | 3.8.13 | texture |

Figure 6

Amendment to Figure 5A:

| texture shader operation i | previous texture input | texture shader operation i-1 | texture shader operation i-2 | texture shader operation i+1 |
|---|---|---|---|---|
| TEXTURE_3D | - | - | - | - |
| DOT_PRODUCT_TEXTURE_3D_NV | shader result type must be one of signed HILO, unsigned HILO, all signed RGBA, all unsigned RGBA | shader operation must be DOT_PRODUCT_NV | shader operation must be DOT_PRODUCT_NV | - |

Amendment to Figure 5B:

| texture shader operation i | texture unit i |
|---|---|
| TEXTURE_3D | 3D target must be consistent |
| DOT_PRODUCT_TEXTURE_3D_NV | 3D target must be consistent |

Amendment to Figure 5C:

| texture shader operation i | texture coordinate set usage | texture target | uses stage result i-1 | uses stage result i-2 | uses stage result i+1 | uses previous texture input | uses cull modes | uses offset texture 2D matrix | offset texture 2D scale and bias | uses const eye vector |
|---|---|---|---|---|---|---|---|---|---|---|
| TEXTURE_3D | s,t,r,q | 3D | - | - | - | - | - | - | - | - |
| DOT_PRODUCT_TEXTURE_3D_NV | s,t,r | 3D | y | y | - | y | - | - | - | - |

Amendment to Figure 5D:

| texture shader operation i | shader stage result type | shader stage result | texture unit RGBA color result |
|---|---|---|---|
| TEXTURE_3D | matches 3D target type | filtered 3D target texel | if 3D target texture type is RGBA, filtered 3D target texel, else (0,0,0,0) |
| DOT_PRODUCT_TEXTURE_3D_NV | matches 3D target type | filtered 3D target texel | if 3D target texture type is RGBA, filtered 3D target texel, else (0,0,0,0) |

Figure 7

| Amendment to Figure 5A: texture shader operation i | previous texture input | tex. shader op. i-2 | tex. shader op. i-1 | texture shader tex. shader op. i+1 |
|---|---|---|---|---|
| OFFSET_PROJECTIVE_TEXTURE_2D_NV | base internal texture format must be one of DSDT_NV, DSDT_MAG_NV, or DSDT_MAG_INTENSITY_NV | | | |
| OFFSET_PROJECTIVE_TEXTURE_2D_SCALE_NV | base internal texture format must be either DSDT_MAG_NV or DSDT_MAG_INTENSITY_NV | | | |
| OFFSET_PROJECTIVE_TEXTURE_RECTANGLE_NV | base internal texture format must be one of DSDT_NV, DSDT_MAG_NV, or DSDT_MAG_INTENSITY_NV | | | |
| OFFSET_PROJECTIVE_TEXTURE_RECTANGLE_SCALE_NV | base internal texture format must be either DSDT_MAG_NV or DSDT_MAG_INTENSITY_NV | | | |
| OFFSET_HILO_TEXTURE_2D_NV | base internal texture format must be HILO | | | |
| OFFSET_HILO_TEXTURE_RECTANGLE_NV | base internal texture format must be HILO | | | |
| OFFSET_HILO_PROJECTIVE_TEXTURE_2D_NV | base internal texture format must be HILO | | | |
| OFFSET_HILO_PROJECTIVE_TEXTURE_RECTANGLE_NV | base internal texture format must be HILO | | | |
| DEPENDENT_HILO_TEXTURE_2D_NV | base internal texture format must be HILO | | | |
| DEPENDENT_RGB_TEXTURE_3D_NV | shader result type must all be unsigned RGBA | | | |
| DEPENDENT_RGB_TEXTURE_CUBE_MAP_NV | shader result type must all be unsigned RGBA | | | |
| DOT_PRODUCT_TEXTURE_PASS_THROUGH_NV | shader result type must be one of signed HILO, unsigned HILO, all signed RGBA, or all unsigned RGBA | | | |
| DOT_PRODUCT_TEXTURE_1D_NV | shader result type must be one of signed HILO, unsigned HILO, all signed RGBA, or all unsigned RGBA | | | |
| DOT_PRODUCT_AFFINE_DEPTH_REPLACE_NV | shader result type must be one of signed HILO, unsigned HILO, all signed RGBA, or all unsigned RGBA | | | |

Figure 8-1

Amendment to Figure 5C:

| texture shader operation i | texture coordinate set usage | texture target | uses stage result i-1 | uses stage result i-2 | uses stage result i+1 | uses previous texture input | uses cull modes | uses offset texture 2D matrix | offset texture 2D scale and bias | uses const eye vector |
|---|---|---|---|---|---|---|---|---|---|---|
| OFFSET_PROJECTIVE_TEXTURE_2D_NV | s,t,q | 2D | - | - | - | - | - | y | - | - |
| OFFSET_PROJECTIVE_TEXTURE_2D_SCALE_NV | s,t,q | 2D | - | - | - | - | - | y | y | - |
| OFFSET_PROJECTIVE_TEXTURE_RECTANGLE_NV | s,t,q | rectangle | - | - | - | - | - | y | - | - |
| OFFSET_PROJECTIVE_TEXTURE_RECTANGLE_SCALE_NV | s,t,q | rectangle | - | - | - | - | - | y | y | - |
| OFFSET_HILO_TEXTURE_2D_NV | s,t | 2D | - | - | - | - | - | y | - | - |
| OFFSET_HILO_TEXTURE_RECTANGLE_NV | s,t | rectangle | - | - | - | - | - | y | - | - |
| OFFSET_PROJECTIVE_HILO_TEXTURE_2D_NV | s,t,q | 2D | - | - | - | - | - | y | - | - |
| OFFSET_PROJECTIVE_HILO_TEXTURE_RECTANGLE_NV | s,t,q | rectangle | - | - | - | - | - | y | - | - |
| DEPENDENT_HILO_TEXTURE_2D_NV | - | 2D | - | - | - | y | - | - | - | - |
| DEPENDENT_RGB_TEXTURE_3D_NV | - | 3D | - | - | - | y | - | - | - | - |
| DEPENDENT_RGB_TEXTURE_CUBE_MAP_NV | - | cube map | - | - | - | y | - | - | - | - |
| DOT_PRODUCT_PASS_THROUGH_NV | s,t,r | - | - | - | - | y | - | - | - | - |
| DOT_PRODUCT_TEXTURE_1D_NV | s,t,r | 1D | - | - | - | y | - | - | - | - |
| DOT_PRODUCT_AFFINE_DEPTH_REPLACE_NV | s,t,r | - | - | - | - | y | - | - | - | - |

Figure 8-2

Amendment to Figure 5D:

| texture shader operation i | shader stage result type | shader stage result | texture unit RGBA color result |
|---|---|---|---|
| OFFSET_TEXTURE_2D_NV | matches 2D target type | filtered 2D target texel | if 2D target texture type is RGBA, filtered 2D target texel, else (0,0,0,0) |
| OFFSET_TEXTURE_2D_SCALE_NV | RGBA | filtered 2D target texel | scaled filtered 2D target texel |
| OFFSET_TEXTURE_RECTANGLE_NV | matches rectangle target type | filtered rectangle target texel | if rectangle target texture type is RGBA, filtered rectangle target texel, else (0,0,0,0) |
| OFFSET_TEXTURE_RECTANGLE_SCALE_NV | RGBA | filtered rectangle target texel | scaled filtered rectangle target texel |
| OFFSET_PROJECTIVE_TEXTURE_2D_NV | matches 2D target type | filtered 2D target texel | if 2D target texture type is RGBA, filtered 2D target texel, else (0,0,0,0) |
| OFFSET_PROJECTIVE_TEXTURE_2D_SCALE_NV | RGBA | filtered 2D target texel | scaled filtered 2D target texel |
| OFFSET_PROJECTIVE_TEXTURE_RECTANGLE_NV | matches rectangle target type | filtered rectangle target texel | if rectangle target texture type is RGBA, filtered rectangle target texel, else (0,0,0,0) |
| OFFSET_PROJECTIVE_TEXTURE_RECTANGLE_SCALE_NV | RGBA | filtered rectangle target texel | scaled filtered rectangle target texel |
| DEPENDENT_HILO_TEXTURE_2D_NV | matches 2D target type | filtered 2D target texel | if 2D target texture type is RGBA, filtered 2D target texel, else (0,0,0,0) |
| DEPENDENT_RGB_TEXTURE_3D_NV | matches 3D target type | filtered 3D target texel | if 3D target texture type is RGBA, filtered 3D target texel, else (0,0,0,0) |
| DEPENDENT_RGB_TEXTURE_CUBE_MAP_NV | matches cube map target type | filtered cube map target texel | if cube map target texture type is RGBA, filtered cube map target texel, else (0,0,0,0) |
| DOT_PRODUCT_PASS_THROUGH_NV | RGBA | (max(0,min(1,[s,t,r]dot[a,b,c])), max(0,min(1,[s,t,r]dot[a,b,c])), max(0,min(1,[s,t,r]dot[a,b,c])), max(0,min(1,[s,t,r]dot[a,b,c]))) | (max(0,min(1,[s,t,r]dot[a,b,c])), max(0,min(1,[s,t,r]dot[a,b,c])), max(0,min(1,[s,t,r]dot[a,b,c])), max(0,min(1,[s,t,r]dot[a,b,c]))) |
| DOT_PRODUCT_TEXTURE_1D_NV | matches 1D target type | filtered 1D target texel | if 1D target texture type is RGBA, filtered 1D target texel, else (0,0,0,0) |
| DOT_PRODUCT_AFFINE_DEPTH_REPLACE_NV | RGBA | invalid | (0,0,0,0) |

Figure 8-2 (cont.)

SYSTEM, METHOD AND COMPUTER PROGRAM PRODUCT FOR BUMP MAPPING

RELATED APPLICATIONS(S)

The present application is a divisional of an application filed Jan. 10, 2003 under Ser. No. 10/340,576, which is a continuation-in-part of a parent application filed Oct. 2, 2000 under Ser. No. 09/678,111, and further claims priority of a provisional application filed Jan. 11, 2002 under Ser. No. 60/347,938, which are all incorporated herein by reference in their entirety.

FIELD OF THE INVENTION

The present invention relates to computer graphics, and more particularly to bump mapping during graphics processing.

BACKGROUND OF THE INVENTION

Generally, bump and texture mapping are rendering processes where basic contours of an object are expressed as graphics primitives (generally, polygons) with various types of data mapped onto graphics primitives. During the course of bump and texture mapping, a color calculation is performed to incorporate colors onto an object in display coordinate space. This object with the colors is then displayed on a display device.

Prior Art FIG. 1 illustrates the method by which an exemplary bump mapping process is accomplished. As shown, a primitive, i.e. polygon, triangle, etc., is first received with pixel data, as shown in operation 100. Included with such pixel data are normal values and possibly other values associated with the vertices associated with the polygon These vectors are perspectively and correctly interpolated across the primitive. At each pixel, texture coordinates (also interpolated) are used to look up bump mapping information.

During bump mapping, the aforementioned normal values are modified based on a bump map algorithm using the bump mapping information, as indicated in operation 102 of FIG. 1. In particular, the normal's direction is perturbed as though the surface has been displaced a small amount in the direction of the interpolated normals of the primitive. FIG. 2 illustrates a primitive 200 with a normal 202 that is modified to generate a perturbed normal 204. A bumpy surface is thereby simulated.

Thereafter, lighting operations such as shading or the like are performed on the pixel data using the perturbed normal values instead of the original normal values, as indicated in operation 104. This method gives the appearance of bumps and depressions in the surface. Also at this time, the color calculation may be carried out in order to enhance the color of the pixel.

The foregoing bump and texture mapping processes are often supported by graphics application program interfaces (API's). In one embodiment, such interface may include the Open Graphics Library (OpenGL®). OpenGL® is one of the computer industry's standard application program interfaces (APIs) for defining 2-D and 3-D graphic images. An application can create the same effects in any operating system using any OpenGL®-adhering graphics adapter, provided the adapter supports the appropriate version of OpenGL® along with any utilized OpenGL® extensions. OpenGL® specifies a set of commands or immediately executed functions. Typically, a command directs a drawing action or causes special effects (e.g. bump and texture mapping processes).

Another API includes DirectX®. Such API is provided by Microsoft® and is integral to the Windows® operating system. DirectX8® includes a "pixel shaders" functionality. DirectX's® "pixel shaders" perform two particular tasks.

In a typical graphics pipeline, there is the task of interpolating texture coordinates and applying the texture mapping. This per-fragment task maps from interpolated floating-point texture coordinate sets to (typically fixed-point) texture unit RGBA results. In conventional OpenGL®, this mapping is performed by accessing the highest priority enabled texture target using the fragment's corresponding interpolated texture coordinate set. Unfortunately, this mapping is not very powerful.

Second, there is the task of fragment coloring. Fragment coloring is process of combining (typically fixed-point) RGBA colors to generate a final fragment color that, assuming the fragment is not discarded by subsequent per-fragment tests, is used to update the fragment's corresponding pixel in the frame buffer. In conventional OpenGL®, fragment coloring is performed by the enabled texture environment functions, fog, and color sum operations. NVIDIA's® register combiners functionality (See the NV_register_combiners and NV_register_combiners2 extensions, which are incorporated herein by reference) provides a substantially more powerful alternative to conventional OpenGL® fragment coloring.

DirectX8® has two types of opcodes for pixel shaders. Texture address opcodes correspond to the first task listed above. Texture register opcodes correspond to the second task listed above.

While the foregoing bump and texture mapping techniques feature the unevenness of a surface and enhance the color of a pixel, they do not work well to reflect any unevenness in shadows cast by or onto the bumpy surface. Further, there are also limitations as to the interaction of geometric objects. These drawbacks are mainly due to the fact that conventional bump and texture mapping processes have no impact on the z-value of the pixel.

There is thus a need for a texture/bump mapping scheme during graphic processing that overcomes these drawbacks for providing a more realistic rendered image.

DISCLOSURE OF THE INVENTION

A system, method and computer program product are provided for bump mapping in a hardware graphics processor. Initially, a first set of texture coordinates is received. The texture coordinates are then multiplied by a matrix to generate results. A second set of texture coordinates is then offset utilizing the results. The offset second set of texture coordinates is then mapped to color.

BRIEF DESCRIPTION OF THE DRAWINGS

Prior Art

FIGS. 5A-D specify inter-stage dependencies, texture target dependencies, relevant inputs, and result types and values respectively for each texture shader operation, in accordance with an optional embodiment.

FIG. 5E specifies how the components of an accessed texture are mapped to the components of the texture unit RGBA result based on the base internal format of the accessed texture, in accordance with an optional embodiment.

FIG. 6 illustrates texture shaders, in accordance with an optional embodiment.

FIGS. 7, 8-1 and 8-2 illustrate alternate embodiments of FIGS. 5A-D, in accordance with modified embodiments.

DESCRIPTION OF THE PREFERRED EMBODIMENTS

Bump and texture mapping are techniques to add more realism to synthetic images. Texture mapping adds realism by attaching images to geometric surfaces. Bump mapping adds per-pixel surface relief shading, increasing the apparent complexity of the surface. Surfaces that should have associated fine grain details, small-scale geometric features, roughness, etc. are good candidates for bump mapping.

A bump map is an array of scalar or vector values that represents an object's features on a small scale. A custom renderer is used to map these height values into changes in the local surface normal. These perturbed normals are combined with the surface normal, and the results are used as inputs to a lighting equation at each pixel. In addition to using perturbed normals in such a manner, the present embodiment further modifies depth-values to enhance graphics processing. It should be noted that one embodiment may optionally modify z-values using a related, but separate map of scalar displacements, similar to traditional bump maps.

Figure 3:
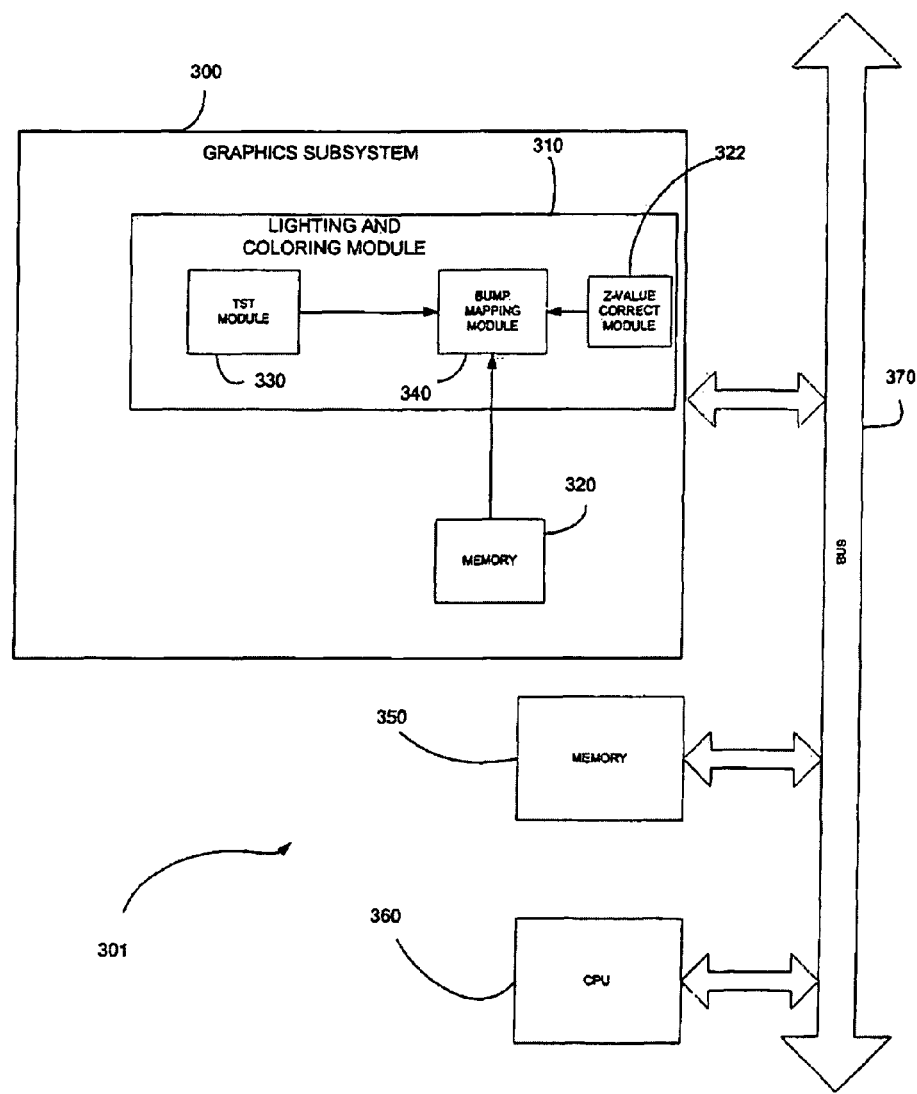
FIG. 3 is a schematic diagram showing an exemplary system for implementing bump mapping in tangent space according to one embodiment.

FIG. 3 is a schematic diagram showing an exemplary system 301 for implementing bump mapping in tangent space according to one embodiment. As shown, a graphics subsystem 300, system memory 350, and a central processing unit (CPU) 360 are coupled via a bus 370. In one embodiment, the graphics subsystem 300 may include a hardware graphics accelerator. Strictly as an option, the hardware graphics accelerator may include a transform module, lighting module, and a rasterizer module on a single semiconductor platform.

As shown, the graphics subsystem 300 includes a variety of components. In one embodiment, a lighting and coloring module 310 may be provided including a tangent space transform (TST) module 330 and a bump mapping module 340 which operate in a manner that is well known to those of ordinary skill. The graphics subsystem 300 further includes a depth-value correction module 322. The manner in which the depth-value correction module 322 operates will be set forth hereinafter in greater detail. Also included is a memory 320 that stores output produced by the bump mapping module 340 in addition to output produced by the depth-value correction module 322.

The bump mapping module 340 and memory 320 work together to store bump maps by storing a normal vector in a texture map. Conventional RGB values describe a normal vector relative to a coordinate frame defined at the vertices of the primitive, i.e. triangle. Three vectors including tangent, normal, and binormal vectors are interpolated, and the vector read from the texture map is then rotated by taking its dot product with each of the interpolated vectors, in turn. The result is the bump mapped normal which may be then processed by the lighting and coloring module 310 in a conventional manner.

Figure 4:
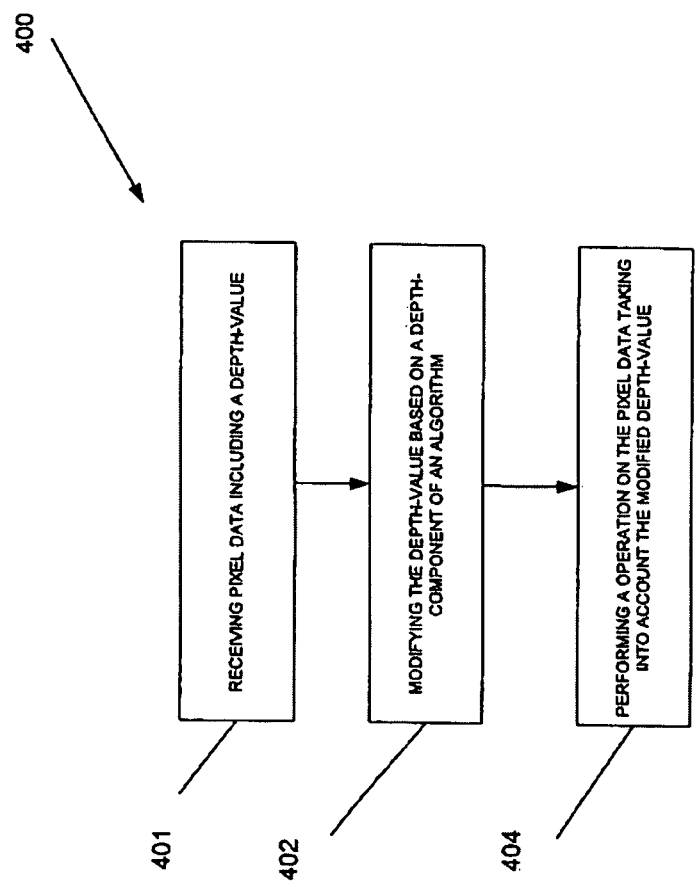
FIG. 4 is a flowchart illustrating a method for modifying depth-values in addition to the normal values during bump mapping in accordance with one embodiment.

FIG. 4 is a flowchart 400 illustrating a method for computer graphics processing using the depth-value correction module 322 of FIG. 3. First, in operation 401, pixel data is received including a depth-value. It should be noted that the depth value may include, but is not limited to a z-value, w-value, and/or any other value indicative of depth at least in part.

Thereafter, the depth-value is modified based on a depth-component of an algorithm. See operation 402. Such algorithm may include a bump map algorithm, texturing algorithm, etc. It should be noted, however, that any other desired algorithm may be utilized.

An operation is subsequently performed on the pixel data taking into account the modified depth-value, as indicated in operation 404. In one embodiment, the operation may include a lighting operation. It should be noted, however, that the operation may take any form such as a hidden surface (z-test) calculation, shadow map operations, etc. A hidden surface calculation may determine visibility of various objects or portions thereof on the display device. Shadow map operations determine visibility with respect to another viewpoint such as a light source, thus permitting shadowing. During use, the foregoing operations function in a conventional manner, with the exception of using a modified depth-value as opposed to the original depth-value.

In one embodiment that computes a change in depth values, a height map can be applied to a graphics primitive. A height map can be a two-dimensional array of scalar values, where the scalar represents a distance. Height maps can be extended to multi-resolution MIP maps, as is typically done with color-based texture maps. The following example using FIGS. 4A through 4E are shown in two dimensions for clarity, but it is understood that these operations generally take place in three dimensions (or, four dimensions if "w" is counted).

Figure 4A:
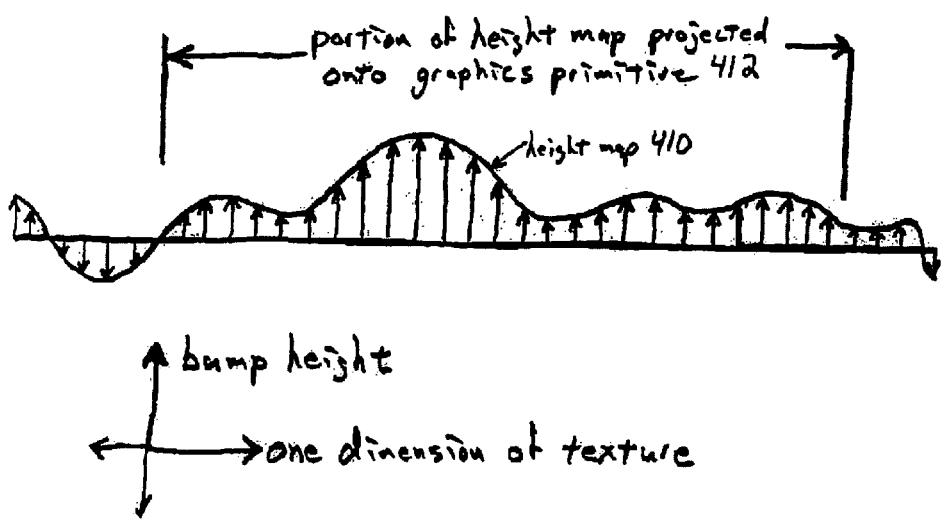
FIG. 4A is an example of one dimension of a scalar height map.
Figure 4B:
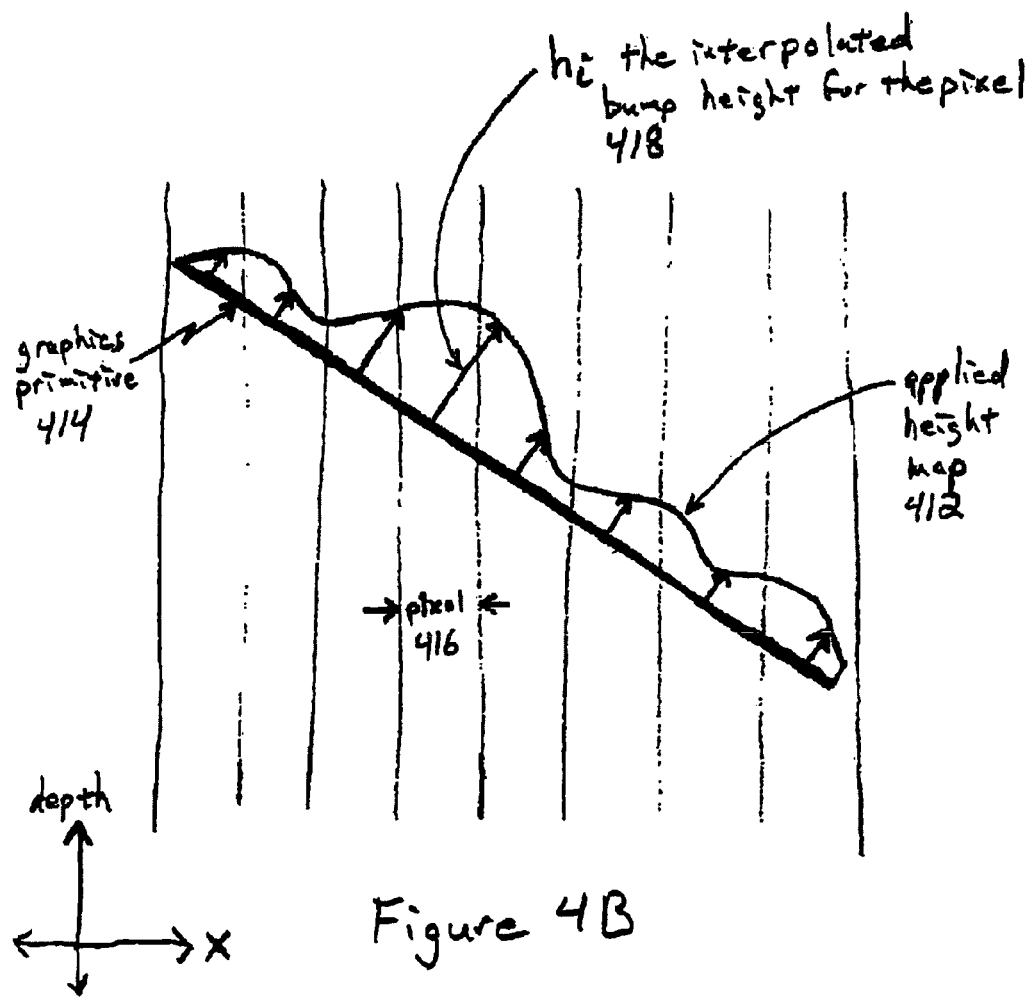
FIG. 4B is an example of two dimensions of a graphics primitive with an applied portion of a height map.
Figure 4C:
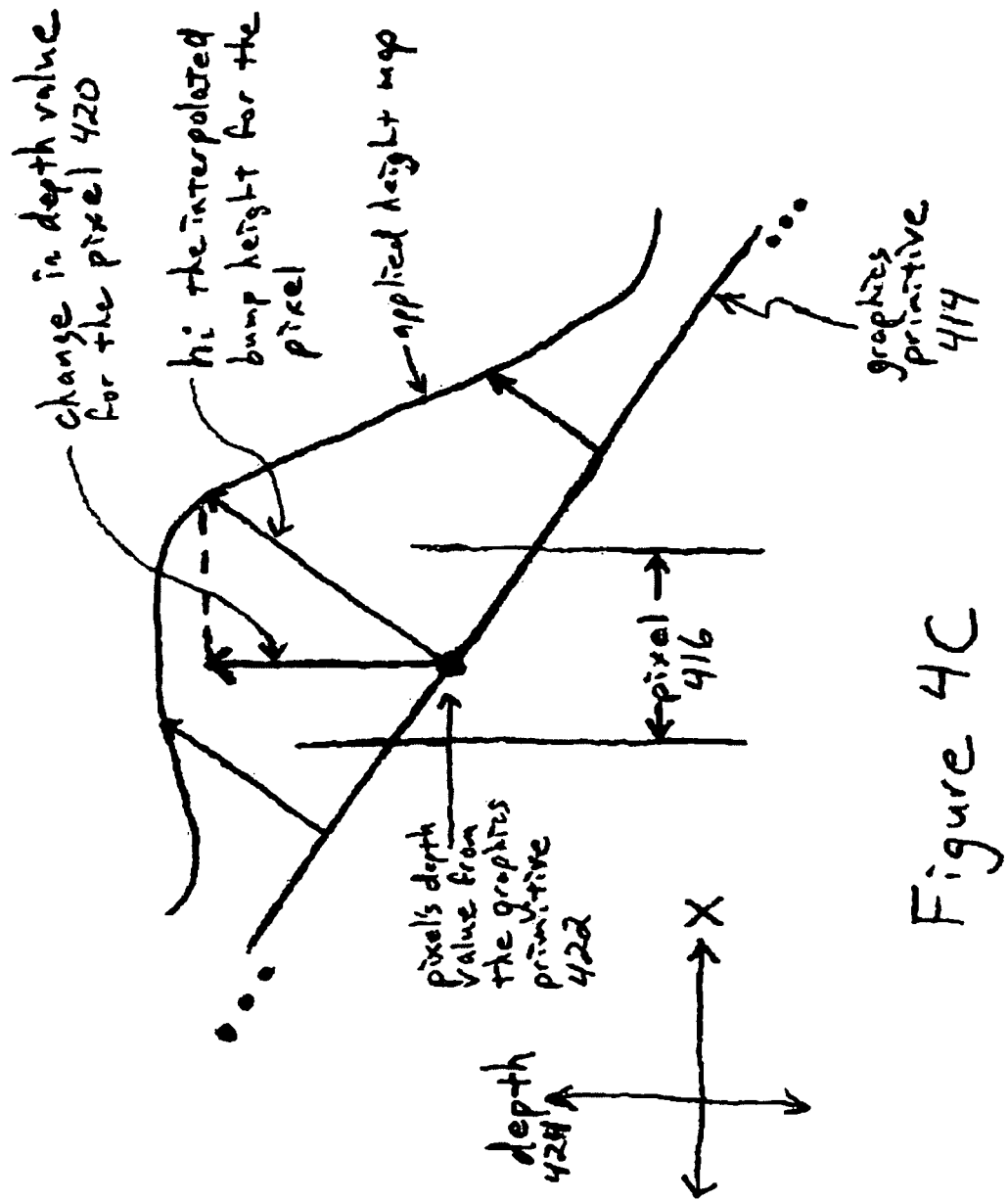
FIG. 4C is an example of two dimensions of a graphics primitive with an applied portion of a height map, showing, for an example pixel, a change in depth value derived from a height value.

FIG. 4A shows an example of one dimension of a scalar height map 410 (the arrows in FIG. 4A are height values at particular sample locations of the height map 410). By using texture coordinates, a portion 412 of the height map 410 is applied to a graphics primitive 414, as shown in FIG. 4B. For a pixel fragment 416 in the graphics primitive 414, a height value $h_i$ 418 is generated from the height map 412 samples, generally by interpolation of a plurality of values, possibly from multiple MIP levels. As shown in FIG. 4C, a change 420 in depth value 422 for the pixel fragment 416 is computed by taking the component of the height value $h_i$ 418 that is in the direction of the depth dimension 424. The depth value 422 from the graphics primitive 414 is changed by this computed amount 420, and this changed depth value is used for other operations (e.g., lighting and depth test). The operations for this embodiment comprise: determining a height parameter (scalar or vector); computing a depth-direction component of the height parameter; and modifying a depth value of a pixel by using the computed component.

Figure 4D:
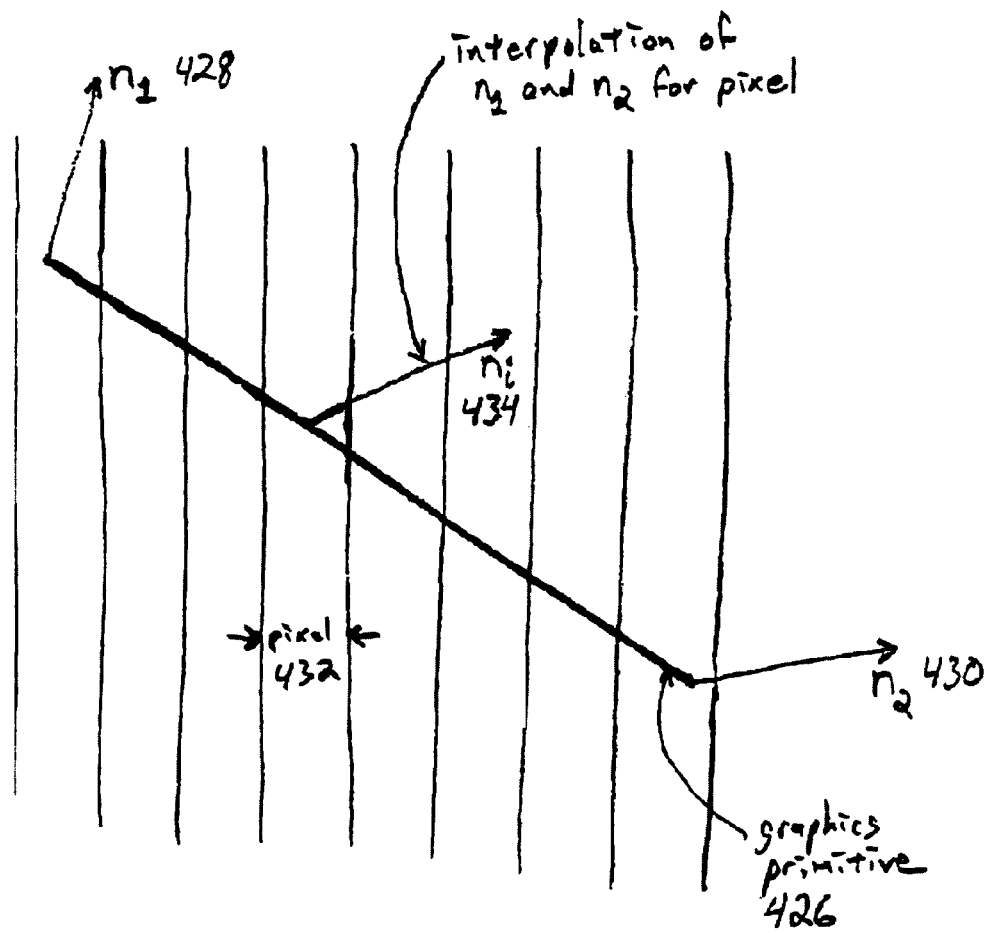
FIG. 4D is an example of two dimensions of a graphics primitive, the graphics primitive having surface normals that are interpolated, showing an interpolated normal for one pixel.
Figure 4E:
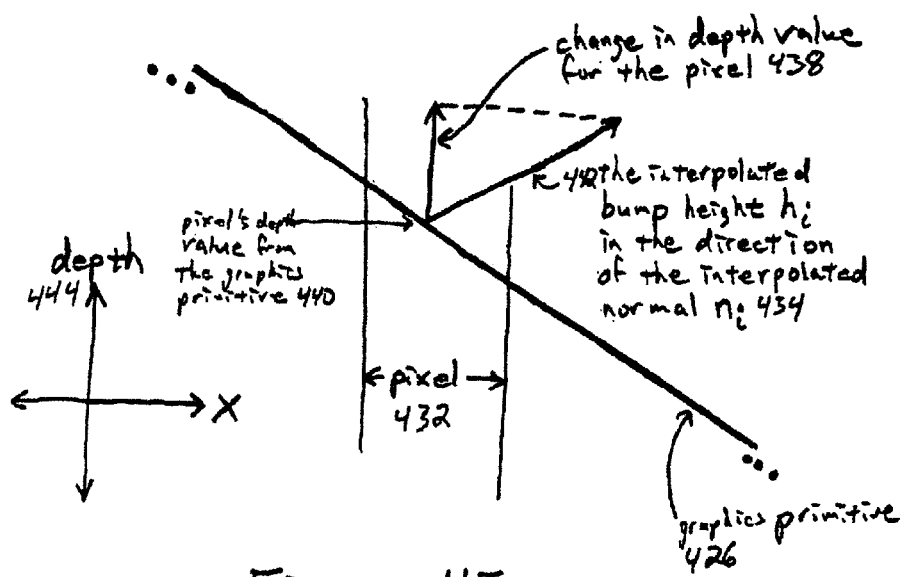
FIG. 4E is an example of two dimensions of a graphics primitive, showing, for an example pixel, a bump height applied in the direction of an interpolated and/or perturbed normal and a changed in depth value.

A graphics primitive 426 may have surface normals 428 and 430 associated with it, as shown in FIG. 4D. For a pixel 432, a normal 434 is generated from the primitive's 426 normals 428 and 430 (any of the vector interpolation methods known in the art can be applied here, including the interpolation of basis vectors that are not shown in the diagram). As shown in FIG. 4E, the height value $h_t$ 442 is considered to be in the direction of the pixel's normal 434. A change 438 in depth value 440 for the pixel fragment 432 is computed by taking the component of the height value $h_t$ 442 that is in the direction of the depth dimension 444. The depth value 440 from the graphics primitive 426 is changed by this computed change 438, and this changed depth value is used for other operations (e.g., lighting and depth test). The operations for this embodiment comprise: determining a height parameter (scalar or vector); computing a normal for a pixel; computing a depth-direction component of the height parameter, where the height parameter is dependent upon the normal; and modifying a depth value of a pixel by using the computed component.

The above embodiments (exemplified in FIGS. 4A through 4E) described operations performed on pixel fragments, but alternate embodiments may apply the technique to individual samples, groups of samples, individual pixels, groups of pixels, and groups of samples that span multiple pixels.

As another alternate embodiment, bump mapping can be applied after normal interpolation and before the change in depth value is computed. The operations for this embodiment comprise: determining a height parameter (scalar or vector); computing a normal for a pixel; perturbing the normal in response to a texture map value; computing a depth-direction component of the height parameter, where the height parameter is dependent upon the perturbed normal; and modifying a depth value of a pixel by using the computed component.

As an alternate embodiment, the height map can be a component in a bump map. For example, each element of a bump map can comprise a direction and a magnitude, the magnitude being used to compute a change in the depth value of a pixel.

It is contemplated that the computations described herein can be done in many different coordinate systems, including combinations of coordinate systems. For example, the computations can be done in: eye coordinates; clip coordinates; device coordinates; tangent space coordinates; world coordinates; light coordinates; and any other types of coordinate systems as described in the OpenGL specification and its extensions.

It is also contemplated that graphics primitives are not limited to planar polygons. Alternate graphics primitives, for alternate embodiments, include: quadratic patches; constructive solid geometry surfaces; and other higher order primitives.

In one embodiment, a technique for modifying or correcting the depth-values can be obtained by perturbing eye-space value $p_e$ using Equation #1, where $\Delta$ is a texture-map-derived value and $n_e$ is a normal vector in eye space.

$$p'_e = p_e + \Delta n_e \qquad \text{Equation \#1}$$

Perturbed eye-space value $p'_e$ may then be run through a projection transform, $T_{proj}$, associated with a viewing transformation that transforms the depth values from eye space to clip space. Clip-space $z_c$ and $w_c$ are thus extracted.

Thereafter, $z_c$ and $w_c$ are used to generate $z'_c$ and $w'_c$ which are defined by Equations #2.

$$z'_c = z_c + \Delta(n \cdot T_{proj}[3]) \qquad \text{Equations \#2}$$
$$w'_c = w_c + \Delta(n \cdot T_{proj}[4])$$

To perform per pixel calculation, $z_c$ and $n \cdot T_{proj}[3]$ are iterated, and the value of $\Delta$ is read from a texture map. Here, the "3" and "4" indicate 3-dimensional and 4-dimensional transformations, the 4-dimensional transformation being in a homogeneous coordinate system.

In an alternate embodiment, bump mapping may be used in conjunction with displacement mapping. The displacement mapping may occur at one level of detail and filtering. Since the z-texture contains total displacements, there may be a mechanism to take this partial (filtered) displacement into account. In such a situation, the vertices of the triangle may have already sampled the bump map once, and that earlier displacement may be subtracted from $\Delta$ in Equations #2. The result is set forth in Equations #3.

$$z'_c = z_c + \Delta_B(n \cdot T_{proj}[3]) - \Delta_D(n \cdot T_{proj}[3]) \qquad \text{Equations \#3}$$
$$w'_c = w_c + \Delta_B(n \cdot T_{proj}[4]) - \Delta_D(n \cdot T_{proj}[3])$$

The values $\Delta_D$ are displacements already applied. The values $\Delta_B$ are values read in from the z-texture map.

It should be noted that the final depth value used and stored in the frame buffer may be computed by taking $z_c/w_c$ with some appropriate scale and bias to place it in window coordinates. Further information regarding this chain of transformations may be found in the OpenGL® specification. Further, it should be understood that modifying the depth value may allow the lighting operation to display the interaction of displayed objects. Further, the modified depth value may allow the lighting operation to display bumpy shadows when applied to a shadow algorithm.

The present embodiment thus permits the per-pixel adjustment of the depth value of a polygon. The depth value of a polygon normally varies linearly, i.e. the polygon is planar. The present embodiment represents a mechanism by which the depth value is adjusted using a map, and the amount of adjustment is proportional/correct based on pre-projection coordinates. In effect, the modification has the projection transformation applied to it. It should be noted that this technique may be applied in contexts beyond bump mapping.

Embodiments for Application Program Interfaces

The following description is set forth in the context of OpenGL® which is commonly known to those of ordinary skill. More particularly, the following information is set forth in the context of the OpenGL® Specification Version 1.2.1, which is incorporated herein by reference in its entirety. It should be noted that, in the present description, OpenGL® API commands and tokens are prefixed by "gl" and "GL_," respectively. Also, OpenGL® extension commands and tokens are, by convention, suffixed by "NV" or "_NV," respectively. When the context is clear, such prefixes and suffices are dropped for brevity and clarity.

Embodiment #1

As an option, the following embodiment may be implemented in the context of the following which are incorporated herein by reference it their entirety:
OpenGL® 1.2.1 specification.
ARBmultitexture extension ARB_texture_cube_map extension
NV_register_combiners
EXT_texture_lod_bias
ARB_texture_env_combine and/or EXT_texture_env_combine
NV_texture_env_combine4.
ARB_texture_env_add and/or EXT_texture_env_add
NV_texture_rectangle Standard OpenGL® and the ARB_multitexture extension define a straightforward direct mechanism for mapping sets of texture coordinates to filtered colors. This extension provides a more functional mechanism.

OpenGL's® standard texturing mechanism defines a set of texture targets. Each texture target defines how the texture image is specified and accessed via a set of texture coordinates. OpenGL® 1.0 defines the 1D and 2D texture targets. OpenGL® 1.2.1 (and/or the EXT_texture3D extension) defines the 3D texture target. The RB_texture_cube_map extension defines the cube map texture target. Each texture unit's texture coordinate set is mapped to a color using the unit's highest priority enabled texture target.

This extension introduces texture shader stages. A sequence of texture shader stages provides a more flexible mechanism for mapping sets of texture coordinates to texture unit RGBA results than standard OpenGL®.

When the texture shader enable is on, the extension replaces the conventional OpenGL® mechanism for mapping sets of texture coordinates to filtered colors with this extension's sequence of texture shader stages.

Each texture shader stage runs one of 21 texture shader programs. These programs support conventional OpenGL® texture mapping but also support dependent texture accesses, dot product texture programs, and special modes. (3D texture mapping texture shader operations are not necessarily provided by this extension; 3D texture mapping texture shader operations are added by the NV_texture_shader2 extension that is layered on this extension. See the NV_texture_shader2 specification (See EMBODIMENT #2).

To facilitate the new texture shader programs, this extension introduces several new texture formats and variations on existing formats. Existing color texture formats are extended by introducing new signed variants. Two new types of texture formats (beyond colors) are also introduced. Texture offset groups encode two signed offsets, and optionally a magnitude or a magnitude and an intensity. The new HILO (pronounced high-low) formats provide possibly signed, high precision (16-bit) two-component textures.

Each program takes as input the stage's interpolated texture coordinate set (s,t,r,q). Each program generates two results: a shader stage result that may be used as an input to subsequent shader stage programs, and a texture unit RGBA result that becomes the texture color used by the texture unit's texture environment function or becomes the initial value for the corresponding texture register for register combiners. The texture unit RGBA result may be an RGBA color, but the shader stage result may be one of an RGBA color, a HILO value, a texture offset group, a floating-point value, or an invalid result.

When both results are RGBA colors, the shader stage result and the texture unit RGBA result are usually identical (though not in all cases).

Additionally, certain programs have a side-effect such as culling the fragment or replacing the fragment's depth value.

The twenty-one programs will now be described in Table #1.

TABLE #1

<none>

1. NONE - May generate a (0, 0, 0, 0) texture unit RGBA result. Equivalent to disabling all texture targets in conventional OpenGL ®.

<conventional textures>

2. TEXTURE_1D - Accesses a 1D texture via (s/q).
3. TEXTURE_2D - Accesses a 2D texture via (s/q, t/q).
4. TEXTURE_RECTANGLE_NV - Accesses a rectangular texture via (s/q, t/q).
5. TEXTURE_CUBE_MAP_ARB - Accesses a cube map texture via (s, t, r).

<special modes>

6. PASS_THROUGH_NV - Converts a texture coordinate (s, t, r, q) directly to a [0, 1] clamped (r, g, b, a) texture unit RGBA result.
7. CULL_FRAGMENT_NV - Culls the fragment based on the whether each (s, t, r, q) is "greater than or equal to zero" or "less than zero".

<offset textures>

8. OFFSET_TEXTURE_2D_NV - Transforms the signed (ds, dt) components of a previous texture unit by a 2 × 2 floating-point matrix and then uses the result to offset the stage's texture coordinates for a 2D non-projective texture.
9. OFFSET_TEXTURE_2D_SCALE_NV - Same as above except the magnitude component of the previous texture unit result scales the red, green, and blue components of the unsigned RGBA texture 2D access.
10. OFFSET_TEXTURE_RECTANGLE_NV - Similar to OFFSET_TEXTURE_2D_NV except that the texture access is into a rectangular non-projective texture.
11. OFFSET_TEXTURE_RECTANGLE_SCALE_NV - Similar to OFFSET_TEXTURE_2D_SCALE_NV except that the texture access is into a rectangular non-projective texture.

<dependent textures>

12. DEPENDENT_AR_TEXTURE_2D_NV - Converts the alpha and red components of a previous shader result into an (s, t) texture coordinate set to access a 2D non-projective texture.
13. DEPENDENT_GB_TEXTURE_2D_NV - Converts the green and blue components of a previous shader result into an (s, t) texture coordinate set to access a 2D non-projective texture.

<dot product textures>

14. DOT_PRODUCT_NV - Computes the dot product of the texture shader's texture coordinate set (s, t, r) with some mapping of the components of a previous texture shader result. The component mapping depends on the type (RGBA or HILO) and signedness of the stage's previous texture input. Other dot product texture programs use the result of this program to compose a texture coordinate set for a dependent texture access. The color result is undefined.
15. DOT_PRODUCT_TEXTURE_2D_NV - When preceded by a DOT_PRODUCT_NV program in the previous texture shader stage, computes a second similar dot product and composes the two dot products into (s, t) texture coordinate set to access a 2D non-projective texture.
16. DOT_PRODUCT_TEXTURE_RECTANGLE_NV - Similar to DOT_PRODUCT_TEXTURE_2D_NV except that the texture access is into a rectangular non-projective texture.
17. DOT_PRODUCT_TEXTURE_CUBE_MAP_NV - When preceded by two DOT_PRODUCT_NV programs in the previous two texture shader stages, computes a third similar dot product and composes the three dot products into (s, t, r) texture coordinate set to access a cube map texture.
18. DOT_PRODUCT_REFLECT_CUBE_MAP_NV - When preceded by two DOT_PRODUCT_NV programs in the previous two texture shader stages, computes a third similar dot product and composes the three dot products into a normal vector (Nx, Ny, Nz). An eye vector (Ex, Ey, Ez) is composed from the q texture coordinates of the three stages. A reflection vector (Rx, Ry, Rz) is computed based on the normal and eye vectors. The reflection vector forms an (s, t, r) texture coordinate set to access a cube map texture.
19. DOT_PRODUCT_CONST_EYE_REFLECT_CUBE_MAP_NV - Operates like DOT_PRODUCT_REFLECT_CUBE_MAP_NV except that the eye vector (Ex, Ey, Ez) is a user-defined constant rather than composed from the q coordinates of the three stages.
20. DOT_PRODUCT_DIFFUSE_CUBE_MAP_NV - When used instead of the second DOT_PRODUCT_NV program preceding a

TABLE #1-continued

DOT_PRODUCT_REFLECT_CUBE_MAP_NV or
DOT_PRODUCT_CONST_EYE_REFLECT_CUBE_MAP_NV
stage, the normal vector forms an (s, t, r) texture coordinate set to
access a cube map texture.
<dot product depth replace>

21. DOT_PRODUCT_DEPTH_REPLACE_NV - When preceded by a
DOT_PRODUCT_NV program in the previous texture shader stage,
computes a second similar dot product and replaces the fragment's
window-space depth value with the first dot product results
divided by the second. The texture unit RGBA result is (0, 0, 0, 0).

Following is the conceptual framework that NVIDIA® OpenGL® extensions use to describe shading: Shading is the process of assigning colors to pixels, fragments, or texels. The texture shaders functionality assigns colors to texture unit results (essentially texture shading). These texture unit RGBA results can be used by fragment coloring (fragment shading). The resulting fragments are used to update pixels (pixel shading) possibly via blending and/or multiple rendering passes.

The goal of these individual shading operations is per-pixel shading. Per-pixel shading is accomplished by combining the texture shading, fragment shading, and pixel shading operations, possibly with multiple rendering passes.

Programmable shading is a style of per-pixel shading where the shading operations are expressed in a higher level of abstraction than "raw" OpenGL® texture, fragment, and pixel shading operations. In one view, programmable shading does not necessarily require a "pixel program" to be downloaded and executed per-pixel by graphics hardware. Indeed, there are many disadvantages to such an approach in practice. An alternative view of programmable shading (the one that is being disclosed) treats the OpenGL® primitive shading operations as a SIMD machine and decomposes per-pixel shading programs into one or more OpenGL® rendering passes that map to "raw" OpenGL® shading operations. It is believed that conventional OpenGL® combined with NV_register_combiners (SEE APPENDIX A) and NV_texture_shader (and further augmented by programmable geometry via NV_vertex_program and higher-order surfaces via NV_evaluators) can become the hardware basis for a powerful programmable shading system.

As an option, programmable shading using NV_texture_shader, NV_register_combiners, and other extensions may be supported as the hardware basis for a system.

Table #2 illustrates a plurality of terms that may be pertinent in the context of the present embodiments.

TABLE #2 texture shaders - A series of texture shader stages that map
texture coordinate sets to texture unit RGBA results. An
alternative to conventional OpenGL ® texturing.
texture coordinate set - The interpolated (s, t, r, q) value
for a particular texture unit of a particular fragment.
conventional OpenGL ® texturing - The conventional mechanism
used by OpenGL ® to map texture coordinate sets to texture unit
RGBA results whereby a given texture unit's texture coordinate set
is used to access the highest priority enabled texture target to
generate the texture unit's RGBA result. Conventional OpenGL ®
texturing supports 1D, 2D, 3D, and cube map texture targets. In
conventional OpenGL ® texturing each texture unit operates
independently.
texture target type - One of the four texture target types:
1D, 2D, 3D, and cube map. (Note that NV_texture_shader does NOT
provide support for 3D textures; the NV_texture_shader2 extension
adds texture shader operations for 3D texture targets.) See
EMBODIMENT #2.

TABLE #2-continued texture internal format - The internal format of a
particular texture object. For example, GL_RGBA8,
GL_SIGNED_RGBA8, or GL_SIGNED_HILO16_NV.
texture format type - One of the three texture format types:
RGBA, HILO, or texture offset group.
texture component signedness - Whether or not a given
component of a texture's texture internal format is signed or not.
Signed components are clamped to the range [−1, 1] while unsigned
components are clamped the range [0, 1].
texture shader enable - The OpenGL ® enable that determines
whether the texture shader functionality (if enabled) or
conventional OpenGL ® texturing functionality (if disabled) is used
to map texture coordinate sets to texture unit RGBA results. The
enable's initial state is disabled.
texture shader stage - Each texture unit has a corresponding
texture shader stage that can be loaded with one of 21 texture
shader operations. Depending on the stage's texture shader
operation, a texture shader stage uses the texture unit's
corresponding texture coordinate set and other state including the
texture shader results of previous texture shader stages to
generate the stage's particular texture shader result and texture
unit RGBA result.
texture unit RGBA result - A (typically fixed-point) color
result generated by either a texture shader or conventional
OpenGL ® texturing. This is the color that becomes the texture
unit's texture environment function texture input or the initial
value of the texture unit's corresponding texture register in the
case of register combiners.
texture shader result - The result of a texture shader stage
that may be used as an input to a subsequent texture shader stage.
This result is distinct from the texture unit RGBA result. The
texture shader result may be one of four types: an RGBA color
value, a HILO value, a texture offset group value, or a floating-
point value. A few texture shader operations are defined to
generate an invalid texture shader result.
texture shader result type - One of the four texture shader
result types: RGBA color, HILO, texture offset group, or floating-
point.
texture shader operation - One of 21 fixed programs that
maps a texture unit's texture coordinate set to a texture shader
result and a texture unit RGBA result.
texture consistency - Whether or not the texture object for
a given texture target is consistent. The rules for determining
consistency depend on the texture target and the texture object's
filtering state. For example, a mipmapped texture is inconsistent
if its texture levels do not form a consistent mipmap pyramid.
Also, a cube map texture is inconsistent if its (filterable)
matching cube map faces do not have matching dimensions.
texture shader stage consistency - Whether or not a texture
shader stage is consistent or not. The rules for determining
texture shader stage consistency depend on the texture shader
stage operation and the inputs upon which the texture shader
operation depends. For example, texture shader operations that
depend on accessing a given texture target are not consistent if
the given texture target is not consistent. Also, a texture
shader operation that depends on a particular texture shader
result type for a previous texture shader result is not consistent
if the previous texture shader result type is not appropriate or
the previous texture shader stage itself is not consistent. If a
texture shader stage is not consistent, it operates as if the
operation is the GL_NONE operation.
previous texture input - Some texture shader operations
depend on a texture shader result from a specific previous texture
input designated by the GL_PREVIOUS_TEXTURE_INPUT_NV state.

Options

While the default state may be any desired state, texture shaders may be disabled with all stages set to GL_NONE.

Since mipmapping of dependent texture fetches is supported, the mipmap lambda parameter may be computed for dependent texture fetches.

Something similar to DirectX 6's® so-called bump environment mapping can be emulated with the GL_OFFSET_TEXTURE_2_DNV texture shader.

A more correct form of bump environment mapping can be implemented by using the following texture shaders:
  texture unit 0: GL_TEXTURE_2D texture unit 1: GL_DOT_PRODUCT_NV
texture unit 2: GL_DOT_PRODUCT_DIFFUSE_CUBE_MAP_NV
texture unit 3: GL_DOT_PRODUCT_REFLECT_CUBE_MAP_NV Texture unit 0 may use a normal map for its 2D texture. A GL_SIGNED_RGB texture can encode signed tangent-space normal perturbations. Or for more precision, a GL_SIGNED_HILO_NV texture can encode the normal perturbations in hemisphere fashion.

The tangent (Tx,Ty,Tz), binormal (Bx,By,Bz), and normal (Nx,Ny,Nz) that together map tangent-space normals to cube map-space normals may be sent as texture coordinates s1, t1, r1, s2, t2, r2, s3, t3, and r3 respectively. Typically, cube map space is aligned to match world space.

The (unnormalized) cube map-space eye vector (Ex,Ey,Ez) may be sent as texture coordinates q1, q2, and q3 respectively.

A vertex programs (using the NV_vertex_program extension) can compute and assign the required tangent, binormal, normal, and eye vectors to the appropriate texture coordinates. Conventional OpenGL® evaluators (or the NV_evaluators extension) can be used to evaluate the tangent and normal automatically for Bezier patches. The binormal is the cross product of the normal and tangent.

Texture units 1, 2, and 3, may also all specify GL_TEXTURE0_ARB (the texture unit accessing the normal map) for their GL_PREVIOUS_TEXTURE_INPUT_NV parameter.

The three dot product texture shader operations performed by the texture shaders for texture units 1, 2, and 3 form a 3×3 matrix that transforms the tangent-space normal (the result of the texture shader for texture unit 0). This rotates the tangent-space normal into a cube map-space.

Texture unit 2's cube map texture may encode a pre-computed diffuse lighting solution. Texture unit 3's cube map texture may encode a pre-computed specular lighting solution. The specular lighting solution can be an environment map.

Texture unit 2 is accessed using the cube map-space normal vector resulting from the three dot product results of the texture shaders for texture units 1, 2, and 3. (While normally texture shader operations are executed in order, preceding GL_DOT_PRODUCT_REFLECT_CUBE_MAP_NV by GL_DOT_PRODUCT_DIFFUSE_CUBE_MAP_NV is a special case where a dot product result from texture unit 3 influences the cube map access of texture unit 2.)

Texture unit 3 is accessed using the cube map-space reflection vector computed using the cube map-space normal vector from the three dot product results of the texture shaders for texture units 1, 2, and 3 and the cube-map space eye-vector (q1,q2,q3).

Note that using cube maps to access the diffuse and specular illumination obviates the need for an explicit normalization of the typically unnormalized cube map-space normal and reflection vectors.

The register combiners (using the NV_register_combiners extension) can combine the diffuse and specular contribution available in the GL_TEXTURE2_ARB and GL_TEXTURE3_ARB registers respectively. A constant ambient contribution can be stored in a register combiner constant. The ambient contribution could also be folded into the diffuse cube map.

If desired, the diffuse and ambient contribution can be modulated by a diffuse material parameter encoded in the RGB components of the primary color.

If desired, the specular contribution can be modulated by a specular material parameter encoded in the RGB components of the secondary color.

While this is all quite complicated, the result is a true bump environment mapping technique with excellent accounting for normalization and per-vertex interpolated diffuse and specular materials. An environment and/or an arbitrary number of distant or infinite lights can be encoded into the diffuse and specular cube maps.

In one exemplary embodiment, GL_DOT_PRODUCT_DIFFUSE_CUBE_MAP_NV may be forced to be used only in conjunction with GL_DOT_PRODUCT_REFLECT_CUBE_MAP_NV. Further, GL_DOT_PRODUCT_DIFFUSE_CUBE_MAP_NV stage may rely on a result computed in the following stage.

The GL_DOT_PRODUCT_DIFFUSE_CUBE_MAP_NV and GL_DOT_PRODUCT_REFLECT_CUBE_MAP_NV operations may be though of as forming a compound operation. The idea is to generate two cube map accesses based on a perturbed normal and reflection vector where the reflection vector is a function of the perturbed normal vector. To minimize the number of stages (three stages only) and reuse the internal computations involved, this is treated as a compound operation.

It should be noted that the GL_DOT_PRODUCT_REFLECT_CUBE_MAP_NV vector can be preceded by two GL_DOT_PRODUCT_NV operations instead of a GL_DOT_PRODUCT_NV operation then a GL_DOT_PRODUCT_DIFFUSE_CUBE_MAP_NV operation. This may be more efficient when only the cube map access using the reflection vector is required (a shiny object without any diffuse reflectance).

It should also be noted that if only the diffuse reflectance cube map access is required, this can be accomplished by simply using the GL_DOT_PRODUCT_CUBE_MAP_NV operation preceded by two GL_DOT_PRODUCT_NV operations.

The texture shader stages may map to register combiner texture registers in a variety of ways. For example, if GL_TEXTURE_SHADER_NV is enabled, the texture unit RGBA result for a each texture stage may be used to initialize the respective texture register in the register combiners.

So if a texture shader generates a texture unit RGBA result for texture unit 2, GL_TEXTURE2_ARB may be used for the name of the register value in register combiners.

The number of shader stages may or may not be settable. As an option, unused stages can be set to GL_NONE.

Signed RGBA texture components may show up in the register combiners texture registers in a variety of ways. For example, they may show up as signed values. One can use GL_SIGNED_IDENTITY_NV and get to the signed value directly.

The texture unit RGBA result of a GL_NONE, GL_CULL_FRAGMENT_NV, DOT_PRODUCT_NV, or GL_DOT_PRODUCT_DEPTH_REPLACE_NV texture shader operation may show up in the register combiners texture registers is a various ways. For example, they may show up as the value (0,0,0,0).

How the texture RGBA result of the GL_NONE, GL_CULL_FRAGMENT_NV, GL_DOT_PRODUCT_NV, and GL_DOT_PRODUCT_DEPTH_REPLACE_NV texture shader operations shows up in the texture environment may (or may not be) an issue, because the texture environment operation is assumed to be GL_NONE when the corresponding texture shader is one of GL_NONE, GL_CULL_FRAGMENT_NV, GL_DOT_PRODUCT_NV, or GL_

DOT_PRODUCT_DEPTH_REPLACE_NV when GL_TEXTURE_SHADER_NV is enabled.

New pixel groups (the HMO and texture offset groups) may be introduced for various reasons. For example, in core OpenGL®, texture image data is transferred and stored as sets of color components. Such color data can be promoted to RGBA data.

In addition to color components, there are other types of image data in OpenGL® including depth components, stencil components, and color indices. Depth and stencil components can be used by glReadPixels, glDrawPixels, and glCopyPixels, but are less useful for storing texture data in core OpenGL®. The EXT_paletted_texture and EXT_index_texture extensions extend the contents of textures to include indices (even though in the case of EXT_paletted_texture, texel fetches are eventually expanded into color components by the texture palette).

However this these existing pixel groups may not be sufficient for all the texture shader operations introduced by this extension. Certain texture shader operations may require texture data that is not merely a set of color components. The dot product (GL_DOT_PRODUCT_NV, etc) operations both can utilize high-precision hi and lo components. The offset texture operations (GL_OFFSET_TEXTURE_2D_NV, GL_OFFSET_TEXTURE_2D_SCALE_NV, GL_OFFSET_TEXTURE_RECTANGLE_NV, and GL_OFFSET_TEXTURE_RECTANGLE_SCALE_NV) may require textures containing signed offsets used to displace texture coordinates. The GL_OFFSET_TEXTURE_2D_SCALE_NV and GL_OFFSET_TEXTURE_RECTANGLE_S-CALE_NV may also require an unsigned magnitude for the scaling operation.

To facilitate these new texture representations, this extension introduces several new (external) formats, pixel groups, and internal texture formats. An (external) format is the external representation used by an application to specify pixel data for use by OpenGL®. A pixel group is a grouping of components that are transformed by OpenGL's® pixel transfer mechanism is a particular manner. For example, RGBA components for colors are transformed differently than stencil components when passed through OpenGL's® pixel transfer mechanism. An internal texture format is the representation of texture data within OpenGL®. It should be noted that the (external) format used to specify the data by the application may be different than the internal texture format used to store the texture data internally to OpenGL®. For example, core OpenGL® permits an application to specify data for a texture as GL_LUMINANCE_ALPHA data stored in GLfloats even though the data is to be store in a GL_RGBA8 texture. OpenGL's® pixel unpacking and pixel transfer operations perform an appropriate transformation of the data when such a texture download is performed. Also, it should be noted that data from one pixel group (say stencil components) may not necessarily be able to be supplied as data for a different pixel group (say RGBA components).

This extension introduces four new (external) formats for texture data: GL_HILO_NV, GL_DSDT_NV, GL_DSDT_MAG_NV, and GL_DSDT_MAG_VIB_NV.

GL_HILO_NV is adapted for specifying high-precision hi and lo components. The other three formats are used to specify texture offset groups. These new formats can be used for specifying textures (not copying, reading, or writing pixels).

Each of these four pixel formats belong to one of two pixel groups. Pixels specified with the GL_HILO_NV format are transformed as HILO components. Pixels specified with the DSDT_NV, DSDT_MAG_NV, and DSDT_MAG_VIB_NV formats are transformed as texture offset groups.

The HILO component and texture offset group pixel groups have independent scale and bias operations for each component type. Various pixel transfer operations that are performed on the RGBA components pixel group are not necessarily performed on these two new pixel groups. OpenGL's® pixel map, color table, convolution, color matrix, histogram, and min/max are not necessarily performed on the HILO components or texture offset group pixel groups.

There are four internal texture formats for texture data specified as HILO components: GL_HILO_NV, GL_HILO16_NV, GL_SIGNED_HILO_NV, and GL_SIGNED_HILO16_NV. The HILO data can be stored as either unsigned [0,1] value or [−1,1] signed values. There are also enumerants for both explicitly sized component precision (16-bit components) and unsized component precision. OpenGL® implementations are expected to keep HILO components are high precision even if an unsized internal texture format is used.

The expectation with HILO textures is that applications will specify HILO data using a type of GL_UNSIGNED_SHORT or GL_SHORT or larger data types. Specifying HILO data with GL_UNSIGNED_BYTE or GL_BYTE works but does not necessarily exploit the full available precision of the HILO internal texture formats.

There are six internal texture formats for texture data specified as texture offset groups: GL_DSDT_NV, GL_DSDT8_NV, GL_DSDT_MAG_NV, GL_DSDT8_MAG8_NV, GL_DSDT_MAG_INTENSITY_NV and GL_DSDT8_MAG8_INTENSITY8_NV. The GL_DSDT_NV formats specify two signed [−1,1] components, ds and dt, used to offset s and t texture coordinates. The GL_DSDT_MAG_NV formats specify an additional third unsigned [0,1] component that is a magnitude to scale an unsigned RGBA texture fetch by. The GL_DSDT_MAG_INTENSITY_NV formats specify an additional fourth [0,1] unsigned component, intensity, that becomes the intensity of the fetched texture for use in the texture environment or register combiners. There are also enumerants for both explicitly sized (8-bit components) and unsized component precision.

It should be noted that the vibrance (VIB) component of the GL_DSDT_MAG_VIB_NV format becomes the intensity component of the GL_DSDT_MAG_INTENSITY_NV internal texture format. Vibrance becomes intensity in the GL_DSDT_MAG_INTENSITY_NV texture format. The introduction of vibrance is because core OpenGL® has no notion of an intensity component in the pixel transfer mechanism or as an external format (instead the red component of an RGBA value becomes the intensity component of intensity textures).

The texture unit RGBA result of a texture shader that fetches a texture with a base internal format of GL_HILO_NV, GL_DSDT_NV, or GL_DSDT_MAG_NV may show up in the register combiners texture registers in various manners [i.e. as the value (0,0,0,0)].

How the texture RGBA result of a texture shader that fetches a texture with a base internal format of GL_HILO_NV, GL_DSDT_NV, or GL_DSDT_MAG_NV the GL_DOT_PRODUCT_NV texture shader shows up in the texture environment may or may not be an issue, because the texture environment operation is assumed to be GL_NONE in this case when GL_TEXTURE_SHADER_NV is enabled.

The GL_DOT_PRODUCT_DEPTH_REPLACE_NV program may or may not replace the eye-distance Z or window-space depth. For example, it may replace window-space depth. If the window-space depth value is outside of the near and far depth range values, the fragment may be rejected.

The GL_CULL_FRAGMENT_NV operation compares against all four texture coordinates. If one wants only one, two, or three comparisons, various issues may be considered. To compare against a single value, one may replicate that value in all the coordinates and set the comparison for all components to be identical. In the alternative, one can set uninteresting coordinates to zero and use the GL_GEQUAL comparison which do not necessarily cull for the value zero.

GL_CULL_FRAGMENT_NV may be beneficial for various reasons. For example, the GL_CULL_FRAGMENT_NV operation provides a mechanism to implement per-fragment clip planes. If a texture coordinate is assigned a signed distance to a plane, the cull fragment test can discard fragments on the wrong side of the plane. Each texture shader stage provides up to four such clip planes. An eye-space clip plane can be established using the GL_EYE_LINEAR texture coordinate generation mode where the clip plane equation is specified via the GL_EYE_PLANE state.

Clip planes are one application for GL_CULL_FRAGMENT_NV, but other clipping approaches are possible too. For example, by computing and assigning appropriate texture coordinates (perhaps with NV_vertex_program), fragments beyond a certain distance from a point can be culled (assuming that it is acceptable to linearly interpolate a distance between vertices).

The texture border color is supposed to be an RGBA value clamped to the range [0,1]. The texture border color may work in conjunction with signed RGBA color components, HILO components, and texture offset component groups in various ways. The per-texture object GL_TEXTURE_BORDER_COLOR is superceded by a GL_TEXTURE_BORDER_VALUES symbolic token. The texture border values are four floats (not clamped to [0,1] when specified). When a texture border is required for a texture, the components for the border texel are determined by the GL_TEXTURE_BORDER_VALUES state. For color components, the GL_TEXTURE_BORDER_VALUES state is treated as a set of RGBA color components. For HILO components, the first value is treated as hi and the second value is treated as lo. For texture offset components, the ds, dt, mag, and vib values correspond to the first, second, third, and fourth texture border values respectively. The particular texture border components are clamped to the range of the component determined by the texture's internal format. So a signed component is clamped to the [−1,1] range and an unsigned component is clamped to the [0,1] range.

For backward compatibility, the GL_TEXTURE_BORDER_COLOR can still be specified and queried. When specified, the values are clamped to [0,1] and used to update the texture border values.

When GL_TEXTURE_BORDER_COLOR is queried, there is not necessarily clamping of the returned values.

With signed texture components, the texture environment function discussion may be amended, since one does not necessarily want texture environment results to exceed the range [−1,1].

The GL_DECAL and GL_BLEND operations perform linear interpolations of various components of the form: A*B+(1−A)*C Optionally, the value of A may not necessarily be allowed to be negative otherwise, the value of (1−A) may exceed 1.0. These linear interpolations may be written in the form max (0,A)*B+(1−max(0,A))*C.

The GL_ADD operation clamps its result to 1.0, but if negative components are permitted, the result may be clamped to the range [−1,1].

The GL_COMBINE_ARB (and GL_COMBINE_EXT) and GL_COMBINE4_NV operations do explicit clamping of all result to [0,1]. In addition, NV_texture_shader adds requirements to clamp inputs to [0,1] too. This is because the GL_ONE_MINUS_SRC_COLOR and GL_ONE_MINUS_SRC_ALPHA operands may really be computing 1−max(0, C). For completeness, GL_SRC_COLOR and GL_SRC_ALPHA may be computing max(0,C).

With signed texture components, the color sum discussion may possibly need to be amended, since the primary and secondary color may both be clamped to the range [0,1] before they are summed.

The OpenGL® 1.2.1 description of color sum does not require a clamp of the primary and secondary colors to the [0,1] range before they are summed. Before signed texture components, the standard texture environment modes either could not generate results outside the [0,1] range or explicitly clamped their results to this range (as in the case of GL_ADD, GL_COMBINE_EXT, and GL_COMBINE4_NV). Now with signed texture components, negative values can be generated by texture environment functions.

One may not want to clamp the intermediate results of texture environment stages since negative results may be useful in subsequent stages, but clamping may be applied to the primary color immediately before the color sum. For symmetry, clamping of the secondary color is specified as well (though there is currently no way to generate a negative secondary color).

Vibrance is the fourth component of the external representation of a texture offset group. During pixel transfer, vibrance is scaled and biased based on the GL_VIBRANCE_SCALE and GL_VIBRANCE_BIAS state. Once transformed, the vibrance component becomes the intensity component for textures with a DSDT_MAG_INTENSITY base internal format. Vibrance is meaningful when specifying texture images with the DS_DT_MAG_VIB_NV external format (and is not necessarily supported when reading, drawing, or copying pixels).

There are lots of reasons that a texture shader stage is inconsistent, and in which case, the stage operates as if the operation is NONE. For debugging sanity, there are various ways to determine whether a particular texture shader stage is consistent. For example, the shader consistency of a particular texture unit may be queried with that shown in Table #3.

TABLE #3

GLint consistent;
glActiveTextureARB(stage_to_check);
glGetTexEnviv(GL_TEXTURE_SHADER_NV,
GL_SHADER_CONSISTENT_NV, &consistent);
consistent is one or zero depending on whether the shader stage is consistent or not.

There may or may not be signed components with sub 8-bit precision. Packed pixel formats for texture offset groups may or may not be supported. In particular, such formats may be limited to UNSIGNED_INT_S8_S8_8_8_NV and UNSIGNED_INT_8_8_S8S8REV_NV for use with the DSDT_MAG_VIB_NV format.

It should be noted that these two new packed pixel formats are only for the DSDT_MAG_VIB_NV and cannot necessarily be used with RGBA or BGRA formats. Likewise, the RGBA and BGRA formats may not necessarily be used with the new UNSIGNED_INTS8_S8_8_8_NV and UNSIGNED_INT_8_8_S8_S8_REV_NV types.

Various things may be said about signed fixed-point precision and range of actual implementations. The core OpenGL® specification typically specifies fixed-point numerical computations without regard to the specific precision of the computations. This practice is intentional because it permits implementations to vary in the degree of precision used for internal OpenGL® computations. When mapping unsigned fixed-point values to a [0,1] range, the mapping is straightforward.

However, this extension supports signed texture components in the range [−1,1]. This presents some awkward choices for how to map [−1,1] to a fixed-point representation. Assuming a binary fixed-point representation with an even distribution of precision, there is no way to exactly represent −1, 0, and 1 and avoid representing values outside the [−1,1] range.

In core the OpenGL® 1.2.1 specification, table 2.6 describes mappings from unsigned integer types (GLbyte, GLshort, and GLint) that preclude the exact specification of 0.0. NV_register_combiners supports signed fixed-point values that have similar representation issues.

One solution to this representation problem is to use 8-, 9-, and 16-bit fixed-point representations for signed values in the [−1,1] range such that (See Table #4):

TABLE #4

| floating-point | 8-bit fixed-point | 9-bit fixed-point | 16 bit fixed-point |
|---|---|---|---|
| 1.0 | n/a | 255 | n/a |
| 0.99996... | n/a | n/a | 32767 |
| 0.99218... | 127 | n/a | n/a |
| 0.0 | 0 | 0 | 0 |
| −1.0 | −128 | −255 | −32768 |
| −1.00392... | n/a | −256 | n/a |

The 8-bit and 16-bit signed fixed-point types may be used for signed internal texture formats, while the 9-bit signed fixed-point type is used for register combiners computations.

The 9-bit signed fixed-point type has the disadvantage that a number slightly more negative than −1 can be represented and this particular value is different dependent on the number of bits of fixed-point precision. The advantage of this approach is that 1, 0, and −1 can all be represented exactly.

The 8-bit and 16-bit signed fixed-point types have the disadvantage that 1.0 cannot be exactly represented (though −1.0 and zero can be exactly represented).

The specification is written using the OpenGL® practice (table 2.6 of the OpenGL® 1.2.1 specification) of mapping signed values evenly over the range [−1,1] so that zero cannot be precisely represented. This is done to keep this specification consistent with OpenGL's® existing conventions and to avoid the ugliness of specifying a precision-dependent range. One may expect leeway in how signed fixed-point values are represented.

One spirit of this extension is that an implicit allowance is made for signed fixed-point representations that cannot exactly represent 1.0.

The NV_texture_rectangle may interact with NV_texture_shader in various ways. For example, NV_texture_rectangle may introduce a new texture target similar to GL_TEXTURE_2D but that supports non-power-of-two texture dimensions and several usage restrictions (no mipmapping, etc). Also the imaged texture coordinate range for rectangular textures is [0,width]×[0,height] rather than [0,1]×[0,1].

Four texture shader operations will operate like their 2D texture counter-parts, but will access the rectangular texture target rather than the 2D texture target. These are shown in Table #5.

TABLE #5

GL_TEXTURE_RECTANGLE_NV
GL_OFFSET_TEXTURE_RECTANGLE_NV
GL_OFFSET_TEXTURE_RECTANGLE_SCALE_NV
GL_DOT_PRODUCT_TEXTURE_RECTANGLE_NV

A few 2D texture shader operations, namely GL_DEPENDENT_AR_TEXTURE_2DNV and GL_DEPENDENT_GB_TEXTURE_2D_NV, may not necessarily support rectangular textures because turning colors in the [0,1] range into texture coordinates would only access a single corner texel in a rectangular texture. The offset and dot product rectangular texture shader operations support scaling of the dependent texture coordinates so these operations can access the entire image of a rectangular texture. It should be noted, however, that it is the responsibility of the application to perform the proper scaling.

It should be noted that the 2D and rectangular "offset texture" shaders both use the same matrix, scale, and bias state.

The GL_DEPTH_REPLACE_NV operation may happen before or after polygon offset. In one embodiment where it happens after, the window Z (w_z) is computed during rasterization and polygon offset occurs at this point. The depth replace operation occurs after rasterization (at the point that conventional OpenGL® calls "texturing") so when the depth value is replaced, the effect of polygon offset (and normal depth interpolation) is lost when using the depth replace operation.

The GL_DEPTH_REPLACE_NV operation may interact with ARB_multisample in a variety of ways. In one example, the depth value for all covered samples of a multisampled fragment may be replaced with the same single depth value computed by the depth replace operation. Without depth replace, the depth values of each sample of a fragment may have slightly different depth values because of the polygon's depth gradient.

Various exemplary new tokens are shown in Table #6.

TABLE #6

Accepted by the <cap> parameter of Enable, Disable, and IsEnabled, and by the <pname> parameter of GetBooleanv, GetIntegerv, GetFloatv, and GetDoublev, and by the <target> parameter of TexEnvf, TexEnvfv, TexEnvi, TexEnviv, GetTexEnvfv, and GetTexEnviv:
   TEXTURE_SHADER_NV                                    0x86DE
When the <target> parameter of TexEnvf, TexEnvfv, TexEnvi, TexEnviv, GetTexEnvfv, and GetTexEnviv is TEXTURE_SHADER_NV, then the value of <pname> may be:
   RGBA_UNSIGNED_DOT_PRODUCT_MAPPING_NV 0x86D9
   SHADER_OPERATION_NV                           0x86DF
   CULL_MODES_NV                                      0x86E0
   OFFSET_TEXTURE_MATRIX_NV                  0x86E1
   OFFSET_TEXTURE_SCALE_NV                    0x86E2
   OFFSET_TEXTURE_BIAS_NV                       0x86E3
   OFFSET_TEXTURE_2D_MATRIX_NV       deprecated alias
for OFFSET_TEXTURE_MATRIX_NV
   OFFSET_TEXTURE_2D_SCALE_NV         alias for OFFSET_TEXTURE_SCALE_NV TABLE #6-continued

| | | |
|---|---|---|
| OFFSET_TEXTURE_2D_BIAS_NV | deprecated alias for OFFSET_TEXTURE_BIAS_NV | |
| PREVIOUS_TEXTURE_INPUT_NV | 0x86E4 | |
| CONST_EYE_NV | 0x86E5 | |

When the <target> parameter GetTexEnvfv and GetTexEnviv is TEXTURE_SHADER_NV, then the value of <pname> may be:

| | |
|---|---|
| SHADER_CONSISTENT_NV | 0x86DD |

When the <target> and <pname> parameters of TexEnvf, TexEnvfv, TexEnvi, and TexEnviv are TEXTURE_SHADER_NV and SHADER_OPERATION_NV respectively, then the value of <param> or the value pointed to by <params> may be:

| | |
|---|---|
| NONE | |
| TEXTURE_1D | |
| TEXTURE_2D | |
| TEXTURE_RECTANGLE_NV | (see NV_texture_rectangle) |
| TEXTURE_CUBE_MAP_ARB | (see ARB_texture_cube_map) |
| PASS_THROUGH_NV | 0x86E6 |
| CULL_FRAGMENT_NV | 0x86E7 |
| OFFSET_TEXTURE_2D_NV | 0x86E8 |
| OFFSET_TEXTURE_2D_SCALE_NV | see above, note aliasing |
| OFFSET_TEXTURE_RECTANGLE_NV | 0x864C |
| OFFSET_TEXTURE_RECTANGLE_SCALE_NV | 0x864D |
| DEPENDENT_AR_TEXTURE_2D_NV | 0x86E9 |
| DEPENDENT_GB_TEXTURE_2D_NV | 0x86EA |
| DOT_PRODUCT_NV | 0x86EC |
| DOT_PRODUCT_DEPTH_REPLACE_NV | 0x86ED |
| DOT_PRODUCT_TEXTURE_2D_NV | 0x86EE |
| DOT_PRODUCT_TEXTURE_RECTANGLE_NV | 0x864E |
| DOT_PRODUCT_TEXTURE_CUBE_MAP_NV | 0x86F0 |
| DOT_PRODUCT_DIFFUSE_CUBE_MAP_NV | 0x86F1 |
| DOT_PRODUCT_REFLECT_CUBE_MAP_NV | 0x86F2 |
| DOT_PRODUCT_CONST_EYE_REFLECT_CUBE_MAP_NV | 0x86F3 |

When the <target> and <pname> parameters of TexEnvfv and TexEnviv are TEXTURE_SHADER_NV and CULL_MODES_NV respectively, then the value of <param> or the value pointed to by <params> may be:

| |
|---|
| LESS |
| GEQUAL |

When the <target> and <pname> parameters of TexEnvf, TexEnvfv, TexEnvi, and TexEnviv are TEXTURE_SHADER_NV and RGBA_UNSIGNED_DOT_PRODUCT_MAPPING_NV respectively, then the value of <param> or the value pointed to by <params> may be:

| | |
|---|---|
| UNSIGNED_IDENTITY_NV | (see NV_register_combiners) |
| EXPAND_NORMAL_NV | (see NV_register_combiners) |

When the <target> and <pname> parameters of TexEnvf, TexEnvfv, TexEnvi, and TexEnviv are TEXTURE_SHADER_NV and PREVIOUS_TEXTURE_INPUT_NV respectively, then the value of <param> or the value pointed to by <params> may be:

| |
|---|
| TEXTURE0_ARB |
| TEXTURE1_ARB |
| TEXTURE2_ARB |
| TEXTURE3_ARB |
| TEXTURE4_ARB |
| TEXTURE5_ARB |
| TEXTURE6_ARB |
| TEXTURE7_ARB |

Accepted by the <format> parameter of GetTexImage, TexImage1D, TexImage2D, TexSubImage1D, and TexSubImage2D:

| | |
|---|---|
| HILO_NV | |
| DSDT_NV | 0x86F4 |
| DSDT_MAG_NV | 0x86F5 |
| DSDT_MAG_VIB_NV | 0x86F6 |
| | 0x86F7 |

Accepted by the <type> parameter of GetTexImage, TexImageID, TexImage2D, TexSubImageID, and TexSubImage2D:

| | |
|---|---|
| UNSIGNED_INT_S8_S8_8_8_NV | 0x86DA |
| UNSIGNED_INT_8_8_S8_S8_REV_NV | 0x86DB |

Accepted by the <internalformat> parameter of CopyTexImage1D, CopyTexImage2D, TexImage1D, and TexImage2D:

| | |
|---|---|
| SIGNED_RGBA_NV | 0x86FB |
| SIGNED_RGBA8_NV | 0x86FC |
| SIGNED_RGB_NV | 0x86FE |
| SIGNED_RGB8_NV | 0x86FF |
| SIGNED_LUMINANCE_NV | 0x8701 |
| SIGNED_LUMINANCE8_NV | 0x8702 |
| SIGNED_LUMINANCE_ALPHA_NV | 0x8703 |
| SIGNED_LUMINANCE8_ALPHA8_NV | 0x8704 |
| SIGNED_ALPHA_NV | 0x8705 |
| SIGNED_ALPHA8_NV | 0x8706 |
| SIGNED_INTENSITY_NV | 0x8707 |
| SIGNED_INTENSITY8_NV | 0x8708 |
| SIGNED_RGB_UNSIGNED_ALPHA_NV | 0x870C |
| SIGNED_RGB8_UNSIGNED_ALPHA8_NV | 0x870D |

Accepted by the <internalformat> parameter of TexImage1D and TexImage2D:

| | |
|---|---|
| HILO_NV | |
| HILO16_NV | 0x86F8 |
| SIGNED_HILO_NV | 0x86F9 |
| SIGNED_HILO16_NV | 0x86FA |
| DSDT_NV | |
| DSDT8_NV | 0x8709 |
| DSDT_MAG_NV | |
| DSDT8_MAG8_NV | 0x870A |
| DSDT_MAG_INTENSITY_NV | 0x86DC |
| DSDT8_MAG8_INTENSITY8_NV | 0x870B |

Accepted by the <pname> parameter of GetBooleanv, GetIntegerv, GetFloatv, GetDoublev, PixelTransferf, and PixelTransferi:

| | |
|---|---|
| HI_SCALE_NV | 0x870E |
| LO_SCALE_NV | 0x870F |
| DS_SCALE_NV | 0x8710 |
| DT_SCALE_NV | 0x8711 |
| MAGNITUDE_SCALE_NV | 0x8712 |
| VIBRANCE_SCALE_NV | 0x8713 |
| HI_BIAS_NV | 0x8714 |
| LO_BIAS_NV | 0x8715 |
| DS_BIAS_NV | 0x8716 |
| DT_BIAS_NV | 0x8717 |
| MAGNITUDE_BIAS_NV | 0x8718 |
| VIBRANCE_BIAS_NV | 0x8719 |

Accepted by the <pname> parameter of TexParameteriv, TexParameterfv, GetTexParameterfv and GetTexParameteriv:

| | |
|---|---|
| TEXTURE_BORDER_VALUES_NV | 0x871A |

Accepted by the <pname> parameter of GetTexLevelParameterfv and GetTexLevelParameteriv:

| | |
|---|---|
| TEXTURE_HI_SIZE_NV | 0x871B |
| TEXTURE_LO_SIZE_NV | 0x871C |
| TEXTURE_DS_SIZE_NV | 0x871D |
| TEXTURE_DT_SIZE_NV | 0x871E |
| TEXTURE_MAG_SIZE_NV | 0x871F |

Additional information will now be set forth in a topic-by-topic format. This information is meant to expand upon what is commonly known to those of ordinary skill, as exemplified by Chapter 2 of the OpenGL® 1.2.1 Specification (OpenGL® Operation).

Pixel Rectangles

Table #7 illustrates additional rows that may be added in the context of the present extension.

TABLE #7

| Parameter Name | Type | Initial Value | Valid Range |
|---|---|---|---|
| HI_SCALE_NV | float | 1.0 | (−Inf, +Inf) |
| LO_SCALE_NV | float | 1.0 | (−Inf, +Inf) |
| DS_SCALE_NV | float | 1.0 | (−Inf, +Inf) |
| DS_SCALE_NV | float | 1.0 | (−Inf, +Inf) |
| MAGNITUDE_SCALE_NV | float | 1.0 | (−Inf, +Inf) |
| VIBRANCE_SCALE_NV | float | 1.0 | (−Inf, +Inf) |
| HI_BIAS_NV | float | 0.0 | (−Inf, +Inf) |
| LO_BIAS_NV | float | 0.0 | (−Inf, +Inf) |
| DS_BIAS_NV | float | 0.0 | (−Inf, +Inf) |
| DT_BIAS_NV | float | 0.0 | (−Inf, +Inf) |
| MAGNITUDE_BIAS_NV | float | 0.0 | (−Inf, +Inf) |
| VIBRANCE_BIAS_NV | float | 0.0 | (−Inf, +Inf) |

More information on this topic that is well known to those of ordinary skill may be found in table 3.2 in section 3.6 of the OpenGL® 1.2.1 Specification.

Rasterization of Pixel Rectangles

With reference to unpacking, the HILO_NV, DSDT_NV, DSDT_MAG_NV, and DSDT_MAG_VIB_NV formats are described in section 3.6.5 of the OpenGL® 1.2.1 Specification even though these formats are supported only for texture images. Textures with the HILO_NV format are intended for use with certain dot product texture and dependent texture shader operations (see section 3.8.13 of the OpenGL® 1.2.1 Specification).

Textures with the DSDT_NV, DSDT_MAG_NV, and DSDT_MAG_VIB_NV format are intended for use with certain offset texture 2D texture shader operations (see section 3.8.13 of the OpenGL® 1.2.1 Specification).

The error INVALID_ENUM occurs if HILO_NV, DSDT_NV, DSDT_MAG_NV, or DSDT_MAG_VIB_NV is used as the format for DrawPixels, ReadPixels, or other commands that specify or query an image with a format and type parameter though the image is not a texture image. The HILO_NV, DSDT_NV, DSDT_MAGNV, or DSDT_MAG_VIB_NV formats are intended for use with the TexImage and TexSubImage commands.

The HILO_NV format consists of two components, hi and lo, in the hi then lo order. The hi and lo components maintain at least 16 bits of storage per component (at least 16 bits of magnitude for unsigned components and at least 15 bits of magnitude for signed components).

The DSDT_NV format consists of two signed components ds and dt, in the ds then dt order. The DSDT_MAG_NV format consists of three components: the signed ds and dt components and an unsigned magnitude component (mag for short), in the ds, then dt, then mag order. The DSDT_MAG_VIB_NV format consists of four components: the signed ds and dt components, an unsigned magnitude component (mag for short), and an unsigned vibrance component (vib for short), in the ds, then dt, then mag, then vib order."

Table #8 may be a pertinent addition to table 3.8 of section 3.6.4 of the OpenGL® 1.2.1 Specification.

TABLE #8

| type Parameter Token Name | GL Data Type | Number of Components | Matching Pixel Formats |
|---|---|---|---|
| UNSIGNED_INT_S8_S8_8_8_NV | uint | 4 | DSDT_MAG_VIB_NV |
| UNSIGNED_INT_8_8_S8_S8_REV_NV | uint | 4 | DSDT_MAG_VIB_NV |

Table #9 may be a pertinent addition to table 3.11 of section 3.6.4 of the OpenGL® 1.2.1 Specification.

TABLE #9

UNSIGNED_INT_S8_S8_8_8_NV:

31 30 29 28 27 26 25 24 23 22 21 20 19 18 17 16 15 14 13 12 11 10 9 8 7 6 5 4 3 2 1 0

1st component      2nd      3rd      4th

UNSIGNED_INT_8_8_S8_S8_REV_NV:

31 30 29 28 27 26 25 24 23 22 21 20 19 18 17 16 15 14 13 12 11 10 9 8 7 6 5 4 3 2 1 0

4th      3rd      2nd      1st component

With respect to unpacking, the following information in Table #10 may be pertinent.

TABLE #10

UNSIGNED_BYTE_3_3_2,
  UNSIGNED_BYTE_2_3_3_REV, UNSIGNED_SHORT_5_6_5,
  UNSIGNED_SHORT_5_6_5_REV, UNSIGNED_SHORT_4_4_4_4,
  UNSIGNED_SHORT_4_4_4_4_REV, UNSIGNED_SHORT_5_5_5_1,
  UNSIGNED_SHORT_1_5_5_5_REV, UNSIGNED_INT_8_8_8_8,
  UNSIGNED_INT_8_8_8_8_REV, UNSIGNED_INT_10_10_10_2, or
  UNSIGNED_INT_2_10_10_10_REV

Calling DrawPixels with each of the foregoing types are each a special case in which all the components of each group are packed into a single unsigned byte, unsigned short, or unsigned int, depending on the type. When packing or unpacking texture images (for example, using TexImage2D or GetTexImage), the type parameter may also be either UNSIGNED_INT_S8_S8_8_8_NV or UNSIGNED_INT_8_8_S8_S8_REV though neither symbolic token is permitted for DrawPixels, ReadPixels, or other commands that specify or query an image with a format and type parameter though the image is not a texture image. The error INVALID_ENUM occurs when UNSIGNED_INT_S8_S8_8_8_NV is used when it is not permitted. When UNSIGNED_INT_S8_S8_8_8_NV or UNSIGNED_INT_8_8_S8_S8_REV_NV is used, the first and second components are treated as signed components. The number of components per packed pixel is fixed by the type, and may match the number of components per group indicated by the format parameter, as listed in Table #8. The format may also be one of the formats listed in the Matching Pixel Formats column of Table #8 for the specified packed type. The error INVALID_OPERATION is generated if a mismatch occurs. This constraint also holds for all other functions that accept or return pixel data using type and format parameters to define the type and format of the data."

As an option, each bitfield is interpreted as an unsigned integer value unless it has been explicitly been stated that the bitfield contains a signed component. Signed bitfields are treated as two's complement numbers.

Table #11 may be a pertinent addition to table 3.12 of section 3.6.4 of the OpenGL® 1.2.1 Specification.

TABLE #11

| Format | First Component | Second Component | Third Component | Fourth Component |
|---|---|---|---|---|
| DSDT_MAG_VIB_NV | ds | dt | magnitude | vibrance |

With respect to conversion to floating-point, each unsigned element in the group is converted for packed pixel types by computing c/($2^N-1$), where c is the unsigned integer value of the bitfield containing the element and N is the number of bits in the bitfield. In the case of signed elements of a packed pixel type, the signed element is converted by computing $2*c+1/(2^N-1)$, where c is the signed integer value of the bitfield containing the element and N is the number of bits in the bitfield.

With respect to final expansion to RGBA, this step is performed only for groups other than HILO component, depth component, and texture offset groups.

More information on this topic that is well known to those of ordinary skill may be found in section 3.6.4 of the OpenGL® 1.2.1 Specification.

Additional to the kinds of pixel groups in section 3.6.5 of the OpenGL® 1.2.1 Specification, there may be those set forth in Table #12.

TABLE #12

HILO component: Each group comprises two components: hi and lo.
Texture offset group: Each group comprises four components: a ds and dt pair, a magnitude, and a vibrance.

Arithmetic on Components

This step applies to RGBA component, depth component, and HILO component, and texture offset groups. Each component is multiplied by an appropriate signed scale factor: RED_SCALE for an R component, GREEN_SCALE for a G component, BLUE_SCALE for a B component, ALPHA_SCALE, for an A component, HI_SCALENV for a HI component, LO_SCALE_NV for a LO component, DS_SCALENV for a DS component, DT_SCALE_NV for a DT component, MAGNITUDE_SCALE_NV for a MAG component, VIBRANCE_SCALE_NV for a VIB component, or DEPTH_SCALE for a depth component.

Then the result is added to the appropriate signed bias: RED_BIAS, GREEN_BIAS, BLUE_BIAS, ALPHA_BIAS, HI_BIAS_NV, LO_BIAS_NV, DS_BIAS_NV, DT_BIAS_NV, MAGNITUDE_BIAS_NV, VIBRANCE_BIAS_NV, or DEPTH_BIAS."

More information on this topic that is well known to those of ordinary skill may be found in section 3.6.5 of the OpenGL® 1.2.1 Specification.

Texturing

The GL provides two mechanisms for mapping sets of (s,t,r,q) texture coordinates to RGBA colors: conventional texturing and texture shaders.

Conventional texturing maps a portion of a specified image onto each primitive for each enabled texture unit. Conventional texture mapping is accomplished by using the color of an image at the location indicated by a fragment's non-homogeneous (s,t,r) coordinates for a given texture unit.

The alternative to conventional texturing is the texture shaders mechanism. When texture shaders are enabled, each texture unit uses one of twenty-one texture shader operations. Eighteen of the twenty-one shader operations map an (s,t,r,q) texture coordinate set to an RGBA color. Of these, three texture shader operations directly correspond to the 1D, 2D, and cube map conventional texturing operations. Depending on the texture shader operation, the mapping from the (s,t,r,q) texture coordinate set to an RGBA color may depend on the given texture unit's currently bound texture object state and/or the results of previous texture shader operations. The three remaining texture shader operations respectively provide a fragment culling mechanism based on texture coordinates, a means to replace the fragment depth value, and a dot product operation that computes a floating-point value for use by subsequent texture shaders. The specifics of each texture shader operation are described in section 3.8.12 of the OpenGL® 1.2.1 Specification.

Texture shading is enabled or disabled using the generic Enable and Disable commands, respectively, with the symbolic constant TEXTURE_SHADER_NV. When texture shading is disabled, conventional texturing generates an RGBA color for each enabled textures unit as described in Sections 3.8.10 of the OpenGL® 1.2.1 Specification.

After RGBA colors are assigned to each texture unit, either by conventional texturing or texture shaders, the GL proceeds with fragment coloring, either using the texture environment, fog, and color sum operations, or using register combiners extension if supported.

Neither conventional texturing nor texture shaders affects the secondary color.

More information on this topic that is well known to those of ordinary skill may be found in section 3.8 of the OpenGL® 1.2.1 Specification.

Texture Image Specification

The formats HILO_NV, DSDT_NV, DSDT_MAG_NV, and DSDT_MAG_VIB_NV are allowed for specifying texture images.

The selected groups are processed exactly as for DrawPixels, stopping just before conversion. Each R, G, B, A, HI, LO, DS, DT, and MAG value so generated is clamped to [0,1] if the corresponding component is unsigned, or if the corresponding component is signed, is clamped to [−1,1]. The signedness of components depends on the internal format (see table 3.16 of the OpenGL® 1.2.1 Specification). The signedness of components for unsized internal formats matches the signedness of components for any respective sized version of the internal format.

Table #13 may be a pertinent addition to table 3.15 of section 3.8.1 of the OpenGL® 1.2.1 Specification.

TABLE #13

| Base Internal Format | Component Values | Internal Components | Format Type |
|---|---|---|---|
| ALPHA | A | A | RGBA |
| LUMINANCE | R | L | RGBA |
| LUMINANCE_ALPHA | R, A | L, A | RGBA |
| INTENSITY | R | I | RGBA |
| RGB | R, G, B | R, G, B | RGBA |
| RGBA | R, G, B, A | R, G, B, A | RGBA |
| HILO_NV | HI, LO | HI, LO | HILO |
| DSDT_NV | DS, DT | DS, DT | texture offset group |
| DSDT_MAG_NV | DS, DT, MAG | DS, DT, MAG | texture offset group |
| DSDT_MAG_INTENSITY_NV | DS, DT, MAG, VIB | DS, DT, MAG, I | RGBA/texture offset group |

Conversion from RGBA, HILO, and texture offset pixel components to internal texture table, or filter components. Reference to section 3.8.9 of the OpenGL® 1.2.1 Specification may be made for a description of the texture components R, G, B, A, L, and I. See section 3.8.13 for an explanation of the handling of the texture components HI, LO, DS, DT, MAG, and VIB."

Table #14 may be a pertinent addition to table 3.16 of section 3.8.1 of the OpenGL® 1.2.1 Specification.

TABLE #14

| Sized MAG Internal Format bits | Base Internal Format | R bits | G bits | B bits | A bits | L bits | I bits | HI bits | LO bits | DS bits | DT bits |
|---|---|---|---|---|---|---|---|---|---|---|---|
| HILO16_NV | HILO | | | | | | | 16 | 16 | | |
| SIGNED_HILO16_NV | HILO | | | | | | | 16* | 16* | | |
| SIGNED_RGBA8_NV | RGBA | 8* | 8* | 8* | 8* | | | | | | |
| SIGHED_RGB8_UNSIGNED_ALPHA8_NV | RGBA | 8* | 8* | 8* | 8* | | | | | | |
| SIGNED_RGB8_NV | RGB | 8* | 8* | 8* | | | | | | | |
| SIGNED_LUMINANCE8_NV | LUMINANCE | | | | | 8* | | | | | |
| SIGNED_LUMINANCE8_ALPHA8_NV | LUMINANCE_ALPHA | | | | 8* | 8* | | | | | |
| SIGNED_ALPHA8_NV | ALPHA | | | | 8* | | | | | | |
| SIGNED_INTENSITY8_NV | INTENSITY | | | | | | 8* | | | | |
| DSDT8_NV | DSDT_NV | | | | | | | | | 8* | 8* |
| DSDT8_MAGS_NV 8 | DSDT_MAG_NV | | | | | | | | | 8* | 8* |
| DSDT8_MAG8_INTENSITY8_NV 8 | DSDT_MAG_INTENSITY_NV | | | | | | 8 | | | 8* | 8* |

An asterisk (*) following a component size indicates that the corresponding component is signed (the sign bit is included in specified component resolution size).

Components are then selected from the resulting R, G, B, A, HI, LO, DS, DT, and MAG values to obtain a texture with the base internal format specified by (or derived from) internalformat. Table #13 summarizes the mapping of R, G, B, A, HI, LO, DS, DT, and MAG values to texture components, as a function of the base internal format of the texture image. internalformat may be specified as one of the ten base internal format symbolic constants listed in Table #13, or as one of the sized internal format symbolic constants listed in Table #14.

The error INVALID_OPERATION is generated if the format is HILO_NV and the internalformat is not necessarily one of HILO_NV, HILO16_NV, SIGNED_HILO_NV, SIGNED_HILO16_NV; or if the internalformat is one of HILO_NV, HILO16_NV, SIGNED_HILO_NV, or SIGNED_HILO16_NV and the format is not necessarily HILO_NV.

The error INVALID_OPERATION is generated if the format is DSDT_NV and the internalformat is not necessarily either DSDT_NV or DSDT8_NV; or if the internal format is either DSDT_NV or DSDT8_NV and the format is not necessarily DSDT_NV.

The error INVALID_ is generated if the format is DSDT_MAG_NV and the internalformat is not necessarily either DSDT_MAG_NV or DSDT8_MAG8_NV; or if the internal format is either DSDT_MAG_NV or DSDT8_MAG8_NV and the format is not necessarily DSDT_MAG_NV.

The error INVALID_OPERATION is generated if the format is DSDT_MAG_VIB_NV and the internalformat is not necessarily either DSDT_MAG_INTENSITY_NV or DSDT8_MAG8_INTENSITY8_NV; or if the internal format is either DSDT_MAG_INTENSITY_NV or DSDT8MAG8INTENSITY8_NV and the format is not necessarily DSDT_MAG_VIB_NV."

The internal component resolution is the number of bits allocated to each value in a texture image (and includes the sign bit if the component is signed).

If a sized internal format is specified, the mapping of the R, G, B, A, HI, LO, DS, DT, and MAG values to texture components is equivalent to the mapping of the corresponding base internal format's components, as specified in Table #13, and the memory allocations per texture component is assigned by the GL to match the allocations listed in Table #14 as closely as possible."

More information on this topic that is well known to those of ordinary skill may be found in section 3.8.2 of the OpenGL® 1.2.1 Specification.

Alternate Texture Image Specification Commands

Parameters level, internalformat, and border are specified using the same values, with the same meanings, as the equivalent arguments of TexImage2D, except that internalformat may not necessarily be specified as 1, 2, 3, 4, HILO_NV, HILO16_NV, SIGNED_HILO_NV, SIGNED_HILO16_NV, DSDT_NV, DSDT8_NV, DSDT_MAG_NV, DSDT8_MAG8_NV, DSDT_MAG_INTENSITY_NV, or DSDT8_MAG8_INTENSITY8_NV.

level, internalformat, and border are specified using the same values, with the same meanings, as the equivalent arguments of TexImage 1D, except that internalformat may not necessarily be specified as 1, 2, 3, 4, HILO_NV, HILO16_NV, SIGNED_HILO_NV, SIGNED_HILO16_NV, DSDT_NV, DSDT8_NV, DSDT_MAG_NV, DT8_MAG8_NV, DSDT_MAG_INTENSITY_NV, or DSDT8_MAG8_INTENSITY8_NV.

CopyTexSubImage2D and CopyTexSubImage1D generate the error INVALID_OPERATION if the internal format of the texture array to which the pixels are to be copied is one of HILO_NV, HILO16_NV, SIGNED_HILO_NV, SIGNED_HILO16_NV, DSDT_NV, DSDT8_NV, DSDT_MAG_NV, DSDT8_MAG8_NV, DSDT_MAG_INTENSITY_NV, or DSDT8_MAG8_INTENSITY8_NV.

TexSubImage2D and TexSubImage1D generate the error INVALID_OPERATION if the internal format of the texture array to which the texels are to be copied has a different format type (according to table 3.15 of the OpenGL® 1.2.1 Specification) than the format type of the texels being specified. Specifically, if the base internal format is not necessarily one of HILO_NV, DSDT_NV, DSDT_MAG_NV, or DSDT_INTENSITY_NV, then the format parameter may be one of COLOR INDEX, RED, GREEN, BLUE, ALPHA, RGB, RGBA, LUMINANCE, or LUMINANCE_ALPHA; if the base internal format is HILO_NV, then the format parameter may be HILO_NV; if the base internal format is DSDT_NV, then the format parameter may be DSDT_NV; if the base internal format is DSDT_MAG_NV, then the format parameter may be DSDT_MAG_NV; if the base internal format is DSDT_MAG_INTENSITY_NV, the format parameter may be DSDT_MAG_VIB_NV.

Texture Parameters

Table #15 may be a pertinent addition to table 3.17 of section 3.8.3 of the OpenGL® 1.2.1 Specification.

TABLE #15

| Name | Type | Legal Values |
| --- | --- | --- |
| TEXTURE_BORDER_VALUES | 4 floats | any value |

The TEXTURE_BORDER_VALUES state can also be specified with the TEXTURE_BORDER_COLOR symbolic constant. When the state is specified via TEXTURE_BORDER_COLOR, each of the four values specified are first clamped to lie in [0,1]. However, if the texture border values state is specified using TEXTURE_BORDER_VALUES, no clamping occurs. In either case, if the values are specified as integers, the conversion for signed integers from table 2.6 of the OpenGL® 1.2.1 specification is applied to convert the values to floating-point."

More information on this topic that is well known to those of ordinary skill may be found in section 3.8.3 of the OpenGL® 1.2.1 Specification.

Texture Minification

If any of the selected tauijk, tauij, or taui in the above equations refer to a border texel with i<-bs, j<bs, k<-bs, i>=ws-bs, j>=hs-bs, or k>=ds-bs, then the border values given by the current setting of TEXTURE_BORDER_VALUES is used instead of the unspecified value or values. If the texture contains color components, the components of the TEXTURE_BORDER_VALUES vector are interpreted as an RGBA color to match the texture's internal format in a manner consistent with table 3.15 of the OpenGL® 1.2.1 Specification. If the texture contains HILO components, the first and second components of the TEXTURE_BORDER_VALUES vector are interpreted as the hi and lo components respectively. If the texture contains texture offset group components, the first, second, third, and fourth components of the TEXTURE_BORDER_VALUES vector are interpreted as ds, dt, mag, and vib components respectively. Additionally, the texture border values are clamped appropriately depending on the signedness of each particular component. Unsigned components are clamped to [0,1]; signed components are clamped to [-1,1].

More information on this topic that is well known to those of ordinary skill may be found in section 3.8.5 of the OpenGL® 1.2.1 Specification.

Texture Environment and Texture Functions

TEXTURE_ENV_MODE may be set to one of REPLACE, MODULATE, DECAL, BLEND, ADD, COMBINE_ARB (or COMBINE_EXT), COMBINE4_NV, or NONE;

When texture shaders are enabled (see section 3.8.13 of the OpenGL® 1.2.1 Specification), a given texture unit's texture shader result may be intended for use as an input to another texture shader stage rather than generating a texture unit RGBA result for use in the given texture unit's texture environment function. Additionally, several texture shader operations and texture format types are intended only to generate texture shader results for subsequent texture shaders or perform a side effect (such as culling the fragment or replacing the fragment's depth value) rather than supplying a useful texture unit RGBA result for use in the texture environment function. For this reason, the NONE texture environment ignores the texture unit RGBA result and passes through its input fragment color unchanged.

If the TEXTURE_SHADER_NV mode is disabled, the precise form of the texture environment function depends on the base internal format of the texture object bound to the given texture unit's highest-precedence enabled texture target. Otherwise if the TEXTURE_SHADER_NV mode is enabled, then the form of the function depends on the texture unit's texture shader operation.

If a texture shader operation requires fetching a filtered texture color value (though not necessarily a HILO or texture offset value; see the subsequent HILO and texture offset discussion), the texture environment function depends on the base internal format of the texture shader operation's respective texture target used for fetching by the texture shader operation.

The PASS_THROUGH_NV texture shader operation does not necessarily fetch from any texture target, but it generates an RGBA color and therefore operates as if the base internal format is RGBA for determining what texture environment function to apply.

If the TEXTURE_SHADER_NV mode is enabled and the texture shader operation for a given texture unit is one of NONE, CULL_FRAGMENT_NV, DOT_PRODUCT_NV, or DOT_PRODUCT_DEPTH_REPLACE_NV, then the given texture unit's texture function operates as if the texture function is NONE.

If the base internal format of the texture is HILO_NV, DSDT_NV, or DSDT_MAG_NV (independent of whether or not the TEXTURE_SHADER_NV mode is enabled or disabled), then corresponding the texture function operates as if the texture function is NONE.

If the base internal format of the texture is DSDT_MAG_INTENSITY_NV (independent of whether or not the TEXTURE_SHADER_NV mode is enabled or disabled), then the corresponding texture function operates as if the base internal format is INTENSITY for the purposes of determining the appropriate function using the vibrance component as the intensity value.

With respect to how Rt, Gt, Bt, At, Lt, and It are assigned, when TEXTURE_SHADER_NV is disabled, Rt, Gt, Bt, At, Lt, and It are the filtered texture values; when TEXTURE_SHADER_NV is enabled, Rt, Gt, Bt, and At are the respective components of the texture unit RGBA result of the texture unit's texture shader stage, and Lt and It are any red, green, or blue component of the texture unit RGBA result (the three components may be the same).

The initial primary color and texture environment color component values are in the range [0,1]. The filtered texture color and texture function result color component values are in the range [-1,1]. Negative filtered texture color component values are generated by texture internal formats with signed components such as SIGNED_RGBA.

Table #16 may be a pertinent addition to tables 3.18-9 of section 3.8.9 of the OpenGL® 1.2.1 Specification.

TABLE #16

| Base Internal Format | DECAL Texture Function | BLEND Texture Function | ADD Texture Function | NONE Texture Function |
|---|---|---|---|---|
| ALPHA | $Rv = Rf$ (no longer undefined)<br>$Gv = Gf$<br>$Bv = Bf$<br>$Av = Af$ | $Rv = Rf$<br>$Gv = Gf$<br>$Bv = Bf$<br>$Av = Af * At$ | $Rv = Rf$<br>$Gv = Gf$<br>$Bv = Rf$<br>$Av = Af * Av = At$ | $Rv = Rf$<br>$Gv = Gf$<br>$Bv = Bf$<br>$Av = Af$ |
| LUMINANCE (or 1) | $Rv = Rf$ (no longer undefined)<br>$Gv = Gf$<br>$Bv = Bf$<br>$Av = Af$ | $Rv = Rf * (1 - \max(0, Lt)) + Rc * \max(0, Lt)$<br>$Gv = Gf * (1 - \max(0, Lt)) + Gc * \max(0, Lt)$<br>$Bv = Bf * (1 - \max(0, Lt)) + Bc * \max(0, Lt)$<br>$Av = Af$ | $Rv = \max(-1, \min(1, Rf + Lt))$<br>$Gv = \max(-1, \min(1, Gf + Lt))$<br>$Bv = \max(-1, \min(1, Bf + Lt))$<br>$Av = Af$ | $Rv = Rf$<br>$Gv = Gf$<br>$Bv = Bf$<br>$Av = Af$ |
| LUMI-NANCE_ALPHA (or 2) | $Rv = Rf$ (no longer undefined)<br>$Gv = Gf$<br>$Bv = Bf$<br>$Av = Af$ | $Rv = Rf * (1 - \max(0, Lt)) + Rc * \max(0, Lt)$<br>$Gv = Gf * (1 - \max(0, Lt)) + Gc * \max(0, Lt)$<br>$Bv = Bf * (1 - \max(0, Lt)) + Bc * \max(0, Lt)$<br>$Av = Af * At$ | $Rv = \max(-1, \min(1, Rf + Lt))$<br>$Gv = \max(-1, \min(1, Gf + Lt))$<br>$Bv = \max(-1, \min(1, Bf + Lt))$<br>$Av = Af * At$ | $Rv = Rf$<br>$Gv = Gf$<br>$Bv = Bf$<br>$Av = Af$ |
| INTENSITY | $Rv = Rf$ (no longer undefined)<br>$Gv = Gf$<br>$Bv = Bf$<br>$Av = Af$ | $Rv = Rf * (1 - \max(0, It)) + Rc * \max(0, It)$<br>$Gv = Gf * (1 - \max(0, It)) + Gc * \max(0, It)$<br>$Bv = Bf * (1 - \max(0, It)) + Bc * \max(0, It)$<br>$Av = Af * (1 - \max(0, It)) + Ac * \max(0, It)$ | $Rv = \max(-1, \min(1, Rf + It))$<br>$Gv = \max(-1, \min(1, Gf + It))$<br>$Bv = \max(-1, \min(1, Bf + It))$<br>$Av = \max(-1, \min(1, Af + It))$ | $Rv = Rf$<br>$Gv = Gf$<br>$Bv = Bf$<br>$Av = Af$ |
| RGB (or 3) | $Rv = Rt$<br>$Gv = Gt$<br>$Bv = Bt$<br>$Av = Af$ | $Rv = Rf * (1 - \max(0, Rt)) + Rc * \max(0, Rt)$<br>$Gv = Gf * (1 - \max(0, Gt)) + Gc * \max(0, Gt)$<br>$Bv = Bf * (1 - \max(0, Bt)) + Bc * \max(0, Bt)$<br>$Av = Af$ | $Rv = \max(-1, \min(1, Rf + Rt))$<br>$Gv = \max(-1, \min(1, Gf + Gt))$<br>$Bv = \max(-1, \min(1, Bf + Bt))$<br>$Av = Af$ | $Rv = Rf$<br>$Gv = Gf$<br>$Bv = Bf$<br>$Av = Af$ |
| RGBA (or 4) | $Rv = Rf * (1 - \max(0, At)) + Rt * \max(0, At)$<br>$Gv = Gf * (1 - \max(0, At)) + Gt * \max(0, At)$<br>$Bv = Bf * (1 - \max(0, At)) + Bt * \max(0, At)$<br>$Av = Af$ | $Rv = Rf * (1 - \max(0, Rt)) + Rc * \max(0, Rt)$<br>$Gv = Gf * (1 - \max(0, Gt)) + Gc * \max(0, Gt)$<br>$Bv = Bf * (1 - \max(0, Bt)) + Bc * \max(0, Bt)$<br>$Av = Af * At$ | $Rv = \max(-1, \min(1, Rf + Rt))$<br>$Gv = \max(-1, \min(1, Gf + Gt))$<br>$Bv = \max(-1, \min(1, Bf + Bt))$<br>$Av = Af * At$ | $Rv = Rf$<br>$Gv = Gf$<br>$Bv = Bf$<br>$Av = Af$ |

Table #17 may be a pertinent addition to tables 3.21-2 of section 3.8.9 of the OpenGL® 1.2.1 Specification. Such amendments may require inputs to be clamped positive (the TEXTURE<n>_ARB entries apply only if NV_texture_env_combine4 is supported):

TABLE #17

| SOURCE<n>_RGB_EXT | OPERAND<n>_RGB_EXT | Argument |
|---|---|---|
| TEXTURE | SRC_COLOR | $\max(0, Ct)$ |
|  | ONE_MINUS_SRC_COLOR | $(1 - \max(0, Ct))$ |
|  | SRC_ALPHA | $\max(0, At)$ |
|  | ONE_MINUS_SRC_ALPHA | $(1 - \max(0, At))$ |
| CONSTANT_EXT | SRC_COLOR | $\max(0, Cc)$ |
|  | ONE_MINUS_SRC_COLOR | $(1 - \max(0, Cc))$ |
|  | SRC_ALPHA | $\max(0, Ac)$ |
|  | ONE_MINUS_SRC_ALPHA | $(1 - \max(0, Ac))$ |
| PRI-MARY_COLOR_EXT | SRC_COLOR | $\max(0, Cf)$ |
|  | ONE_MINUS_SRC_COLOR | $(1 - \max(0, Cf))$ |
|  | SRC_ALPHA | $\max(0, Af)$ |
|  | ONE_MINUS_SRC_ALPHA | $(1 - \max(0, Af))$ |
| PREVIOUS_EXT | SRC_COLOR | $\max(0, Cp)$ |
|  | ONE_MINUS_SRC_COLOR | $(1 - \max(0, Cp))$ |
|  | SRC_ALPHA | $\max(0, Ap)$ |
|  | ONE_MINUS_SRC_ALPHA | $(1 - \max(0, Ap))$ |
| TEXTURE<n>_ARB | SRC_COLOR | $\max(0, Ct<n>)$ |
|  | ONE_MINUS_SRC_COLOR | $(1 - \max(0, Ct<n>))$ |
|  | SRC_ALPHA | $\max(0, At<n>)$ |
|  | ONE_MINUS_SRC_ALPHA | $(1 - \max(0, At<n>))$ |

Arguments for COMBINE_RGB_ARB (or COMBINE_RGB_EXT) functions

| SOURCE<n>_AL-PHA_EXT | OPERAND<n>_AL-PHA_EXT | Argument |
|---|---|---|
| TEXTURE | SRC_ALPHA | $\max(0, At)$ |
|  | ONE_MINUS_SRC_ALPHA | $(1 - \max(0, At))$ |
| CONSTANT_EXT | SRC_ALPHA | $\max(0, Ac)$ |
|  | ONE_MINUS_SRC_ALPHA | $(1 - \max(0, Ac))$ |
| PRI-MARY_COLOR_EXT | SRC_ALPHA | $\max(0, Af)$ |
|  | ONE_MINUS_SRC_ALPHA | $(1 - \max(0, Af))$ |
| PREVIOUS_EXT | SRC_ALPHA | $\max(0, Ap)$ |
|  | ONE_MINUS_SRC_ALPHA | $(1 - \max(0, Ap))$ |
| TEXTURE<n>_ARB | SRC_ALPHA | $\max(0, At<n>)$ |
|  | ONE_MINUS_SRC_ALPHA | $(1 - \max(0, At<n>))$ |

Arguments for COMBINE_ALPHA_ARB (or COMBINE_ALPHA_EXT) functions

More information on this topic that is well known to those of ordinary skill may be found in section 3.8.9 of the OpenGL® 1.2.1 Specification.

Color Sum

At the beginning of color sum, a fragment has two RGBA colors: a primary color cpri (which texturing, if enabled, may have modified) and a secondary color csec. The components of these two colors are clamped to [0,1] and then summed to produce a single post-texturing RGBA color c. The components of c are then clamped to the range [0,1].

More information on this topic that is well known to those of ordinary skill may be found in section 3.9 of the OpenGL® 1.2.1 Specification.

Texture Shaders

Each texture unit is configured with one of twenty-one texture shader operations. Several texture shader operations may require additional state. All per-texture shader stage state is specified using the TexEnv commands with the target specified as TEXTURE_SHADER_NV. The per-texture shader state is replicated per texture unit so the texture unit selected by ActiveTextureARB determines which texture unit's environment is modified by TexEnv calls.

When calling TexEnv with a target of TEXTURE_SHADER_NV, pname may be one of SHADER_OPERATION_NV, CULL_MODES_NV, OFFSET_TEXTURE_MATRDC_NV, OFFSET_TEXTURE_SCALE_NV, OFFSET_TEXTURE_BIAS_NV, PREVIOUS_TEXTURE_INPUT_NV, or CONST_EYE_NV.

When TexEnv is called with the target of TEXTURE_SHADER_NV, SHADER_OPERATION_NV may be set to one of NONE, TEXTURE_1D, TEXTURE_2D, TEXTURE_CUBE_MAP_ARB, PASS_THROUGH_NV, CULL_FRAGMENT_NV, OFFSET_TEXTURE_2D_NV, OFFSET_TEXTURE_2D_SCALE_NV, OFFSET_TEXTURE_RECTANGLE_NV, OFFSET_TEXTURE_RECTANGLE_SCALE_NV, DEPENDENT_AR_TEXTURE_2D_NV, DEPENDENT_GB_TEXTURE_2D_NV, DOT_PRODUCT_NV, DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_CUBE_MAP_NV, DOT_PRODUCT_DEFFUSE_CUBE_MAP_NV, DOT_PRODUCT_REFLECT_CUBE_MAP_NV, or DOT_PRODUCT_CONST_EYE_REFLECT_CUBE_MAP_NV. The semantics of each of these shader operations is described in section 3.8.13.1 of the OpenGL® 1.2.1

Specification. Not every operation is necessarily supported in every texture unit. The restrictions for how these shader operations can be configured in various texture units are described in section 3.8.13.2 of the OpenGL® 1.2.1 Specification.

When TexEnv is called with the target of TEXTURE_SHADER_NV, CULL_MODES_NV is set to a vector of four cull comparisons by providing four symbolic tokens, each being either LESS or GEQUAL. These cull modes are used by the CULL_FRAGMENT_NV operation (see section 3.8.13.1.7 of the OpenGL® 1.2.1 Specification).

When TexEnv is called with the target of TEXTURE_SHADER_NV, RGBA_UNSIGNED_DOT_PRODUCT_MAPPING_NV may be set to either UNSIGNED_IDENTITY_NV or EXPAND_NORMAL_NV. This RGBA unsigned dot product mapping mode is used by the DOT_PRODUCT_NV operation (see section 3.8.13.1.14 of the OpenGL® 1.2.1 Specification) and other operations that compute dot products.

When TexEnv is called with the target of TEXTURE_SHADER_NV, PREVIOUS_TEXTURE_INPUT_NV may be set to TEXTUREi_ARB where i is between 0 and n−1 where n is the implementation-dependent number of texture units supported. The INVALID_OPERATION error is generated if i is greater than or equal to the current active texture unit.

When TexEnv is called with the target of TEXTURE_SHADER_NV, OFFSET_TEXTURE_MATRIX_NV may be set to a 2×2 matrix of floating-point values stored in column-major order as 4 consecutive floating-point values, i.e. as: [a1 a3], [a2 a4].

This matrix is used by the OFFSET_TEXTURE_2D_NV, OFFSET_TEXTURE_2D_SCALE_NV, OFFSET_TEXTURE_RECTANGLE_NV, and OFFSET_TEXTURE_RECTANGLE_SCALE_NV operations (see sections 3.8.13.1.8 through 3.8.13.1.11 of the OpenGL® 1.2.1 Specification).

When TexEnv is called with the target of TEXTURE_SHADER_NV, OFFSET_TEXTURE_SCALE_NV may be set to a floating-point value. When TexEnv is called with the target of TEXTURE_SHADER_NV, OFFSET_TEXTURE_BIAS_NV may be set to a floating-point value. These scale and bias values are used by the OFFSET_TEXTURE_2D_SCALE_NV and OFFSET_TEXTURE_RECTANGLE_SCALE_NV operations (see section 3.8.13.1.9 and 3.8.13.1.11 of the OpenGL® 1.2.1 Specification).

When TexEnv is called with the target of TEXTURE_SHADER_NV, CONST_EYE_NV is set to a vector of three floating-point values used as the constant eye vector in the DOT_PRODUCT_CONST_EYE_REFLECT_CUBE_MAP_NV texture shader (see section 3.8.13.1.19 of the OpenGL® 1.2.1 Specification).

Texture Shader Operations

The texture enables described in section 3.8.10 only affect conventional texturing mode; these enables are ignored when TEXTURE_SHADER_NV is enabled. Instead, the texture shader operation determines how texture coordinates are mapped to filtered texture values.

FIGS. 5A-D specify inter-stage dependencies, texture target dependencies, relevant inputs, and result types and values respectively for each texture shader operation. FIG. 5E specifies how the components of an accessed texture are mapped to the components of the texture unit RGBA result based on the base internal format of the accessed texture. Such figures and the following discussion describes each possible texture shader operation in detail.

With reference to FIG. 5A, texture shader inter-stage dependencies for each operation. If any one of the dependencies listed above is not met, the texture shader stage is considered inconsistent. Further texture shader target dependencies are listed in table X.Y. Additionally, if any one of the texture shader stages that a particular texture shader stage depends on is inconsistent, then the dependent texture shader stage is also considered inconsistent. When a texture shader stage is considered inconsistent, the inconsistent stage operates as if the stage's operation is NONE.

With reference to FIG. 5B, texture shader target dependencies for each operation. If the dependency listed above is not met, the texture shader stage is considered inconsistent.

With reference to FIG. 5C, relevant texture shader computation inputs for each operation. The (q*) for the texture coordinate set usage indicates that the q texture coordinate is used only when the DOT_PRODUCT_NV and DOT_PRODUCT_DIFFUSE_CUBE_MAP_NV operations are used in conjunction with DOT_PRODUCT_REFLECT_CUBE_MAP_NV.

With reference to FIG. 5D, texture shader stage results for each operation.

With reference to FIG. 5E, it shown how base internal formats components are mapped to RGBA values for texture shaders (note that the mapping for ALPHA is different from the mapping in Table 3.23 in the EXT_texture_env_combine extension).

None Texture Shader Operation

The NONE texture shader operation ignores the texture unit's texture coordinate set and generates the texture unit RGBA result (0,0,0,0) for its filtered texel value. The texture shader result is invalid. This texture shader stage is consistent.

When a texture unit is not needed while texture shaders are enabled, it is most efficient to set the texture unit's texture shader operation to NONE.

1D Projective Texturing

The TEXTURE_1D texture shader operation accesses the texture unit's 1D texture object (as described in sections 3.8.4, 3.8.5, and 3.8.6) using (s/q) for the 1D texture coordinate where s and q are the homogeneous texture coordinates for the texture unit. The result of the texture access becomes both the shader result and texture unit RGBA result (see FIG. 5E). The type of the shader result depends on the format type of the accessed texture. This mode is equivalent to conventional texturing's 1D texture target.

If the texture unit's 1D texture object is not consistent, then this texture shader stage is not consistent.

If this texture shader stage is not consistent, it operates as if it is the NONE operation.

2D Projective Texturing

The TEXTURE_2D texture shader operation accesses the texture unit's 2D texture object (as described in sections 3.8.4, 3.8.5, and 3.8.6) using (s/q,t/q) for the 2D texture coordinates where s, t, and q are the homogeneous texture coordinates for the texture unit. The result of the texture access becomes both the shader result and texture unit RGBA result (see FIG. 5E). The type of the shader result depends on the format type of the accessed texture. This mode is equivalent to conventional texturing's 2D texture target.

If the texture unit's 2D texture object is not consistent, then this texture shader stage is not consistent.

If this texture shader stage is not consistent, it operates as if it is the NONE operation.

Rectangle Projective Texturing

The TEXTURE_RECTANGLE_NV texture shader operation accesses the texture unit's rectangle texture object (as described in sections 3.8.4, 3.8.5, and 3.8.6) using (s/q,t/q) for the 2D texture coordinates where s, t, and q are the homogeneous texture coordinates for the texture unit. The result of the texture access becomes both the shader result and texture unit RGBA result (see FIG. 5E). The type of the shader result depends on the format type of the accessed texture. This mode is equivalent to NV_texture_rectangle's rectangle texture target.

If the texture unit's rectangle texture object is not consistent, then this texture shader stage is not consistent.

If this texture shader stage is not consistent, it operates as if it is the NONE operation.

Cube Map Texturing

The TEXTURE_CUBE_MAP_ARB texture shader operation accesses the texture unit's cube map texture object (as described in the ARB_texture_cube_map specification) using (s,t,r) for the 3D texture coordinate where s, t, and r are the homogeneous texture coordinates for the texture unit. The result of the texture access becomes both the shader result and texture unit RGBA result (see FIG. 5E). The type of the shader result depends on the format type of the accessed texture. This mode is equivalent to conventional texturing's cube map texture target.

If the texture unit's cube map texture object is not consistent, then this texture shader stage is not consistent.

If this texture shader stage is not consistent, it operates as if it is the NONE operation.

Pass Through

The PASS_THROUGH_NV texture shader operation converts an (s,t,r,q) texture PASSTHROUGH coordinate set into an RGBA color result (r,g,b,a). Each texture coordinate is first clamped to [0,1] before being mapped to its corresponding color component. The texture shader result and texture unit RGBA result of this operation are both assigned the clamped RGBA color result.

This operation in no way depends on any of the texture unit's texture objects.

Cull Fragment

The CULL_FRAGMENT_NV texture shader operation compares each component of the texture coordinate set (s,t,r,q) to zero based on the texture shader's corresponding cull mode. For the LESS cull mode to succeed, the corresponding component may be less than zero; otherwise the comparison fails. For the GEQUAL cull mode to succeed, the corresponding component may be greater or equal to zero; otherwise the comparison fails. If any of the four comparisons fails, the fragment is discarded.

The texture unit RGBA result generated is (0,0,0,0).

The texture shader result is invalid. This texture shader stage is consistent.

This operation in no way depends on any of the texture unit's texture objects.

Offset Texture 2D

The OFFSET_TEXTURE_2D_NV texture shader operation uses the transformed result of a previous texture shader stage to perturb the current texture shader stage's (s,t) texture coordinates (without a projective division by q). The resulting perturbed texture coordinates (s',t') are used to access the texture unit's 2D texture object (as described in sections 3.8.4, 3.8.5, and 3.8.6).

The result of the texture access becomes both the shader result and texture unit RGBA result (see FIG. 5E). The type of the shader result depends on the format type of the accessed texture.

The perturbed texture coordinates s' and t' are computed with floating-point math as follows in Table #18.

TABLE #18

$$s' = s + a1 * DSprev + a3 * DTprev$$
$$t' = t + a2 * DSprev + a4 * DTprev$$

where a1, a2, a3, and a4 are the texture shader stage's OFFSET_TEXTURE_MATRIX_NV values, and DSprev and DTprev are the (signed) DS and DT components of a previous texture shader unit's texture shader result specified by the current texture shader stage's PREVIOUS_TEXTURE_INPUT_NV value.

If the texture unit's 2D texture object is not consistent, then this texture shader stage is not consistent.

If the previous texture input texture object specified by the current texture shader stage's PREVIOUS_TEXTURE_INPUT_NV value has a base internalformat that is not one of DSDT_NV, DSDT_MAG_NV or DSDT_MAG_INTENSITY_NV, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Offset Texture 2D and Scale

The OFFSET_TEXTURE_2D_SCALE_NV texture shader operation extends the functionality of the OFFSET_TEXTURE_2D_NV texture shader operation. The texture unit's 2D texture object is accessed by the same perturbed s' and t' coordinates used by the OFFSET_TEXTURE_2D 2D_NV operation. The red, green, and blue components (but not alpha) of the RGBA result of the texture access are further scaled by the value Scale and clamped to the range [0,1]. This RGBA result is this shader's texture unit RGBA result.

This shader's texture shader result is the RGBA result of the texture access prior to scaling and clamping.

Scale is computed with floating-point math as follows:
Scale=textureOffsetBias+
textureOffsetScale*MAGprev where textureOffsetBias is the texture shader stage's OFFSET_TEXTURE_BIAS_NV value, textureOffsetScale is the texture shader stage's OFFSET_TEXTURE_SCALE_

SCALE_NV value, and MAGprev is the magnitude component of the a previous texture shader unit's result specified by the current texture shader stage's PREVIOUS_TEXTURE_INPUT_NV value.

The texture unit RGBA result (red',green',blue',alpha') is computed as follows in Table #19.

TABLE #19 red' = max(0.0, min(1.0, Scale * red))
green' = max(0.0, min(1.0, Scale * green))
blue' = max(0.0, min(1.0, Scale * blue))
alpha' = alpha where red, green, blue, and alpha are the texture access components.

If the unit's 2D texture object has any signed components, then this texture shader stage is not consistent.

If the texture unit's 2D texture object is has a format type other than RGBA (the DSDT_MAG_INTENSITY_NV base internal format does not count as an RGBA format type in this context), then this texture shader stage is not consistent.

If the texture unit's 2D texture object is not consistent, then this texture shader stage is not consistent.

If the previous texture input texture object specified by the current texture shader stage's PREVIOUS_TEXTURE_INPUT_NV value has a base internalformat that is not either DSDT_MAG_NV or DSDT_MAG_INTENSITY_NV, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Offset Texture Rectangle

The OFFSET_TEXTURE_RECTANGLE_NV shader operation operates identically to the OFFSET_TEXTURE_2D_NV shader operation except that the rectangle texture target is accessed rather than the 2D texture target.

If the texture unit's rectangle texture object (rather than the 2D texture object) is not consistent, then this texture shader stage is not consistent.

Offset Texture Rectangle Scale

The OFFSET_TEXTURE_RECTANGLE_SCALE_NV shader operation operates identically to the OFFSET_TEXTURE_2D_SCALE_NV shader operation except that the rectangle texture target is accessed rather than the 2D texture target.

If the texture unit's rectangle texture object (rather than the 2D texture object) is not consistent, then this texture shader stage is not consistent.

Dependent Alpha-Red Texturing

The DEPENDENT_AR_TEXTURE_2D_NV texture shader operation accesses the texture unit's 2D texture object (as described in section 3.8.4, 3.8.5, and 3.8.6 of the OpenGL® 1.2.1 specification) using (Aprev, Rprev) for the 2D texture coordinates where Aprev and Rprev are the are the alpha and red components of a previous texture input's RGBA texture shader result specified by the current texture shader stage's PREVIOUS_TEXTURE_INPUT_NV value. The result of the texture access becomes both the shader result and texture unit RGBA result (see FIG. 5E). The type of the shader result depends on the format type of the accessed texture.

If the texture unit's 2D texture object is not consistent, then this texture shader stage is not consistent.

If the previous texture input's texture shader result specified by the current texture shader stage's PREVIOUS_TEXTURE_INPUT_NV value has a texture shader result type other than RGBA (the DSDT_MAG_INTENSITY_INTENSITY_NV base internal format does not count as an RGBA format type in this context), then this texture shader stage is not consistent.

If the previous texture input's texture shader result specified by the current texture shader stage's PREVIOUS_TEXTURE_INPUT_NV value has a texture shader result type of RGBA but any of the RGBA components are signed, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Dependent Green-Blue Texturing

The DEPENDENT_GB_TEXTURE_2D_NV texture shader operation accesses the texture unit's 2D texture object (as described in section 3.8.4, 3.8.5, and 3.8.6) using (Gprev, Bprev) for the 2D texture coordinates where Gprev and Bprev are the are the green and blue components of a previous texture input's RGBA texture shader result specified by the current texture shader stage's PREVIOUS_TEXTURE_INPUT_NV value. The result of the texture access becomes both the shader result and texture unit RGBA result (see FIG. 5E). The type of the shader result depends on the format type of the accessed texture.

If the texture unit's 2D texture object is not consistent, then this texture shader stage is not consistent.

If the previous texture input's texture shader result specified by the current texture shader stage's PREVIOUS_TEXTURE_INPUT_NV value has a texture shader result type other than RGBA (the DSDT_MAG_INTENSITY_NV base internal format does not count as an RGBA format type in this context), then this texture shader stage is not consistent.

If the previous texture input's texture shader result specified by the current texture shader stage's PREVIOUS_TEXTURE_INPUT_NV value has a texture shader result type of RGBA but any of the RGBA components are signed, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Dot Product

The DOT_PRODUCT_NV texture shader operation computes a floating-point texture shader result. The texture shader result is the floating-point dot product of the texture unit's (s,t,r) texture coordinates and a remapped version of the RGBA or HILO texture shader result from a specified previous texture shader stage. The RGBA color result of this shader is (0,0,0,0).

The re-mapping depends on the specified previous texture shader stage's texture shader result type. Specifically, the re-mapping depends on whether this texture shader result type has all signed components or all unsigned components, and whether it has RGBA components or HILO components, and, in the case of unsigned RGBA texture shader results, the RGBA_UNSIGNED_DOT_PRODUCT_MAPPING_NV state.

If the specified previous texture unit's texture shader result type is HILO and all the type components are unsigned, then the floating-point result is computed by result=s* HI+t*LO+r, where HI and LO are the (unsigned) hi and lo components respectively of the previous texture unit's HILO texture shader result.

If the specified previous texture unit's texture shader result type is HILO and all the type components are signed, then the floating-point result is computed by result=s* HI+t*LO+r*sqrt(max(0, 1.0−HI*HI−LO*LO)) where HI and LO are the (signed) hi and to components respectively of the previous texture unit's texture shader result.

If the specified previous texture unit's texture shader result contains only signed RGBA components, then the floating-point result is computed by result=s*Rprev+t* Gprev+r*Bprev where Rprev, Gprev, and Bprev are the (signed) red, green, and blue components respectively of the previous texture unit's RGBA texture shader result.

If the specified previous texture unit's texture shader result contains only unsigned RGBA components, then the dot product computation depends on the RGBA_UNSIGNED_DOT_PRODUCT_MAPPING_NV state. When the RGBA_UNSIGNED_DOT_PRODUCT_MAPPING_NV is UNSIGNED_IDENTITY_NV, then the floating-point result for unsigned RGBA components is computed by result=s*Rprev+t*Gprev+r*Bprev where Rprev, Gprev, and Bprev are the (unsigned) red, green, and blue components respectively of the previous texture unit's RGBA texture shader result.

When the RGBA_UNSIGNED_DOT_PRODUCT_MAPPING_NV is EXPAND_NORMAL_NV, then the floating-point result for unsigned RGBA components is computed by result=s*(2.0*Rprev−1.0)+t*(2.0*Gprev−1.0)+r* (2.0*Bprev−1.0) where Rprev, Gprev, and Bprev are the (unsigned) red, green, and blue components respectively of the previous texture unit's RGBA texture shader result.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the components of the previous texture input texture object specified by the current texture shader stage's PREVIOUS_TEXTURE_INPUT_NV value have mixed signedness, then this texture shader stage is not consistent. For example, the SIGNED_RGB_UNSIGNED_ALPHA_NV base internal format has mixed signedness.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

This operation in no way depends on any of the texture unit's texture objects.

Dot Product Texture 2D

The DOT_PRODUCT_TEXTURE_2D_NV texture shader operation accesses the texture unit's 2D texture object (as described in sections 3.8.4, 3.8.5, and 3.8.6 of the OpenGL® 1.2.1 specification) using (dotP,dotC) for the 2D texture coordinates. The result of the texture access becomes both the shader result and texture unit RGBA result (see FIG. 5E). The type of the shader result depends on the format type of the accessed texture.

Assuming that i is the current texture shader stage, dotP is the floating-point dot product result from the i−1 texture shader stage, assuming the i−1 texture shader stage's operation is DOT_PRODUCT_NV. dotC is the floating-point dot product result from the current texture shader stage. dotC is computed in the identical manner used to compute the floating-point result of the DOT_PRODUCT_NV texture shader.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If the i−1 texture shader stage operation is not DOT_PRODUCT_NV, then this texture shader stage is not consistent.

If the i−1 texture shader stage is not consistent, then this texture shader stage is not consistent.

If the texture unit's 2D texture object is not consistent, then this texture shader stage is not consistent.

If this texture shader stage is not consistent, it operates as if it is the NONE operation.

Dot Product Texture Rectangle Scale

The DOT_PRODUCT_TEXTURE_RECTANGLE_NV shader operation operates identically to the DOT_PRODUCT_TEXTURE_2D_NV shader operation except that the rectangle texture target is accessed rather than the 2D texture target.

If the texture unit's rectangle texture object (rather than the 2D texture object) is not consistent, then this texture shader stage is not consistent.

Dot Product Texture Cube Map

The DOT_PRODUCT_TEXTURE_CUBE_MAP_NV texture shader operation accesses the texture unit's cube map texture object (as described in the ARB_texture_cube_map specification) using (dotPP,dotP,dotC) for the 3D texture coordinates. The result of the texture access becomes both the shader result and texture unit RGBA result (see FIG. 5E). The type of the shader result depends on the format type of the accessed texture.

Assuming that i is the current texture shader stage, dotPP is the floating-point dot product texture shader result from the i−2 texture shader stage, assuming the i−2 texture shader stage's operation is DOT_PRODUCT_NV. dotP is the floating-point dot product texture shader result from the i−1 texture shader stage, assuming the i−1 texture shader stage's operation is DOT_PRODUCT_NV. dotC is the floating-point dot product result from the current texture shader stage. dotC is computed in the identical manner used to compute the floating-point result of the DOT_PRODUCT_NV texture shader.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If either the i−1 or i−2 texture shader stage operation is not DOT_PRODUCT_NV, then this texture shader stage is not consistent.

If either the i−1 or i−2 texture shader stage is not consistent, then this texture shader stage is not consistent.

If the texture unit's cube map texture object is not consistent, then this texture shader stage is not consistent.

If this texture shader stage is not consistent, it operates as if it is the NONE operation.

Dot Product Reflect Cube Map

The DOT_PRODUCT_REFLECT_CUBE_MAP_NV and DOT_PRODUCT_DIFFUSE_CUBE_MAP_NV texture shader operations are typically used together.

The DOT_PRODUCT_REFLECT_CUBE_MAP_NV texture shader operation accesses the texture unit's cube map texture object (as described in the ARB_texture_cube_map specification) using (rx,ry,rz) for the 3D texture coordinates. The result of the texture access becomes both the shader result and texture unit RGBA result (see FIG. 5E). The type of the shader result depends on the format type of the accessed texture.

Let $R=(rx,ry,rz)$, $N=(dotPP,dotP,dotC)$, and $E=(qPP, qP,qC)$, then $R=2*(N \text{ dot } E)/(N \text{ dot } N)*N-E$ Assuming that i is the current texture shader stage, dotPP is the floating-point dot product texture shader result from the i−2 texture shader stage, assuming the i−2 texture shader stage's operation is DOT_PRODUCT_NV. dotP is the floating-point dot product texture shader result from the i−1 texture shader stage, assuming the i−1 texture shader stage's operation is either DOT_PRODUCT_NV or DOT_PRODUCT_DIFFUSE_NV. dotC is the floating-point dot product result from the current texture shader stage. dotC is computed in the identical manner used to compute the floating-point result of the DOT_PRODUCT_NV texture shader described in section 3.8.13.1.14.

qPP is the q component of the i−2 texture shader stage's texture coordinate set. qP is the q component of the i−1 texture shader stage's texture coordinate set. qC is the q component of the current texture shader stage's texture coordinate set.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If this texture shader stage's PREVIOUS_TEXTURE_INPUT_NV value refers to texture unit i−2 or i−1, then this texture shader stage is not consistent.

If the previous texture input shader stage specified by the current texture shader stage's PREVIOUS_TEXTURE_INPUT_NV value is not consistent, then this texture shader stage is not consistent.

If the i−2 texture shader stage operation is not DOT_PRODUCT_NV, then this texture shader stage is not consistent.

If the i−1 texture shader stage operation is not DOT_PRODUCT_NV or DOT_PRODUCT_DIFFUSE_CUBE_MAP_NV, then this texture shader stage is not consistent.

If either the i−1 or i−2 texture shader stage is not consistent, then this texture shader stage is not consistent.

If the texture unit's cube map texture object is not consistent, then this texture shader stage is not consistent.

If this texture shader stage is not consistent, it operates as if it is the NONE operation.

Dot Product Constant Eye Reflect Cube Map

The DOT_PRODUCT_CONST_EYE_REFLECT_CUBE_MAP_NV texture shader operation operates the same as the DOT_PRODUCT_REFLECT_CUBE_MAP_NV operation except that the eye vector E is equal to the three floating-point values assigned to the texture shader's eye constant (rather than the three q components of the given texture unit and the previous two texture units).

The DOT_PRODUCT_CONST_EYE_REFLECT_CUBE_MAP_NV operation has the same texture shader consistency rules as the DOT_PRODUCT_REFLECT_CUBE_MAP_NV operation.

Dot Product Diffuse Cube Map

The DOT_PRODUCT_DIFFUSE_CUBE_MAP_NV texture shader operation accesses the texture unit's cube map texture object (as described in the ARB_texture_cube_map specification) using (dotP,dotC,dotN) for the 3D texture coordinates. The result of the texture access becomes both the shader result and texture unit RGBA result (see FIG. 5E). The type of the shader result depends on the format type of the accessed texture.

Assuming that i is the current texture shader stage, dotP is the floating-point dot product texture shader result from the i−1 texture shader stage, assuming the i−1 texture shader stage's operation is DOT_PRODUCT_NV. dotC is the floating-point dot product result from the current texture shader stage. dotC is computed in the identical manner used to compute the floating-point result of the DOT_PRODUCT_NV texture shader. dotN is the floating-point dot product texture shader result from the i+1 texture shader stage, assuming the next texture shader stage's operation is either DOT_PRODUCT_REFLECT_CUBE_MAP_NV or DOT_PRODUCT_CONST_EYE_REFLECT_CUBE_MAP_NV.

If the texture unit's cube map texture object is not consistent, then this operation operates as if it is the NONE operation. If the previous texture unit's texture shader operation is not DOT_PRODUCT_NV, then this operation operates as if it is the NONE operation. If the next texture unit's texture shader operation is neither DOT_PRODUCT_REFLECT_CUBE_MAP_NV nor DOT_PRODUCT_CONST_EYE_REFLECT_CUBE_MAP_NV, then this operation operates as if it is the NONE operation. If the next texture unit's texture shader operation is either DOT_PRODUCT_REFLECT_CUBE_MAP_NV or DOT_PRODUCT_CONST_EYE_REFLECT_CUBE_MAP_NV, but the next texture unit operation is operating as if it is the NONE operation, then this operation operates as if it is the NONE operation. If the specified previous input texture unit is inconsistent or uses the DOT_PRODUCT_NV texture shader operation, then this operation operates as if it is the NONE operation.

If the previous texture input texture object specified by the current texture shader stage's PREVIOUS_TEXTURE_INPUT_NV value has a format type other than RGBA or HILO (the DSDT_MAG_INTENSITY_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If the i−1 texture shader stage operation is not DOT_PRODUCT_NV, then this texture shader stage is not consistent.

If the i+1 texture shader stage operation is not DOT_PRODUCT_REFLECT_CUBE_MAP_NV or DOT_PRODUCT_CONST_EYE_REFLECT_CUBE_MAP_NV, then this texture shader stage is not consistent.

If either the i−1 or i+1 texture shader stage is not consistent, then this texture shader stage is not consistent.

If the texture unit's cube map texture object is not consistent, then this texture shader stage is not consistent.

If this texture shader stage is not consistent, it operates as if it is the NONE operation.

Dot Product Depth Replace

The DOT_PRODUCT_DEPTH_REPLACE_NV texture shader operation replaces the incoming fragments depth (in window coordinates, after polygon offset and before conversion to fixed-point, i.e. in the [0,1] range) with a new depth value. The new depth is computed as follows: depth=dotP/dotC Assuming that i is the current texture shader stage, dotP is the floating-point dot product texture shader result from the i−1 texture shader stage, assuming the i−1 texture shader stage's operation is DOT_PRODUCT_NV. dotC is the floating-point dot product result from the current texture shader stage. dotC is computed in the identical manner used to compute the floating-point result of the DOT_PRODUCT_NV texture shader.

If the new depth value is outside of the range of the near and far depth range values, the fragment is rejected.

The texture unit RGBA result generated is (0,0,0,0). The texture shader result is invalid.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If the i−1 texture shader stage operation is not DOT_PRODUCT_NV, then this texture shader stage is not consistent.

If the i−1 texture shader stage is not consistent, then this texture shader stage is not consistent.

If any previous texture shader stage operation is DOT_PRODUCT_DEPTH_REPLACE_NV and that previous stage is consistent, then this texture shader stage is not consistent. (This eliminates the potential for two stages to each be performing a depth replace operation.)

If this texture shader stage is not consistent, it operates as if it is the NONE operation.

This operation in no way depends on any of the texture unit's texture objects.

Texture Shader Restrictions

There are various restrictions on possible texture shader configurations. These restrictions are described in this section.

The error INVALID_OPERATION occurs if the SHADER_OPERATION_NV parameter for texture unit 0 is assigned one of OFFSET_TEXTURE_2D_NV, OFFSET_TEXTURE_2D_SCALE_NV, OFFSET_TEXTURE_RECTANGLE_NV, OFFSET_TEXTURE_RECTANGLE_SCALE_NV, DEPENDENT_AR_TEXTURE_2D_NV, DEPENDENT_GB_TEXTURE_2D_NV, DOT_PRODUCT_NV, DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV, or DOT_PRODUCT_CONST_EYE_REFLECT_CUBE_MAP_NV. Each of these texture shaders may require a previous texture shader result that is not possible for texture unit 0. Therefore these shaders are disallowed for texture unit 0.

The error INVALID_OPERATION occurs if the SHADER_OPERATION_NV parameter for texture unit 1 is assigned one of DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV, or DOT_PRODUCT_CONST_EYE_REFLECT_CUBE_MAP_NV. Each of these texture shaders may require either two previous texture shader results or a dot product result that cannot be generated by texture unit 0. Therefore these shaders are disallowed for texture unit 1.

The error INVALID_OPERATION occurs if the SHADER_OPERATION_NV parameter for texture unit 2 is assigned one of DOT_PRODUCT_TEXTURE_CUBE_MAP_NV, DOT_PRODUCT_REFLECT_CUBE_MAP_NV, DOT_PRODUCT_CONST_EYE_REFLECT_CUBE_MAP_NV. Each of these texture shaders may require three previous texture shader results. Therefore these shaders are disallowed for texture unit 2.

The error INVALID_OPERATION occurs if the SHADER_OPERATION_NV parameter for texture unit n−1 (where n is the number of supported texture units) is assigned either DOT_PRODUCT_NV or DOT_PRODUCT_DIFFUSE_CUBE_MAP_NV. DOT_PRODUCT_NV is invalid for the final texture shader stage because it is only useful as an input to a successive texture shader stage. DOT_PRODUCT_DIFFUSE_CUBE_MAP_NV is invalid for the final texture shader stage because it may be followed by the DOT_PRODUCT_REFLECT_CUBE_MAP_NV operation in the immediately successive stage. Therefore these shaders are disallowed for texture unit n−1.

Required State

The state required for texture shaders consists of a single bit to indicate whether or not texture shaders are enabled, a vector of three floating-point values for the constant eye vector, and n sets of per-texture unit state where n is the implementation-dependent number of supported texture units. The set of per-texture unit texture shader state consists of the twenty-one-valued integer indicating the texture shader operation, four two-valued integers indicating the cull modes, an integer indicating the previous texture unit input, a two-valued integer indicating the RGBA unsigned dot product mapping mode, a 2×2 floating-point matrix indicating the texture offset transform, a floating-point value indicating the texture offset scale, a floating-point value indicating the texture offset bias, and a bit to indicate whether or not the texture shader stage is consistent.

In the initial state, the texture shaders state is set as follows: the texture shaders enable is disabled; the constant eye vector is (0,0,−1); all the texture shader operations are NONE; the RGBA unsigned dot product mapping mode is UNSIGNED_IDENTITY_NV; all the cull mode values are GEQUAL; all the previous texture units are TEXTURE0_ARB; each texture offset matrix is an identity matrix; all texture offset scales are 1.0; and all texture offset biases are 0.0."

Texture Environments and Texture Functions

The env argument to GetTexEnv may be one of TEXTURE_ENV, TEXTURE_FILTER_CONTROL_EXT, or TEXTURE_SHADER_NV.

For GetTexEnv, when the target is TEXTURE_SHADER_NV, the texture shader stage consistency can be queried with SHADER_CONSISTENT_NV.

Queries of TEXTURE_BORDER_COLOR return the same values as the TEXTURE_BORDER_VALUES query.

More information on this topic that is well known to those of ordinary skill may be found in section 6.1.3 of the OpenGL® 1.2.1 Specification.

Texture Queries

Calling GetTexImage with a color format (one of RED, GREEN, BLUE, ALPHA, RGB, RGBA, LUMINANCE, or LUMINANCE_ALPHA) when the texture image is of a format type (see table 3.15 of the OpenGL® 1.2.1 Specification) other than RGBA (the DSDT_MAG_INTENSITY_NV base internal format does not count as an RGBA format type in this context) causes the error INVALID_OPERATION. Calling GetTexImage with a format of HILO when the texture image is of a format type (see table 3.15 of the OpenGL® 1.2.1 Specification) other than HILO causes the error INVALID_OPERATION. Calling GetTexImage with a format of DSDT_NV when the texture image is of a base internal format other than DSDT_NV causes the error INVALID_OPERATION. Calling GetTexImage with a format of DSDT_MAG_NV when the texture image is of a base internal format other than DSDT_MAG_NV causes the error INVALID_OPERATION. Calling GetTexImage with a format of DSDT_MAG_VIB_NV when the texture image is of a base internal format other than DSDT_MAG_INTENSITY_NV causes the error INVALID_OPERATION.

More information on this topic that is well known to those of ordinary skill may be found in section 6.1.4 of the OpenGL® 1.2.1 Specification.

Table #20 illustrates a plurality of exemplary optional dependencies.

TABLE #20

Dependencies on ARB_texture_env_add or EXT_texture_env_add
If neither ARB_texture_env_add nor EXT_texture_env_add are implemented, then the references to ADD are invalid and may be ignored.
Dependencies on ARB_texture_env_combine or EXT_texture_env_combine
If neither ARB_texture_env_combine nor EXT_texture_env_combine are implemented, then the references to COMBINE_ARB and COMBINE_EXT are invalid and may be ignored.
Dependencies on EXT_texture_lod_bias
If EXT_texture_lod_bias is not implemented, then the references to TEXTURE_FILTER_CONTROL_EXT are invalid and may be ignored.
Dependencies on NV_texture_env_combine4
If NV_texture_env_combine4 is not implemented, then the references to COMBINE4_NV are invalid and may be ignored.
Dependencies on NV_texture_rectangle
If NV_texture_rectangle is not implemented, then the references to TEXTURE_RECTANGLE_NV, OFFSET_TEXTURE_RECTANGLE_NV, OFFSET_TEXTURE_RECTANGLE_SCALE_NV, and DOT_PRODUCT_TEXTURE_RECTANGLE_NV are invalid and may be ignored.

Table #21 illustrates a plurality of exemplary errors.

TABLE #21

INVALID_ENUM is generated if one of HILO_NV, DSDT_NV, DSDT_MAG_NV, or DSDT_MAG_VIBRANCE_NV is used as the format for DrawPixels, ReadPixels, ColorTable, ColorSubTable, ConvolutionFilter1D, ConvolutionFilter2D, SeparableFilter2D, GetColorTable, GetConvolutionFilter, GetSeparableFilter, GetHistogram, or GetMinMax.
INVALID_ENUM is generated if either UNSIGNED_INT_S8_S8_8_8_NV or UNSIGNED_INT_8_8_S8_S8_REV is used as the type for DrawPixels, ReadPixels, ColorTable, ColorSubTable, ConvolutionFilter1D, ConvolutionFilter2D, SeparableFilter2D, GetColorTable, GetConvolutionFilter, GetSeparableFilter, GetHistogram, or GetMinMax.

TABLE #21-continued

INVALID_OPERATION is generated if a packed pixel format type
listed in table 3.8 is used with DrawPixels, ReadPixels,
ColorTable, ColorSubTable, ConvolutionFilter1D,
ConvolutionFilter2D, SeparableFilter2D, GetColorTable,
GetConvolutionFilter, GetSeparableFilter, GetHistogram, GetMinMax,
TexImage1D, TexImage2D, TexSubImage1D, TexSubImage2D,
TexSubImage3d, or GetTexImage but the format parameter does not
match on of the allowed Matching Pixel Formats listed in table 3.8
for the specified packed type parameter.
INVALID_OPERATION is generated when TexImage1D or TexImage2D
are called and the format is HILO_NV and the internalformat is not
one of HILO_NV, HILO16_NV, SIGNED_HILO_NV,
SIGNED_HILO16_NV; or if the internalformat is one of HILO_NV,
HILO16_NV, SIGNED_HILO_NV, or SIGNEDHILO16_NV and the
format is not HILO_NV.
INVALID_OPERATION is generated when TexImage2D, or
TexImage1D is called and if the format is DSDT_NV and the
internalformat is not either DSDT_NV or DSDT8_NV; or if the
internal format is either DSDT_NV or DSDT8_NV and the format is
not DSDT_NV.
INVALID_OPERATION is generated when TexImage2D, or
TexImage1D is called and if the format is DSDT_MAG_NV and the
internalformat is not either DSDT_MAG_NV or DSDT8_MAG8_NV;
or if the internal format is either DSDT_MAG_NV or
DSDT8_MAG8_NV and the format is not DSDT_MAG_NV.
INVALID_OPERATION is generated when TexImage2D or TexImage1D
is called and if the format is DSDT_MAG_VIB_NV and the
internalformat is not either DSDT_MAG_INTENSITY_NV or
DSDT8_MAG8_INTENSITY8_NV; or if the internal format is either
DSDT_MAG_INTENSITY_NV or DSDT8_MAG8_INTENSITY8_NV
and the format is not DSDT_MAG_VIB_NV.
INVALID_OPERATION is generated when CopyTexImage2D,
CopyTexImage1D, CopyTexSubImage2D, or CopyTexSubImage1D
is called and the internal format of the texture array to which the pixels
are to be copied is one of HILO_NV, HILO16_NV, SIGNED_HILO_NV,
SIGNED_HILO16_NV,
DSDT_NV, DSDT8_NV, DSDT_MAG_NV, DSDT8_MAG8_NV,
DSDT_MAG_INTENSITY_NV, or DSDT8_MAG8_INTENSITY8_NV.
INVALID_OPERATION is generated when TexSubImage2D or
TexSubImage1D is called and the texture array's base internal
format is not one of HILO_NV, DSDT_NV, DSDT_MAG_NV, or
DSDT_INTENSITY_NV, and the format parameter is not one of
COLOR_INDEX, RED, GREEN, BLUE, ALPHA, RGB, RGBA,
LUMINANCE, or LUMINANCE_ALPHA
INVALID_OPERATION is generated when TexSubImage2D or
TexSubImage1D is called and the texture array's base internal
format is HILO_NV and the format parameter is not HILO_NV.
INVALID_OPERATION is generated when TexSubImage2D or
TexSubImage1D is called and the texture array's base internal
format is DSDT_NV and the format parameter is not DSDT_NV.
INVALID_OPERATION is generated when TexSubImage2D
orexSubImage1D is called and the texture array's base internal
format is DSDT_MAG_NV and the format parameter is not
DSDT_MAG_NV.
INVALID_OPERATION is generated when TexSubImage2D or
TexSubImage1D is called and the texture array's base internal
format is DSDT_MAG_INTENSITY_NV and the format parameter is not
DSDT_MAG_VIRBANCE_NV.
INVALID_OPERATION is generated when TexEnv is called and the
PREVIOUS_TEXTURE_INPUT_NV parameter for texture unit i is
assigned the value TEXTUREi_ARB where f i is greater than or
equal to the current active texture unit.
INVALID_OPERATION is generated when TexEnv is called and the
SHADER_OPERATION_NV parameter for texture unit 0 is assigned one
of OFFSET_TEXTURE_2D_NV, OFFSET_TEXTURE_2D_SCALE_NV,
OFFSET_TEXTURE_RECTANGLE_NV,
OFFSET_TEXTURE_RECTANGLE_SCALE_NV,
DEPENDENT_AR_TEXTURE_2D_NV,
DEPENDENT_GB_TEXTURE_2D_NV,
DOT_PRODUCT_NV, DOT_PRODUCT_DEPTH_REPLACE_NV,
DOT_PRODUCT_TEXTURE_2D_NV,
DOT_PRODUCT_TEXTURE_RECTANGLE_NV,
DOT_PRODUCT_TEXTURE_CUBE_MAP_NV,
DOT_PRODUCT_DIFFUSE_CUBE_MAP_NV,
DOT_PRODUCT_REFLECT_CUBE_MAP_NV. or
DOT_PRODUCT_CONST_EYE_REFLECT_CUBE_MAP_NV.
INVALID_OPERATION is generated when TexEnv is called and the
SHADER_OPERATION_NV parameter for texture unit 1 is assigned one
of DOT_PRODUCT_DEPTH_REPLACE_NV,
DOT_PRODUCT_TEXTURE_2D_NV,
DOT_PRODUCT_TEXTURE_RECTANGLE_NV,
DOT_PRODUCT_TEXTURE_CUBE_MAP_NV,
DOT_PRODUCT_DIFFUSE_CUBE_MAP_NV,
DOT_PRODUCT_REFLECT_CUBE_MAP_NV,
or DOT_PRODUCT_CONST_EYE_REFLECT_CUBE_MAP_NV.
INVALID_OPERATION is generated when TexEnv is called and the
SHADER_OPERATION_NV
parameter for texture unit 2 is assigned one of
DOT_PRODUCT_TEXTURE_CUBE_MAP_NV,
DOT_PRODUCT_REFLECT_CUBE_MAP_NV,
or DOT_PRODUCT_CONST_EYE_REFLECT_CUBE_MAP_NV.
INVALID_OPERATION is generated when TexEnv is called and the
SHADER_OPERATION_NV parameter for texture unit n-1 (where n is the
number of supported texture units) is assigned either
DOT_PRODUCT_NV or DOT_PRODUCT_DIFFUSE_CUBE_MAP_NV.
INVALID_OPERATION is generated when GetTexImage is called
with a color format (one of RED, GREEN, BLUE, ALPHA, RGB, RGBA,
LUMINANCE, or LUMINANCE_ALPHA) when the texture image is of a
format type (see table 3.15) other than RGBA (the
DSDT_MAG_INTENSITY_NV base internal format does not count as an
RGBA format type in this context).
INVALID_OPERATION is generated when GetTexImage is called
with a format of HILO when the texture image is of a format type
(see table 3.15) other than HILO.
INVALID_OPERATION is generated when GetTexImage is called
with a format of DSDT_NV when the texture image is of a base
internal format other than DSDT_NV.
INVALID_OPERATION is generated when GetTexImage is called
with a format of DSDT_MAG_NV when the texture image is of a base
internal format other than DSDT_MAG_NV.
INVALID_OPERATION is generated when GetTexImage is called
with a format of DSDT_MAG_VIBRANCE_NV when the texture image
is of a base internal format other than DSDT_MAG_INTENSITY_NV
causes the error INVALID_OPERATION.

New State

Table #22 may be a pertinent addition to table 6.12 of the OpenGL® 1.2.1 Specification.

TABLE #22

| Get Value | Type | Get Command | Initial Value | Description | Sec | Attribute |
|---|---|---|---|---|---|---|
| TEXTURE_HI_SIZE_NV | nxZ+ | GetTexLevelParameter | 0 | xD texture image i's hi resolution | 3.8 | texture |
| TEXTURE_LO_SIZE_NV | nxZ+ | GetTexLevelParameter | 0 | xD texture image i's lo resolution | 3.8 | texture |
| TEXTURE_DS_SIZE_NV | nxZ+ | GetTexLevelParameter | 0 | xD texture image i's ds resolution | 3.8 | texture |
| TEXTURE_DT_SIZE_NV | nxZ+ | GetTexLevelParameter | 0 | xD texture image i's dt resolution | 3.8 | texture |
| TEXTURE_MAG_SIZE_NV | nxZ+ | GetTexLevelParameter | 0 | xD texture image i's mag resolution | 3.8 | texture |

Table #23 may be a pertinent addition to table 6.13 of the OpenGL® 1.2.1 Specification.

TABLE #23

| Change the TEXTURE_BORDER_COLOR line in table 6.13 to read: | | | | | |
|---|---|---|---|---|---|
| Get Value | Type | Get Command | Initial Value | Description | Sec Attribute |
| TEXTURE_BORDER_VALUES_NV (TEXTURE_BORDER_COLOR) | 4xR | GetTexParameter | (0,0,0,0) | Texture border values | 3.8 texture |

FIG. 6 illustrates texture shaders. It should be noted that the "Tx" type prefix means that the state is per-texture unit. Further, the "Zn" type is an n-valued integer where n is the implementation-dependent number of texture units supported.

Embodiment #2

As an option, the following embodiment may be implemented in the context of the previous embodiment and the OpenGL® 1.2.1 specification, which is incorporated herein by reference in its entirety.

This extension extends the NV_texture_shader functionality to support texture shader operations for 3D textures.

Table #24 illustrates two new texture shader operations.

TABLE #24

| <conventional textures> |
|---|
| 22. TEXTURE_3D - Accesses a 3D texture via (s/q, t/q, r/q). |
| <dot product textures > |
| 23. DOT_PRODUCT_TEXTURE_3D_NV - When preceded by two DOT_PRODUCT_NV programs in the previous two texture shader stages, computes a third similar dot product and composes the three dot products into (s, t, r) texture coordinate set to access a 3D non-projective texture. |

The present separate extension may be provided since not all implementations of NV_texture_shader may support 3D textures in hardware.

Further, breaking this extension out into a distinct extension allows OpenGL® programs that only would use 3D textures if they are supported in hardware to determine whether hardware support is available by explicitly looking for the NV_texture_shader2 extension.

If an implementation wanted to support NV_texture_shader2 operations within a software rasterizer, implementations may be free to implement the 3D texture texture shader operations in software. In this case, the implementation may NOT advertise the V_texture_shader2 extension, but may still accept the GL_TEXTURE_3D and GL_DOT_PRODUCT_TEXTURE_3D_NV texture shader operations without an error.

Likewise, the glTexImage3D and glCopyTexImage3D commands may accept the new internal texture formats, formats, and types allowed by this extension may be accepted without an error.

When NV_texture_shader2 is not advertised in the GL_EXTENSIONS string, but the extension functionality works without GL errors, programs may expect that these two texture shader operations are slow.

Table #25 illustrates new tokens.

TABLE #25

| When the <target> and <pname> parameters of TexEnvf, TexEnvfv, TexEnvi, and TexEnviv are TEXTURE_SHADER_NV and SHADER_OPERATION_NV respectively, then the value of <param> or the value pointed to by <params> may be: | |
|---|---|
| TEXTURE_3D | |
| DOT_PRODUCT_TEXTURE_3D_NV | 0x86EF |
| Accepted by the <format> parameter of TexImage3D and TexSubImage3D: | |
| HILO_NV | 0x86F4 |
| DSDT_NV | 0x86F5 |
| DSDT_MAG_NV | 0x86F6 |
| DSDT_MAG_VIB_NV | 0x86F7 |
| Accepted by the <type> parameter of TexImage3D and TexSubImage3D: | |
| UNSIGNED_INT_S8_S8_8_8_NV | 0x86DA |
| UNSIGNED_INT_8_8_S8_S8_REV_NV | 0x86DB |
| Accepted by the <internalformat> parameter of TexImage3D: | |
| SIGNED_RGBA_NV | 0x86FB |
| SIGNED_RGBA8_NV | 0x86FC |
| SIGNED_RGB_NV | 0x86FE |
| SIGNED_RGB8_NV | 0x86FF |
| SIGNED_LUMINANCE_NV | 0x8701 |
| SIGNED_LUMINANCE8_NV | 0x8702 |
| SIGNED_LUMINANCE_ALPHA_NV | 0x8703 |
| SIGNED_LUMINANCE8_ALPHA8_NV | 0x8704 |
| SIGNED_ALPHA_NV | 0x8705 |
| SIGNED_ALPHA8_NV | 0x8706 |
| SIGNED_INTENSITY_NV | 0x8707 |
| SIGNED_INTENSITY8_NV | 0x8708 |
| SIGNED_RGB_UNSIGNED_ALPHA_NV | 0x870C |
| SIGNED_RGB8_UNSIGNED_ALPHA8_NV | 0x870D |
| Accepted by the <internalformat> parameter of TexImage3D: | |
| HILO_NV | |
| HILO16_NV | 0x86F8 |
| SIGNED_HILO_NV | 0x86F9 |
| SIGNED_HILO16_NV | 0x86FA |
| DSDT_NV | |
| DSDT8_NV | 0x8709 |
| DSDT_MAG_NV | |
| DSDT8_MAG8_NV | 0x870A |
| DSDT_MAG_INTENSITY_NV | 0x86DC |
| DSDTB_MAG8_INTENSITY8_NV | 0x870B |

Texturing

The alternative to conventional texturing is the texture shaders mechanism. When texture shaders are enabled, each texture unit uses one of twenty-three texture shader operations. Twenty of the twenty-three shader operations map an (s,t,r,q) texture coordinate set to an RGBA color. Of these, four texture shader operations directly correspond to the 1D, 2D, 3D, and cube map conventional texturing operations. Depending on the texture shader operation, the mapping from the (s,t,r,q) texture coordinate set to an RGBA color may depend on the given texture unit's currently bound texture object state and/or the results of previous texture shader operations. The three remaining texture shader operations respectively provide a fragment culling mechanism based on texture coordinates, a means to replace the fragment depth value, and a dot product operation that computes a floating-point value for use by subsequent texture shaders. The specifics of each texture shader operation are described hereinabove.

More information on this topic that is well known to those of ordinary skill may be found in section 3.8 of the OpenGL® 1.2.1 Specification.

Alternate Texture Image Specification Commands

CopyTexSubImage3D, CopyTexSubImage2D, and CopyTexSubImage1D generate the error INVALID_OPERATION if the internal format of the texture array to which the pixels are to be copied is one of HILO_NV, HILO16_NV, SIGNED_HILO_NV, SIGNED_HILO16_NV, DSDT_NV, DSDT8_NV, DSDT_MAG_NV, DSDT8_MAG8_NV, DSDT_MAG_INTENSITY_NV, or DSDT8_MAG8_INTENSITY8_NV.

TexSubImage3D, TexSubImage2D, and TexSubImage1D generate the error INVALID_OPERATION if the internal format of the texture array to which the texels are to be copied has a different format type (according to table 3.15 of the OpenGL® 1.2.1 Specification) than the format type of the texels being specified. Specifically, if the base internal format is not one of HILO_NV, DSDT_NV, DSDT_MAG_NV, or DSDT_INTENSITY_NV, then the format parameter may be one of COLOR_INDEX, RED, GREEN, BLUE, ALPHA, RGB, RGBA, LUMINANCE, or LUMINANCE_ALPHA; if the base internal format is HILO_NV, then the format parameter may be HILO_NV; if the base internal format is DSDT_NV, then the format parameter may be DSDT_NV; if the base internal format is DSDT_MAG_NV, then the format parameter may be DSDT_MAG_NV; if the base internal format is DSDT_MAG_INTENSITY_NV, the format parameter may be DSDT_MAG_VLB_NV."

More information on this topic that is well known to those of ordinary skill may be found in section 3.8.2 of the OpenGL® 1.2.1 Specification.

Texture Shaders

Each texture unit is configured with one of twenty-three texture shader operations. Several texture shader operations require additional state. All per-texture shader stage state is specified using the TexEnv commands with the target specified as TEXTURE_SHADER_NV. The per-texture shader state is replicated per texture unit so the texture unit selected by ActiveTextureARB determines which texture unit's environment is modified by TexEnv calls.

When TexEnv is called with the target of TEXTURE_SHADER_NV, SHADER_OPERATION_NV may be set to one of NONE, TEXTURE_1D, TEXTURE_2D, TEXTURE_3D, TEXTURE_CUBE_MAP_ARB, PASS_THROUGH_NV, CULL_FRAGMENT_NV, OFFSET_TEXTURE_2D_NV, OFFSET_TEXTURE_2D_SCALE_NV, OFFSET_TEXTURE_RECTANGLE_NV, OFFSET_TEXTURE_RECTANGLE_SCALE_NV, DEPENDENT_AR_TEXTURE_2D_NV, DEPENDENT_GB_TEXTURE_2D_NV, DOT_PRODUCT_NV, DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_3D_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV, or DOT_PRODUCT_CONST_EYE_REFLECT_CUBE_MAP_NV. The semantics of each of these shader operations is described herein. Not every operation is supported in every texture unit. The restrictions for how these shader operations can be configured in various texture units are described herein.

Texture Shader Operations

FIGS. 5A-5D set forth during reference to the NV_texture_shader specification may be amended in the context of the present extension to include entries for 3D texture operations. See FIG. 7.

3D Projective Texturing

The TEXTURE_3D texture shader operation accesses the texture unit's 3D texture object (as described in sections 3.8.4, 3.8.5, and 3.8.6 of the OpenGL® 1.2.1 Specification) using (s/q,t/q,r/q) for the 3D texture coordinates where s, t, r, and q are the homogeneous texture coordinates for the texture unit. The result of the texture access becomes both the shader result and texture unit RGBA result (see FIG. 5E). The type of the shader result depends on the format type of the accessed texture. This mode is equivalent to conventional texturing's 3D texture target.

If the texture unit's 3D texture object is not consistent, then this texture shader stage is not consistent.

If this texture shader stage is not consistent, it operates as if it is the NONE operation.

Dot Product Texture 3D

The DOT_PRODUCT_TEXTURE_3D_NV texture shader operation accesses the texture unit's 3D texture object (as described in sections 3.8.4, 3.8.5, and 3.8.6 of the OpenGL® 1.2.1 Specification) using (dotPP,dotP,dotC) for the 3D texture coordinates. The result of the texture access becomes both the shader result and texture unit RGBA result (see FIG. 5E). The type of the shader result depends on the format type of the accessed texture.

Assuming that i is the current texture shader stage, dotPP is the floating-point dot product texture shader result from the i−2 texture shader stage, assuming the i−2 texture shader stage's operation is DOT_PRODUCT_NV. dotP is the floating-point dot product texture shader result from the i−1 texture shader stage, assuming the i−1 texture shader stage's operation is DOT_PRODUCT_NV. dotC is the floating-point dot product result from the current texture shader stage. dotC is computed in the identical manner used to compute the floating-point result of the DOT_PRODUCT_NV texture shader.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent. If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If either the i−1 or i−2 texture shader stage operation is not DOT_PRODUCT_NV, then this texture shader stage is not consistent.

If either the i−1 or i−2 texture shader stage is not consistent, then this texture shader stage is not consistent.

If the texture unit's 3D texture object is not consistent, then this texture shader stage is not consistent.

If this texture shader stage is not consistent, it operates as if it is the NONE operation.

Texture Shader Restrictions

There are various restrictions on possible texture shader configurations. These restrictions are described in this section.

The error INVALID_OPERATION occurs if the SHADER_OPERATION_NV parameter for texture unit 0 is assigned one of the following in Table #26.

TABLE #26

OFFSET_TEXTURE_2D_NV, OFFSET_TEXTURE_2D_SCALE_NV,
OFFSET_TEXTURE_RECTANGLE_NV,
OFFSET_TEXTURE_RECTANGLE_SCALE_NV,
DEPENDENT_AR_TEXTURE_2D_NV,
DEPENDENT_GB_TEXTURE_2D_NV,
DOT_PRODUCT_NV, DOT_PRODUCT_DEPTH_REPLACE_NV,
DOT_PRODUCT_TEXTURE_2D_NV,
DOT_PRODUCT_TEXTURE_RECTANGLE_NV,
DOT_PRODUCT_TEXTURE_3D_NV,
DOT_PRODUCT_TEXTURE_CUBE_MAP_NV,
DOT_PRODUCT_DIFFUSE_CUBE_MAP_NV,
DOT_PRODUCT_REFLECT_CUBE_MAP_NV,
or DOT_PRODUCT_CONST_EYE_REFLECT_CUBE_MAP_NV.

Each of these texture shaders may require a previous texture shader result that is not possible for texture unit 0. Therefore these shaders are disallowed for texture unit 0.

The error INVALID_OPERATION occurs if the SHADER_OPERATION_NV parameter for texture unit 1 is assigned one of DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_3D_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV, or DOT_PRODUCT_CONST_EYE_REFLECT_CUBE_MAP_NV. Each of these texture shaders may require either two previous texture shader results or a dot product result that cannot be generated by texture unit 0. Therefore these shaders are disallowed for texture unit 1.

The error INVALID_OPERATION occurs if the SHADER_OPERATION_NV parameter for texture unit 2 is assigned one of DOT_PRODUCT_TEXTURE_3D_NV, DOT_PRODUCT_TEXTURE_CUBE_MAP_NV, DOT_PRODUCT_REFLECT_CUBE_MAP_NV, DOT_PRODUCT_CONST_EYE_REFLECT_CUBE_MAP_NV. Each of these texture shaders may require three previous texture shader results. Therefore these shaders are disallowed for texture unit 2."

Required State

The state required for texture shaders consists of a single bit to indicate whether or not texture shaders are enabled, a vector of three floating-point values for the constant eye vector, and n sets of per-texture unit state where n is the implementation-dependent number of supported texture units. The set of per-texture unit texture shader state consists of the twenty-three-valued integer indicating the texture shader operation, four two-valued integers indicating the cull modes, an integer indicating the previous texture unit input, a two-valued integer indicating the RGBA unsigned dot product mapping mode, a 2×2 floating-point matrix indicating the texture offset transform, a floating-point value indicating the texture offset scale, a floating-point value indicating the texture offset bias, and a bit to indicate whether or not the texture shader stage is consistent.

Table #27 illustrates errors that are updated to reflect 3D texture operations.

TABLE #27

INVALID_OPERATION is generated if a packed pixel format type
listed in table 3.8 is used with DrawPixels, ReadPixels,
ColorTable, ColorSubTable, ConvolutionFilter1D,
ConvolutionFilter2D, SeparableFilter2D, GetColorTable,
GetConvolutionFilter, GetSeparableFilter, GetHistogram, GetMinMax,
TexImage1D, TexImage2D, TexImage3D, TexSubImageID, TexSubImage2D,
TexSubImage3d, or GetTexImage but the format parameter does not
match on of the allowed Matching Pixel Formats listed in table 3.8
for the specified packed type parameter.
   INVALID_OPERATION is generated when TexImage1D, TexImage2D,
or TexImage3D are called and the format is HILO_NV and the
internalformat is not one of HILO_NV, HILO16_NV, SIGNED_HILO_NV,
SIGNED_HILO16_NV; or if the internalformat is one of HILO_NV,
HILO16_NV, SIGNED_HILO_NV, or SIGNED_HILO16_NV and the format is
not HILO_NV.
   INVALID_OPERATION is generated when TexImage3D, TexImage2D,
or TexImage1D is called and if the format is DSDT_NV and the
internalformat is not either DSDT_NV or DSDT8_NV; or if the
internal format is either DSDT_NV or DSDTBNV and the format is
not DSDT_NV. INVALID_OPERATION is generated when TexImage3D,
TexImage2D, or TexImage1D is called and if the format is
DSDT_MAG_NV and the internalformat is not either DSDT_MAG_NV or
DSDT8_MAG8_NV; or if the internal format is either DSDT_MAG_NV or
DSDT8_MAG8_NV and the format is not DSDT_MAG_NV.
   INVALID_OPERATION is generated when TexImage3D, TexImage2D,
or TexImage1D is called and if the format is DSDT_MAG_VIB_NV and
the internalformat is not either DSDT_MAG_INTENSITY_NV or
DSDT8_MAG8_INTENSITY8_NV; or if the internal format is either
DSDT_MAG_INTENSITY_NV or DSDT8_MAGB_INTENSITY8_NV and the format
is not DSDT_MAG_VIB_NV.
   INVALID_OPERATION is generated when CopyTexImage3D,
CopyTexImage2D, CopyTexImage1D, CopyTexSubImage3D,
CopyTexSubImage2D, or CopyTexSubImage1D is called and the internal
format of the texture array to which the pixels are to be copied
is one of HILO_NV, HILO16_NV, SIGNED_HILO_NV, SIGNED_HILO16_NV,
DSDT_NV, DSDT8_NV, DSDT_MAG_NV, DSDT8_MAG8_NV,
DSDT_MAG_INTENSITY_NV, or DSDT8_MAG8_INTENSITY8_NV.

TABLE #27-continued

INVALID_OPERATION is generated when TexSubImage3D,
TexSubImage2D, or TexSubImage1D is called and the texture array's
base internal format is not one of HILO_NV, DSDT_NV, DSDT_MAG_NV,
or DSDT_INTENSITY_NV, and the format parameter is not one of
COLOR_INDEX, RED, GREEN, BLUE, ALPHA, RGB, RGBA, LUMINANCE, or
LUMINANCE_ ALPHA
    INVALID_OPERATION is generated when TexSubImage3D,
TexSubImage2D, or TexSubImage1D is called and the texture array's
base internal format is HILO_NV and the format parameter is not
HILO_NV.
    INVALID_OPERATION is generated when TexSubImage3D,
TexSubImage2D, or TexSubImage1D is called and the texture array's
base internal format is DSDT_NV and the format parameter is not
DSDT_NV.
    INVALID_OPERATION is generated when TexSubImage3D,
TexSubImage2D, or TexSubImage1D is called and the texture array's
base internal format is DSDT_MAG_NV and the format parameter is
not DSDT_MAG_NV.
    INVALID_OPERATION is generated when TexSubImage3D,
TexSubImage2D, or TexSubImage1D is called and the texture array's
base internal format is DSDT_MAG_INTENSITY_NV and the format
parameter is not DSDT_MAG_VIRBANCE_NV.
    INVALID_OPERATION is generated when TexEnv is called and the
SHADER_OPERATION_NV parameter for texture unit 0 is assigned one
of OFFSET_TEXTURE_2D_NV, OFFSET_TEXTURE_2D_SCALE_NV,
OFFSET_TEXTURE_RECTANGLE_NV, OFFSET_TEXTURE_RECTANGLE_SCALE_NV,
DEPENDENT_AR_TEXTURE_2D_NV, DEPENDENT_GB_TEXTURE_2D_NV,
DOT_PRODUCT_NV, DOT_PRODUCT_DEPTH_REPLACE_NV,
DOT_PRODUCT_TEXTURE_2D_NV, DOT_PRODUCT_TEXTURE_RECTANGLE_NV,
DOT_PRODUCT_TEXTURE_3D_NV, DOT_PRODUCT_TEXTURE_CUBE_MAP_NV,
DOT_PRODUCT_DIFFUSE_CUBE_MAP_NV, DOT_PRODUCT_REFLECT_CUBE_MAP_NV.
or DOT_PRODUCT_CONST_EYE_REFLECT_CUBE_MAP_NV.
INVALID_OPERATION is generated when TexEnv is called and the
SHADER_OPERATION_NV parameter for texture unit 1 is assigned one
of DOT_PRODUCT_DEPTH_REPLACE_NV, DOT_PRODUCT_TEXTURE_2D_NV,
DOT_PRODUCT_TEXTURE_RECTANGLE_NV, DOT_PRODUCT_TEXTURE_3D_NV,
DOT_PRODUCT_TEXTURE_CUBE_MAP_NV, DOT_PRODUCT_DIFFUSE_CUBE_MAP_NV,
DOT_PRODUCT_REFLECT_CUBE_MAP_NV, or
DOT_PRODUCT_CONST_EYE_REFLECT_CUBE_MAP_NV. INVALID_OPERATION is
generated when TexEnv is called and the SHADER_OPERATION_NV
parameter for texture unit 2 is assigned one of
DOT_PRODUCT_TEXTURE_3D_NV, DOT_PRODUCT_TEXTURE_CUBE_MAP_NV,
DOT_PRODUCT_REFLECT_CUBE_MAP_NV, or
DOT_PRODUCT_CONST_EYE_REFLECT_CUBE_MAP_NV.
    INVALID_OPERATION is generated when TexEnv is called and the
SHADER_OPERATION_NV parameter for texture unit n-1 (where n is the
number of supported texture units) is assigned either
DOT_PRODUCT_NV or DOT_PRODUCT_DIFFUSE_CUBE_MAP_NV.
    INVALID_OPERATION is generated when GetTexImage is called
with a color format (one of RED, GREEN, BLUE, ALPHA, RGB, RGBA,
LUMINANCE, or LUMINANCE_ ALPHA) when the texture image is of a
format type (see table 3.15) other than RGBA (the
DSDT_MAG_INTENSITY_NV base internal format does not count as an
RGBA format type in this context).
    INVALID_OPERATION is generated when GetTexImage is called
with a format of HILO when the texture image is of a format type
(see table 3.15) other than HILO.
    INVALID_OPERATION is generated when GetTexImage is called
with a format of DSDT_NV when the texture image is of a base
internal format other than DSDT_NV.
    INVALID_OPERATION is generated when GetTexImage is called
with a format of DSDT_MAG_NV when the texture image is of a base
internal format other than DSDT_MAG_NV.
    INVALID_OPERATION is generated when GetTexImage is called
with a format of DSDT_MAG_VIBRANCE_NV when the texture image is of
a base internal format other than DSDT_MAG_INTENSITY_NV causes the
error INVALID_OPERATION.

Table #28 illustrates a new state.

TABLE #28

| Get Value | Type | Get Command | Initial Value | Description | Sec Attribute |
|---|---|---|---|---|---|
| SHADER_OPERATION_NV | TxZ23 | GetTexEnviv | NONE | Texture shader operation | 3.8.13 texture |

Embodiment #3

As an option, the following embodiment may be implemented in the context of the previous embodiments and the OpenGL® 1.2.1 specification, which is incorporated herein by reference in its entirety.

The following description is written based on the wording of the OpenGL® 1.2.1 specification, augmented by the NV_texture_shader and NV_texture_shader2 extension specifications.

NV_texture_shader3 extends the NV_texture_shader functionality by adding several texture shader operations, extending several existing texture shader operations, adding a HILO8 internal format, and adding more flexible re-mapping modes for dot product and dependent texture shader operations.

The fourteen new texture shader operations are set forth in Table #29.

TABLE #29

<offset textures>

24. OFFSET_PROJECTIVE_TEXTURE_2D_NV - Transforms the signed (ds, dt) components of a previous texture unit by a 2 × 2 floating-point matrix and then uses the result to offset the stage's texture coordinates for a 2D non-projective texture.
25. OFFSET_PROJECTIVE_TEXTURE_2D_SCALE_NV - Same as above except the magnitude component of the previous texture unit result scales the red, green, and blue components of the unsigned RGBA texture 2D access.
26. OFFSET_PROJECTIVE_TEXTURE_RECTANGLE_NV - Similar to OFFSET_TEXTURE_2D_NV except that the texture access is into a rectangular non-projective texture.
27. OFFSET_PROJECTIVE_TEXTURE_RECTANGLE_SCALE_NV - Similar to OFFSET_PROJECTIVE_TEXTURE_2D_SCALE_NV except that the texture access is into a rectangular non-projective texture.
28. OFFSET_HILO_TEXTURE_2D_NV - Similar to OFFSET_TEXTURE_2D_NV but uses a (higher-precision) HILO base format texture rather than a DSDT-type base format.
29. OFFSET_HILO_TEXTURE_RECTANGLE_NV - Similar to OFFSET_TEXTURE_RECTANGLE_NV but uses a (higher-precision) HILO base format texture rather than a DSDT-type base format.
30. OFFSET_HILO_PROJECTIVE_TEXTURE_2D_NV - Similar to OFFSET_PROJECTIVE_TEXTURE_2D_NV but uses a (higher-precision) HILO base format texture rather than a DSDT-type base format.
31. OFFSET_HILO_PROJECTIVE_TEXTURE_RECTANGLE_NV - Similar to OFFSET_PROJECTIVE_TEXTURE_RECTANGLE_NV but uses a (higher-precision) HILO base format texture rather than a DSDT-type base format.
(There are no "offset HILO texture scale" operations because HILO textures have only two components with no third component for scaling.)

<dependent textures>

32. DEPENDENT_HILO_TEXTURE_2D_NV - Converts the hi and lo components of a previous shader HILO result into an (s, t) texture coordinate set to access a 2D non-projective texture.
33. DEPENDENT_RGB_TEXTURE_3D_NV - Converts the red, green, and blue components of a previous shader RGBA result into an (s, t, r) texture coordinate set to access a 3D non-projective texture.
34. DEPENDENT_RGB_TEXTURE_CUBE_MAP_NV - Converts the red, green, and blue components of a previous shader RGBA result into an (s, t, r) texture coordinate set to access a cube map texture.

<dot product textures>

35. DOT_PRODUCT_TEXTURE_1D_NV - Computes a dot product in the manner of the DOT_PRODUCT_NV operation and uses the result as the s texture coordinate to access a 2D non-projective texture.
36. DOT_PRODUCT_PASS_THROUGH_NV - Computes a dot product in the manner of the DOT_PRODUCT_NV operation and the result is clamped and smeared to generate the texture unit RGBA result.

<dot product depth replace>

37. DOT_PRODUCT_AFFINE_DEPTH_REPLACE_NV - Computes a dot product in the manner of the DOT_PRODUCT_NV operation and the result is [0, 1] clamped and replaces the fragment's window-space depth value. The texture unit RGBA result is (0, 0, 0, 0).

Two new internal texture formats have been added: HILO8_NV and SIGNED_HILO8 NV. These texture formats allow HILO textures to be stored in half the space; still the filtering for these internal texture formats is done with 16-bit precision.

One new unsigned RGBA dot product mapping mode (FORCE_BLUE_TO_ONE_NV) forces the blue component to be 1.0 before computing a dot product.

A HILO8 NV internal format may or may not be added. The HILO8_NV format allows HILO textures to take up half the space (16-bit HILO8_NV versus 32-bit HILO16_NV). Even though the texture is stored with 8-bit components, the interpolated precision can be assumed to be 16-bit.

One may generalize existing OFFSET_TEXTURE-style operations to support HILO textures and projective texturing, or may just add more texture shader operations. For example, one may add more texture shader operations for each distinct configuration.

NV_texture_shader had consistency rules for OFFSET_TEXTURE operations that preclude consistency when used with HILO textures. Consistency is a defined behavior that may stay defined even with future extensions. Adding specific new texture shader operation for HILO textures avoids having to redefine the consistency rules for DSDT-using OFFSET_TEXTURE operations.

Rather than add a separate state that decides when OFFSET_TEXTURE is projective or not, one may just add new operations.

Table #30 illustrates new tokens.

TABLE #30

When the <target> and <pname> parameters of TexEnvf, TexEnvfv, TexEnvi, and TexEnviv are TEXTURE_SHADER_NV and SHADER_OPERATION_NV respectively, then the value of <param> or the value pointed to by <params> may be:

| | |
|---|---|
| OFFSET_PROJECTIVE_TEXTURE_2D_NV | 0x8850 |
| OFFSET_PROJECTIVE_TEXTURE_2D_SCALE_NV | 0x8851 |
| OFFSET_PROJECTIVE_TEXTURE_RECTANGLE_NV | 0x8852 |
| OFFSET_PROJECTIVE_TEXTURE_RECTANGLE_SCALE_NV | 0x8853 |
| OFFSET_HILO_TEXTURE_2D_NV | 0x8854 |
| OFFSET_HILO_TEXTURE_RECTANGLE_NV | 0x8855 |
| OFFSET_HILO_PROJECTIVE_TEXTURE_2D_NV | 0x8856 |
| OFFSET_HILO_PROJECTIVE_TEXTURE_RECTANGLE_NV | 0x8857 |
| DEPENDENT_HILO_TEXTURE_2D_NV | 0x8858 |
| DEPENDENT_RGB_TEXTURE_3D_NV | 0x8859 |
| DEPENDENT_RGB_TEXTURE_CUBE_MAP_NV | 0x885A |
| DOT_PRODUCT_PASS_THROUGH_NV | 0x885B |
| DOT_PRODUCT_TEXTURE_1D_NV | 0x885C |
| DOT_PRODUCT_AFFINE_DEPTH_REPLACE_NV | 0x885D |

TABLE #30-continued

Accepted by the <internalformat> parameter of TexImage1D,
TexImage2D, and TexImage3D:

| | |
|---|---|
| HILO8_NV | 0x885E |
| SIGNED_HILO8_NV | 0x885F |

When the <target> and <pname> parameters of TexEnvf,
TexEnvfv, TexEnvi, and TexEnviv are TEXTURE_SHADER_NV and
RGBA_UNSIGNED_DOT_PRODUCT_MAPPING_NV respectively,
then the value of <param> or the value pointed to by <params> may be:

| | |
|---|---|
| FORCE_BLUE_TO_ONE_NV | 0x8860 |

Texturing

The alternative to conventional texturing is the texture shaders mechanism. When texture shaders are enabled, each texture unit uses one of thirty-seven texture shader operations. Thirty-three of the thirty-seven shader operations map an (s,t,r,q) texture coordinate set to an RGBA color. Of these, four texture shader operations directly correspond to the 1D, 2D, 3D, and cube map conventional texturing operations. Depending on the texture shader operation, the mapping from the (s,t,r,q) texture coordinate set to an RGBA color may depend on the given texture unit's currently bound texture object state and/or the results of previous texture shader operations. The four remaining texture shader operations respectively provide a fragment culling mechanism based on texture coordinates, a dot product operation that computes a floating-point value for use by subsequent texture shaders, and two means to replace the fragment depth value. The specifics of each texture shader operation are described earlier.

More information on this topic that is well known to those of ordinary skill may be found in Chapter 2 of the OpenGL® 1.2.1 Specification.

Texture Image Specification

Table #31 may be a pertinent addition to table 3.16 of section 3.8.1 of the OpenGL® 1.2.1 Specification.

TABLE #31

| Sized Internal Format | Base Internal Format | R bits | G bits | B bits | A bits | L bits | I bits | HI bits | LO bits | DS bits | DT bits |
|---|---|---|---|---|---|---|---|---|---|---|---|
| HILO8_NV | HILO | | | | | | | 8 | 8 | | |
| SIGNED_HILO8_NV | HILO | | | | | | | 8* | 8* | | |

MAG

The error INVALID_OPERATION is generated if the format is HILO_NV and the internalformat is not one of HILO_NV, HILO16_NV, HILO8NV, SIGNED_HILO_NV, SIGNED_HILO16_NV, SIGNED_HILO8_NV; or if the internalformat is one of HILO_NV, HILO16_NV, HILO8_NV, SIGNED_HILO_NV, SIGNED_HILO16_NV, or SIGNED_HILO8_NV and the format is not HILO_NV.

More information on this topic that is well known to those of ordinary skill may be found in section 3.8.2 of the OpenGL® 1.2.1 Specification.

Alternate Texture Image Specification Commands

Parameters level, internalformat, and border are specified using the same values, with the same meanings, as the equivalent arguments of TexImage2D, except that internalformat may not be specified as 1, 2, 3, 4, HILO_NV, HILO16_NV, HILO8NV, SIGNED_HILO_NV, SIGNED_HILO16_NV, SIGNED_HILO8_NV, DSDT_NV, DSDT8_NV, DSDT_MAG_NV, DSDT8_MAG8_NV, DSDT_MAG_INTENSITY_NV, or DSDT8_MAG8_INTENSITY8 NV.

level, internalformat, and border are specified using the same values, with the same meanings, as the equivalent arguments of TexImage1D, except that internalformat may not be specified as 1, 2, 3, 4, HILO_NV, HILO16_NV, HILO8_NV, SIGNED_HILO_NV, SIGNED_HILO16_NV, SIGNED_HILO8_NV, DSDT_NV, DSDT8_NV, DSDT_MAG_NV, DSDT8_MAG8_NV, DSDT_MAG_INTENSITY_NV, or DSDT8_MAG8_INTENSITY8_NV.

CopyTexSubImage3D, CopyTexSubImage2D, and CopyTexSubImage1D generate the error INVALID_OPERATION if the internal format of the texture array to which the pixels are to be copied is one of HILO_NV, HILO16_NV, HILO8_NV, SIGNED_HILO_NV, SIGNED_HILO16_NV, SIGNED_HILO8_NV, DSDT_NV, DSDT8_NV, DSDT_MAG_NV, DSDT8_MAG8 NV, DSDT_MAG_INTENSITY_NV, or DSDT8_MAG8_INTENSITY8 NV.

Texture Shaders

Each texture unit is configured with one of thirty-seven texture shader operations. Several texture shader operations may require additional state. All per-texture shader stage state is specified using the TexEnv commands with the target specified as TEXTURE_SHADER_NV. The per-texture shader state is replicated per texture unit so the texture unit selected by ActiveTextureARB determines which texture unit's environment is modified by TexEnv calls."

When TexEnv is called with the target of TEXTURE_SHADER_NV, SHADER_OPERATION_NV may be set to one of NONE, TEXTURE_1D, TEXTURE_2D, TEXTURE_3D, TEXTURE_CUBE_MAP_ARB, PASS_THROUGH_NV, CULL_FRAGMENT_NV, OFFSET_TEXTURE_2D_NV, OFFSET_TEXTURE_2D_SCALE_NV, OFFSET_TEXTURE_RECTANGLE_NV, OFFSET_TEXTURE_RECTANGLE_SCALE_NV, DEPENDENT_AR_TEXTURE_2D_NV, DEPENDENT_GB_TEXTURE_2D_NV, DOT_PRODUCT_NV, DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_3D_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV, DOT_PRODUCT_CONST_EYE_REFLECT_CUBE_MAP_NV, OFFSET_PROJECTIVE_TEXTURE_2D_NV, OFFSET_PROJECTIVE_TEXTURE_2D_SCALE_NV, OFFSET_PROJECTIVE_TEXTURE_RECTANGLE_NV, OFFSET_PROJECTIVE_TEXTURE_RECTANGLE_SCALE_NV, OFFSET_HILO_TEXTURE_2D_NV, OFFSET_HILO_TEXTURE_RECTANGLE_NV, OFFSET_HILO_PROJECTIVE_TEXTURE_2D_NV, OFFSET_HILO_PROJECTIVE_TEXTURE_RECTANGLE_NV, DEPENDENT_HILO_TEXTURE_2D_NV, DEPENDENT_RGB_TEXTURE_3D_NV, DEPENDENT_RGB_TEXTURE_CUBE_MAP_NV, DOT_PRODUCT_PASS_THROUGH_NV, DOT_PRODUCT_TEXTURE_1D_NV, or DOT_PRODUCT_AFFINE_DEPTH_

REPLACE_NV. The semantics of each of these shader operations is described herein. As an option, not every operation is supported in every texture unit. The restrictions for how these shader operations can be configured in various texture units are also described herein.

When TexEnv is called with the target of TEXTURE_SHADER_NV, RGBA_UNSIGNED_DOT_PRODUCT_MAPPING_NV may be set to one of UNSIGNED_IDENTITY_NV, EXPAND_NORMAL_NV, or FORCE_BLUE_TO_ONE_NV. This RGBA unsigned dot product mapping mode is used by the DOT_PRODUCT_NV operation and other operations that compute dot products."

Texture Shader Operations

Figure 1:
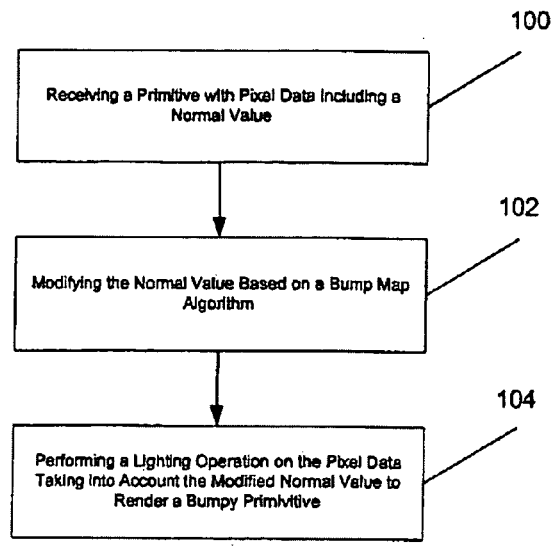
FIG. 1 illustrates a bump mapping method of a prior art computer graphics processing system.
Figure 2:
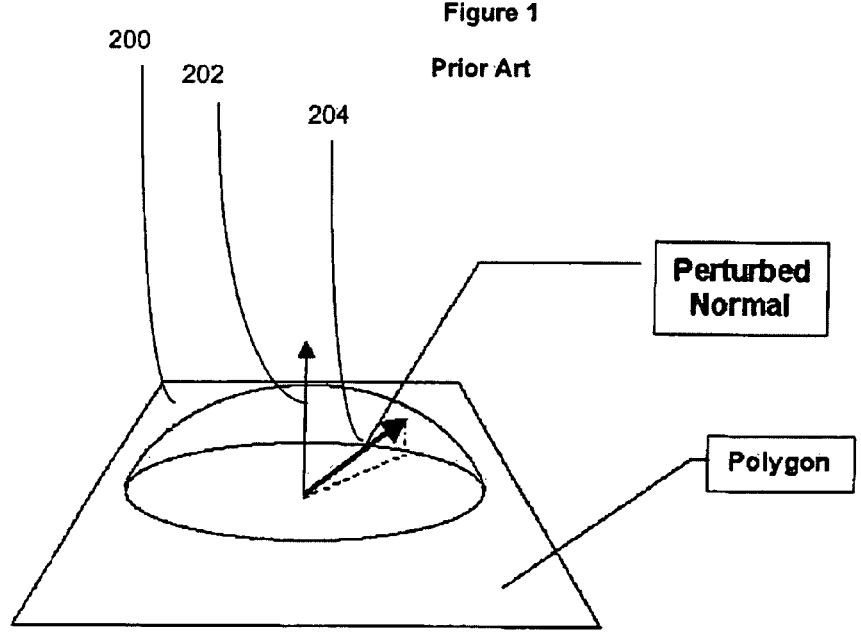
FIG. 2 illustrates a primitive with a normal that is modified to generate a perturbed normal in accordance with a prior art bump mapping method.

FIGS. 5A-5D set forth during reference to the NV_texture_shader specification may be amended in the context of the present extension to include entries for 3D texture operations. See FIGS. 8-1 and 8-2.

Dot Product

With respect to FORCE_BLUE_TO_ONE_NV, when the RGBA_UNSIGNED_DOT_PRODUCT_MAPPING_NV is FORCE_BLUE_TO_ONE_NV, then the floating-point result for unsigned RGBA components is computed by result=s*Rprev+t*Gprev+r, where Rprev and Gprev are the (unsigned) red and green components respectively of the previous texture unit's RGBA texture shader result (the previous blue component can be assumed forced to 1.0 for the purposes of the dot product computation)."

Dot Product Depth Replace

If any previous texture shader stage operation is DOT_PRODUCT_DEPTH_REPLACE_NV or DOT_PRODUCT_AFFINE_DEPTH_REPLACE_NV and that previous stage is consistent, then this texture shader stage is not consistent. (This eliminates the potential for two stages to each be performing a depth replace operation.)

Offset Projective Texture 2D

The OFFSET_PROJECTIVE_TEXTURE_2D_NV shader operation operates identically to the OFFSET_TEXTURE_2D_NV shader operation except that the perturbed texture coordinates s' and t' are computed with floating-point math as follows in Table #31A.

TABLE #31A s' = s/q + a1 * DSprev + a3 * DTprev
t' = t/q + a2 * DSprev + a4 * DTprev It should be noted that the division of s and t by the current texture shader stage's q texture coordinate.

Offset Projective Texture 2D Scale

The OFFSET_PROJECTIVE_TEXTURE_2D_SCALE_NV shader operation operates identically to the OFFSET_TEXTURE_2D_SCALE_NV shader operation except that the perturbed texture coordinates s' and t' are computed with floating-point math as follows in Table #32.

TABLE #32 s' = s/q + a1 * DSprev + a3 * DTprev
t' = t/q + a2 * DSprev + a4 * DTprev

It should be noted that the division of s and t by the current texture shader stage's q texture coordinate.

Offset Projective Texture Rectangle

The OFFSET_PROJECTIVE_TEXTURE_RECTANGLE_NV shader operation operates identically to the OFFSET_TEXTURE_RECTANGLE_NV shader operation except that the perturbed texture coordinates s' and t' are computed with floating-point math as follows in Table #33.

TABLE #33 s' = s/q + a1 * DSprev + a3 * DTprev
t' = t/q + a2 * DSprev + a4 * DTprev

It should be noted that the division of s and t by the current texture shader stage's q texture coordinate.

Offset Projective Texture Rectangle Scale

The OFFSET_PROJECTIVE_TEXTURE_RECTANGLE_SCALE_NV shader operation operates identically to the OFFSET_TEXTURE_RECTANGLE_SCALE_NV shader operation except that the perturbed texture coordinates s' and t' are computed with floating-point math as follows in Table #34.

TABLE #34 s' = s/q + a1 * DSprev + a3 * DTprev
t' = t/q + a2 * DSprev + a4 * DTprev

Note the division of s and t by the current texture shader stage's q texture coordinate.

Offset HILO Texture 2D

The OFFSET_HILO_TEXTURE_2D_NV texture shader operation uses the transformed result of a previous texture shader stage to perturb the current texture shader stage's (s,t) texture coordinates (without a projective division by q). The resulting perturbed texture coordinates (s',t') are used to access the texture unit's 2D texture object (as described in sections 3.8.4, 3.8.5, and 3.8.6 of the OpenGL® 1.2.1 Specification).

The result of the texture access becomes both the shader result and texture unit RGBA result (see FIG. 5E). The type of the shader result depends on the format type of the accessed texture.

The perturbed texture coordinates s' and t' are computed with floating-point math as follows in Table #35.

TABLE #35 s' = s + a1 * HIprev + a3 * LOprev
t' = t + a2 * HIprev + a4 * LOprev where a1, a2, a3, and a4 are the texture shader stage's OFFSET_TEXTURE_MATRIX_NV values, and HIprev and LOprev are the (signed) HI and LO components of a previous texture shader unit's texture shader result specified by the current texture shader stage's PREVIOUS_TEXTURE_INPUT_NV value.

If the texture unit's 2D texture object is not consistent, then this texture shader stage is not consistent.

If the previous texture input texture object specified by the current texture shader stage's PREVIOUS_TEXTURE_INPUT_NV value has a base internalformat that is not HILO with signed components, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Offset HILO Texture Rectangle

The OFFSET_HILO_TEXTURE_RECTANGLE_NV shader operation operates identically to the OFFSET_HILO_TEXTURE_2D_NV shader operation except that the rectangle texture target is accessed rather than the 2D texture target.

If the texture unit's rectangle texture object (rather than the 2D texture object) is not consistent, then this texture shader stage is not consistent.

Offset Projective HILO Texture 2D

The OFFSET_HILO_PROJECTIVE_TEXTURE_2D_NV shader operation operates identically to the OFFSET_HILO_TEXTURE_2D_NV shader operation except that the perturbed texture coordinates s' and t' are computed with floating-point math as follows in Table #36.

TABLE #36 s' = s/q + a1 * HIprev + a3 * LOprev
t' = t/q + a2 * HIprev + a4 * LOprev

Note the division of s and t by the current texture shader stage's q texture coordinate.

Offset Projective HILO Texture Rectangle

The OFFSET_HILO_PROJECTIVE_TEXTURE_RECTANGLE_NV shader operation operates identically to the OFFSET_HILO_TEXTURE_RECTANGLE_NV shader operation except that the perturbed texture coordinates s' and t' are computed with floating-point math as follows in Table #37.

TABLE #37 s' = s/q + a1 * HIprev + a3 * LOprev
t' = t/q + a2 * HIprev + a4 * LOprev

Note the division of s and t by the current texture shader stage's q texture coordinate.

Dependent HILO Texture 2D

The DEPENDENT_HILO_TEXTURE_2D_NV texture shader operation accesses the texture unit's 2D texture object (as described in section 3.8.4, 3.8.5, and 3.8.6 of the OpenGL® 1.2.1 Specification) using (HIprev, LOprev) for the 2D texture coordinates where HIprev and LOprev are the are the hi and lo components of a previous texture input's unsigned HILO texture shader result specified by the current texture shader stage's PREVIOUS_TEXTURE_INPUT_NV value. The result of the texture access becomes both the shader result and texture unit RGBA result (see FIG. 5E). The type of the shader result depends on the format type of the accessed texture.

If the texture unit's 2D texture object is not consistent, then this texture shader stage is not consistent.

If the previous texture input's texture shader result specified by the current texture shader stage's PREVIOUS_TEXTURE_INPUT_NV value has a texture shader result type other than HILO with unsigned components, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Dependent Texture 3D

The DEPENDENT_RGB_TEXTURE_3D_NV texture shader operation accesses the texture unit's 3D texture object (as described in section 3.8.4, 3.8.5, and 3.8.6 of the OpenGL® 1.2.1 Specification) using (Rprev, Gprev, Bprev) for the 3D texture coordinates where Rprev, Gprev, and Bprev are the are the red, green, and blue components of a previous texture input's RGBA texture shader result specified by the current texture shader stage's PREVIOUS_TEXTURE_INPUT_NV value. The result of the texture access becomes both the shader result and texture unit RGBA result (see FIG. 5E). The type of the shader result depends on the format type of the accessed texture.

If the texture unit's 3D texture object is not consistent, then this texture shader stage is not consistent.

If the previous texture input's texture shader result specified by the current texture shader stage's PREVIOUS_TEXTURE_INPUT_NV value has a texture shader result type other than RGBA (the DSDT_MAG_INTENSITY_NV base internal format does not count as an RGBA format type in this context), then this texture shader stage is not consistent.

If the previous texture input's texture shader result specified by the current texture shader stage's PREVIOUS_TEXTURE_INPUT_NV value has a texture shader result type of RGBA but any of the RGBA components are signed, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Dependent Texture Cube Map

The DEPENDENT_RGB_TEXTURE_CUBE_MAP_NV texture shader operation accesses the texture unit's cube map texture object (as described in section 3.8.4, 3.8.5, and 3.8.6 of the OpenGL® 1.2.1 Specification) using (s',t',r').

When the RGB components of the previous texture input's RGBA texture shader result are all unsigned, s', t', and r' are computed as in Table #38.

TABLE #38 s' = 2 * (Rprev − 0.5)
t' = 2 * (Gprev − 0.5)
r' = 2 * (Bprev − 0.5)

When the RGB components of the previous texture input's RGBA texture shader result are all signed, s', t', and r' are computed as in Table #39.

TABLE #39 s' = Rprev
t' = Gprev
r' = Bprev where Rprev, Gprev, and Bprev are the are the red, green, and blue components of a previous texture input's RGBA texture shader result specified by the current texture shader stage's PREVIOUS_TEXTURE_INPUT_NV value. The result of the texture access becomes both the shader result and texture unit RGBA result (see FIG. 5E). The type of the shader result depends on the format type of the accessed texture.

If the texture unit's cube map texture object is not consistent, then this texture shader stage is not consistent.

If the previous texture input's texture shader result specified by the current texture shader stage's PREVIOUS_TEXTURE_INPUT_NV value has a texture shader result type other than RGBA (the DSDT_MAG_INTENSITY_NV base internal format does not count as an RGBA format type in this context), then this texture shader stage is not consistent.

If the previous texture input's texture shader result specified by the current texture shader stage's PREVIOUS_TEXTURE_INPUT_NV value has a texture shader result type of RGBA but any of the RGB components are unsigned, then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If this texture shader stage is not consistent, it operates as if it is the NONE operation.

Dot Product Pass Through

The DOT_PRODUCT_PASS_THROUGH_NV texture shader operation converts a dot product result dotC into an RGBA color result (x,x,x,x) where x is dotC clamped to [0,1]. The texture shader result and texture unit RGBA result of this operation are both assigned the clamped RGBA color result.

dotC is the floating-point dot product result from the current texture shader stage. dotC is computed in the identical manner used to compute the floating-point result of the DOT_PRODUCT_NV texture shader.

This operation in no way depends on any of the texture unit's texture objects.

Dot Product Texture 1D

The DOT_PRODUCT_TEXTURE_1D_NV texture shader operation accesses the texture unit's 1D texture object (as described in sections 3.8.4, 3.8.5, and 3.8.6 of the OpenGL® 1.2.1 Specification) using dotC for the 1D texture coordinate. The result of the texture access becomes both the shader result and texture unit RGBA result (see FIG. 5E). The type of the shader result depends on the format type of the accessed texture.

dotC is the floating-point dot product result from the current texture shader stage. dotC is computed in the identical manner used to compute the floating-point result of the DOT_PRODUCT_NV texture shader.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If the texture unit's 1D texture object is not consistent, then this texture shader stage is not consistent.

If this texture shader stage is not consistent, it operates as if it is the NONE operation.

Dot Product Affine Depth Replace

The DOT_PRODUCT_AFFINE_DEPTH_REPLACE_NV texture shader operation replaces the incoming fragments depth (in window coordinates, after polygon offset and before conversion to fixed-point, i.e. in the [0,1] range) with a new depth value. The new depth is computed as follows in Table #40.

TABLE #40 depth = dotC dotC is the floating-point dot product result from the current texture shader stage. dotC is computed in the identical manner used to compute the floating-point result of the DOT_PRODUCT_NV texture shader. Note that there is no divide to project the depth value as is the case with the projective DOT_PRODUCT_DEPTH_REPLACE_NV operation.

If the new depth value is outside of the range of the near and far depth range values, the fragment is rejected.

The texture unit RGBA result generated may be (0,0,0,0). The texture shader result is invalid.

If the previous texture input texture object specified by the current texture shader stage's PREVIOUS_TEXTURE_INPUT_NV value has a format type other than RGBA or HILO (the DSDT_MAG_INTENSITY_NV base internal format does not count as an RGBA format type in this context), then this texture shader stage is not consistent.

If the previous texture input texture shader operation specified by the current texture shader stage's PREVIOUS_TEXTURE_INPUT_NV value is DOT_PRODUCT_NV, then this texture shader stage is not consistent.

If the previous texture input texture shader result specified by the current texture shader stage's PREVIOUS_TEXTURE_INPUT_NV value is invalid, then this texture shader stage is not consistent.

If the previous texture input shader stage specified by the current texture shader stage's PREVIOUS_TEXTURE_INPUT_NV value is not consistent, then this texture shader stage is not consistent.

If any previous texture shader stage operation is DOT_PRODUCT_DEPTH_REPLACE_NV or DOT_PRODUCT_AFFINE_DEPTH_REPLACE_NV and that previous stage is consistent, then this texture shader stage is not consistent. (This eliminates the potential for two stages to each be performing a depth replace operation.)

If this texture shader stage is not consistent, it operates as if it is the NONE operation.

This operation in no way depends on any of the texture unit's texture objects.

Texture Shader Restrictions

There are various restrictions on possible texture shader configurations. These restrictions are described in this section.

The error INVALID_OPERATION occurs if the SHADER_OPERATION_NV parameter for texture unit 0 is assigned one of OFFSET_TEXTURE_2D_NV, OFFSET_TEXTURE_2D_SCALE_NV, OFFSET_TEXTURE_RECTANGLE_NV, OFFSET_TEXTURE_RECTANGLE_SCALE_NV, DEPENDENT_AR_TEXTURE_2D_NV, DEPENDENT_GB_TEXTURE_2D_NV, DOT_PRODUCT_NV, DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_3D_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV, DOT_PRODUCT_CONST_EYE_REFLECT_CUBE_MAP_NV, OFFSET_PROJECTIVE_TEXTURE_2D, OFFSET_PROJECTIVE_TEXTURE_2D_SCALE, OFFSET_PROJECTIVE_TEXTURE_RECTANGLE, OFFSET_PROJECTIVE_TEXTURE_RECTANGLE_SCALE, OFFSET_HILO_TEXTURE_2D, OFFSET_HILO_TEXTURE_RECTANGLE, OFFSET_HILO_PROJECTIVE_TEXTURE_2D, OFFSET_HILO_PROJECTIVE_TEXTURE_RECTANGLE, DEPENDENT_HILO_TEXTURE_2D, DEPENDENT_RGB_TEXTURE_3D, DEPENDENT_RGB_TEXTURE_CUBE_MAP, DOT_PRODUCT_PASS_THROUGH, DOT_PRODUCT_TEXTURE_1D, or DOT_PRODUCT_AFFINE_DEPTH_REPLACE. Each of these texture shaders may require a previous texture shader result that is not possible for texture unit 0. Therefore these shaders are disallowed for texture unit 0.

Required State

The state required for texture shaders consists of a single bit to indicate whether or not texture shaders are enabled, a vector of three floating-point values for the constant eye vector, and n sets of per-texture unit state where n is the implementation-dependent number of supported texture units. The set of per-texture unit texture shader state consists of the thirty-seven-valued integer indicating the texture shader operation, four two-valued integers indicating the cull modes, an integer indicating the previous texture unit input, a two-valued integer indicating the RGBA unsigned dot product mapping mode, a 2×2 floating-point matrix indicating the texture offset transform, a floating-point value indicating the texture offset scale, a floating-point value indicating the texture offset bias, and a bit to indicate whether or not the texture shader stage is consistent.

Exemplary errors are shown in Table #41.

TABLE #41

INVALID_OPERATION is generated when TexImage1D, TexImage2D, or TexImage3D are called and the format is HILO_NV and the internalformat is not one of HILO_NV, HILO8_NV, HILO16_NV, SIGNED_HILO_NV, SIGNED_HILO8_NV, SIGNED_HILO16_NV; or if the internalformat is one of HILO_NV, HILO8_NV, HILO16_NV, SIGNED_HILO_NV, SIGNED_HILO8_NV or SIGNED_HILO16_NV and the format is not HILO_NV.

INVALID_OPERATION is generated when CopyTexImage3D, CopyTexImage2D, CopyTexImage1D, CopyTexSubImage3D, CopyTexSubImage2D, or CopyTexSubImage1D is called and the internal format of the texture array to which the pixels are to be copied is one of HILO_NV, HILO8_NV, HILO16_NV, SIGNED_HILO_NV, SIGNED_HILO8_NV, SIGNED_HILO16_NV, DSDT_NV, DSDT8_NV, DSDT_MAG_NV, DSDT8_MAG8_NV, DSDT_MAG_INTENSITY_NV, or DSDT8_MAG8_INTENSITY8_NV.

INVALID_OPERATION is generated when TexEnv is called and the SHADER_OPERATION_NV parameter for texture unit 0 is assigned one of OFFSET_TEXTURE_2D_NV, OFFSET_TEXTURE_2D_SCALE_NV, OFFSET_TEXTURE_RECTANGLE_NV, OFFSET_TEXTURE_RECTANGLE_SCALE_NV, DEPENDENT_AR_TEXTURE_2D_NV, DEPENDENT_GB_TEXTURE_2D_NV, DOT_PRODUCT_NV, DOT_PRODUCT_DEPTH_REPLACE_NV, DOT_PRODUCT_TEXTURE_2D_NV, DOT_PRODUCT_TEXTURE_RECTANGLE_NV, DOT_PRODUCT_TEXTURE_3D_NV, DOT_PRODUCT_TEXTURE_CUBE_MAP_NV, DOT_PRODUCT_DIFFUSE_CUBE_MAP_NV, DOT_PRODUCT_REFLECT_CUBE_MAP_NV. DOT_PRODUCT_CONST_EYE_REFLECT_CUBE_MAP_NV, OFFSET_PROJECTIVE_TEXTURE_2D_NV, OFFSET_PROJECTIVE_TEXTURE_2D_SCALE_NV, OFFSET_PROJECTIVE_TEXTURE_RECTANGLE_NV, OFFSET_PROJECTIVE_TEXTURE_RECTANGLE_SCALE_NV, OFFSET_HILO_TEXTURE_2D_NV, OFFSET_HILO_TEXTURE_RECTANGLE_NV, OFFSET_HILO_PROJECTIVE_TEXTURE_2D_NV, OFFSET_HILO_PROJECTIVE_TEXTURE_RECTANGLE_NV, DEPENDENT_HILO_TEXTURE_2D_NV, DEPENDENT_RGB_TEXTURE_3D_NV, DEPENDENT_RGB_TEXTURE_CUBE_MAP_NV, DOT_PRODUCT_PASS_THROUGH_NV, DOT_PRODUCT_TEXTURE_1D_NV, or DOT_PRODUCT_AFFINE_DEPTH_REPLACE_NV.

A new state is set forth in Table #42.

TABLE #42

| Get Value | Type | Get Command | Initial Value | Description | Sec | Attribute |
|---|---|---|---|---|---|---|
| SHADER_OPERATION_NV | TxZ37 | GetTexEnviv | NONE | Texture shader operation | 3.8.13 | texture |
| RGBA_UNSIGNED_-DOT_PRODUCT_MAPPING_NV | TxZ3 | GetTexEnviv | UNSIGNED_IDENTITY_NV | Texture shader RGBA dot product mapping | 3.8.13 | texture |

*SHADER_OPERATION_NV: Z21 in NV_texture_shader (and Z23 in NV_texture_shader2) is now Z37 with NV_texture_shader3.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for bump mapping in a hardware graphics processor, comprising:
receiving a first set of texture coordinates;
multiplying the first set of texture coordinates by a matrix to generate results:
offsetting a second set of texture coordinates utilizing the results of multiplying the first set of texture coordinates by the matrix;
mapping the offset second set of texture coordinates to a texture object to obtain an RGBA result, the RGBA result including red, green, blue, and alpha components;
scaling the red, green, and blue components of the RGBA result of the texture object using a scale value; and
outputting at least one object with the scaled red, green, and blue components for display;
wherein the mapping is carried out utilizing a sequence of texture shaders, each texture shader generating a plurality of results;
wherein the first set of texture coordinates include signed components which are multiplied by the matrix using a first texture unit, and the results are used to offset using a subsequent second texture unit by offsetting the second set of texture coordinates for a non-projective texture, and wherein the red, green, and blue components are scaled at the subsequent second texture unit using the scale value, the scale value being computed using an unsigned component of the results of the first texture unit.

2. The method as recited in claim 1, wherein the matrix includes a rotation matrix.

3. The method as recited in claim 1, wherein the hardware graphics processor includes a transform module, a lighting module, and a rasterizer module.

4. The method as recited in claim 3, wherein the transform module, the lighting module, and the rasterizer module are embodied on a single semiconductor platform.

5. The method as recited in claim 3, wherein the hardware graphics processor further includes a depth-value correction module.

6. The method as recited in claim 3, wherein the hardware graphics processor further includes a bump mapping module.

7. The method as recited in claim 1, wherein the non-projective texture includes a rectangular non-projective texture.

8. The method as recited in claim 1, wherein the matrix includes a floating-point matrix.

9. The method as recited in claim 1, wherein the offset is carried out utilizing a signed offset.

10. The method as recited in claim 9, wherein the signed offset displaces the second set of texture coordinates.

11. The method as recited in claim 1, wherein the mapping depends on a currently bound texture object state of a texture unit.

12. The method as recited in claim 1, wherein the mapping depends on results of previous texture shader operations.

13. The method as recited in claim 1, wherein a first one of the results includes a shader stage result utilized as input to another one of the texture shaders, and a second one of the results includes a texture unit result including a texture color utilized by a texture environment function or an initial value for a corresponding texture register.

14. The method as recited in claim 13, wherein the shader stage result includes a RGBA color, a HILO value, a texture offset group, a floating point value, or an invalid result.

15. The method as recited in claim 1, wherein the offset second set of texture coordinates include s' and t', wherein s' is computed as $s'=s+a1*DSprev+a3*DTprev$, and t' is computed as $t'=t+a2*DSprev+a4*DTprev$:
wherein s and t are included in the second set of texture coordinates;
wherein DSprev and DTprev are included in the results generated by multiplying the first set of texture coordinates by the matrix using the first texture unit:
wherein a1, a2, a3, and a4 are values included in the matrix multiplied by the first set of texture coordinates.

16. The method as recited in claim 1, further including receiving an unsigned vibrance component for use as an intensity of the texture object, the unsigned vibrance component being received with the signed components of the first set of texture coordinates, and the unsigned vibrance component used to calculate the scale value.

17. A system for bump mapping, comprising:
a central processing unit; and
a hardware graphics processor coupled to the central processing unit, the hardware graphics processor capable of:
receiving a first set of texture coordinates,
multiplying the first set of texture coordinates by a matrix to generate results,
offsetting a second set of texture coordinates utilizing the results of multiplying the first set of texture coordinates by the matrix,
mapping the offset second set of texture coordinates to a texture object to obtain an RGBA, result, the RGBA result including red, green, blue, and alpha components,
scaling the red, green, and blue components of the RGBA result of the texture object using a scale value, and
outputting at least one object with the scaled red, green, and blue components for display;
wherein the mapping is carried out utilizing a sequence of texture shaders, each texture shader generating a plurality of results;

wherein the first set of texture coordinates include signed components which are multiplied by the matrix using a first texture unit, and the results are used to offset using a subsequent second texture unit by offsetting the second set of texture coordinates for a non-projective texture, and wherein the red, green, and blue components are scaled at the subsequent second texture unit using the scale value, the scale value being computed using an unsigned component of the results of the first texture unit.

18. The system as recited in claim 17, wherein the matrix includes a rotation matrix.

19. The system as recited in claim 17, wherein the hardware graphics processor includes a transform module, a lighting module, and a rasterizer module.

20. The system as recited in claim 19, wherein the transform module, the lighting module, and the rasterizer module are embodied on a single semiconductor platform.

21. The system as recited in claim 19, wherein the hardware graphics processor further includes a depth-value correction module.

22. The system as recited in claim 19, wherein the hardware graphics processor further includes a bump mapping module.

23. A system for bump mapping in a hardware graphics processor, comprising:
   means for receiving a first set of texture coordinates;
   means for multiplying the first set of texture coordinates by a matrix to generate results;
   means for offsetting a second set of texture coordinates utilizing the results of multiplying the first set of texture coordinates by the matrix;
   means for mapping the offset second set of texture coordinates to a texture object to obtain an RGBA result, the RGBA result including red, green, blue, and alpha components;
   means for scaling the red, green, and blue components of the RGBA result of the texture object using a scale value; and
   means for outputting at least one object with the scaled red, green, and blue components for display;
   wherein the mapping is carried out utilizing a sequence of texture shaders, each texture shader generating a plurality of results;
   wherein the first set of texture coordinates include signed components which are multiplied by the matrix using a first texture unit, and the results are used to offset using a subsequent second texture unit by offsetting the second set of texture coordinates for a non-projective texture, and wherein the red, green, and blue components are scaled at the subsequent second texture unit using the scale value, the scale value being computed using an unsigned component of the results of the first texture unit.

24. The system as recited in claim 23, wherein the matrix includes a rotation matrix.

25. A non-transitory computer storage medium for storing a computer program for bump mapping in a hardware graphics processor, comprising:
   computer code for receiving a first set of texture coordinates;
   computer code for multiplying the first set of texture coordinates by a matrix to generate results;
   computer code for offsetting a second set of texture coordinates utilizing the results of multiplying the first set of texture coordinates by the matrix;
   computer code for mapping the offset second set of texture coordinates to a texture object to obtain an RGBA result, the RGBA result including red, green, blue and alpha components;
   computer code for scaling the red, green, and blue components of the RGBA result of the texture object using a scale value; and
   computer code for outputting at least one object with the scaled red, green, and blue components for display;
   wherein the mapping is carried out utilizing a sequence of texture shaders, each texture shader generating a plurality of results;
   wherein the first set of texture coordinates include signed components which are multiplied by the matrix using a first texture unit, and the results are used to offset using a subsequent second texture unit by offsetting the second set of texture coordinates for a non-projective texture, and wherein the red, green, and blue components are scaled at the subsequent second texture unit using the scale value, the scale value being computed using an unsigned component of the results of the first texture unit.

26. The computer storage medium as recited in claim 25, wherein the matrix includes a rotation matrix.

* * * * *